(12) United States Patent
Petersen et al.

(10) Patent No.: US 8,589,330 B2
(45) Date of Patent: Nov. 19, 2013

(54) PREDICTING OR RECOMMENDING A USERS FUTURE LOCATION BASED ON CROWD DATA

(75) Inventors: Steven L. Petersen, Los Gatos, CA (US); Christopher M. Amidon, Apex, NC (US)

(73) Assignee: Waldeck Technology, LLC, Portsmouth, NH (US)

( * ) Notice: Subject to any disclaimer, the term of this patent is extended or adjusted under 35 U.S.C. 154(b) by 460 days.

(21) Appl. No.: 12/716,314

(22) Filed: Mar. 3, 2010

(65) Prior Publication Data

US 2012/0047102 A1    Feb. 23, 2012

Related U.S. Application Data

(60) Provisional application No. 61/163,091, filed on Mar. 25, 2009.

(51) Int. Cl.
*G06F 9/44* (2006.01)
*G06N 7/02* (2006.01)
*G06N 7/06* (2006.01)

(52) U.S. Cl.
USPC ........................................................ 706/52

(58) Field of Classification Search
None
See application file for complete search history.

(56) References Cited

U.S. PATENT DOCUMENTS

| | | | |
|---|---|---|---|
| 5,539,232 A | 7/1996 | Nakanishi et al. | |
| 6,204,844 B1 | 3/2001 | Fumarolo et al. | |
| 6,240,069 B1 | 5/2001 | Alperovich et al. | |
| 6,529,136 B2 | 3/2003 | Cao et al. | |
| 6,708,172 B1 | 3/2004 | Wong et al. | |
| 6,819,919 B1 | 11/2004 | Tanaka | |
| 6,883,019 B1 | 4/2005 | Sengupta et al. | |
| 6,968,179 B1 | 11/2005 | De Vries | |
| 6,987,885 B2 | 1/2006 | Gonzalez-Banos et al. | |
| 7,116,985 B2 | 10/2006 | Wilson et al. | |
| 7,123,918 B1 | 10/2006 | Goodman | |
| 7,158,798 B2 | 1/2007 | Lee et al. | |
| 7,200,638 B2 | 4/2007 | Lake | |
| 7,236,739 B2 | 6/2007 | Chang | |
| 7,247,024 B2 | 7/2007 | Bright et al. | |
| 7,272,357 B2 | 9/2007 | Nishiga et al. | |

(Continued)

FOREIGN PATENT DOCUMENTS

WO    WO 2008/000046    1/2008

OTHER PUBLICATIONS

'Paralle implementation of the social forces model': Quinn, 2003, Cireseer.*

(Continued)

*Primary Examiner* — Kakali Chaki
*Assistant Examiner* — Peter Coughlan

(57) ABSTRACT

A system and method for predicting a future location of a user are provided. In general, a prediction basis including crowd data describing crowds in which a user was included during a number of reoccurring time windows is generated. Each reoccurring time window may be, for example, a day of the week (i.e., Monday, Tuesday, Wednesday, Thursday, Friday, Saturday, or Sunday), a portion of a day of the week (e.g., Monday Morning, Monday Afternoon, Monday Evening, Tuesday Evening, etc.), a day of the month (e.g., 1st day of the month), a day of the year (e.g., March 25th), or the like. The prediction basis of the user is then used to predict one or more future locations of the user.

32 Claims, 46 Drawing Sheets

(56) References Cited

U.S. PATENT DOCUMENTS

| | | | |
|---|---|---|---|
| 7,280,822 B2 | 10/2007 | Fraccaroli | |
| 7,398,081 B2 | 7/2008 | Moran | |
| 7,423,580 B2 | 9/2008 | Markhovsky et al. | |
| 7,444,655 B2 | 10/2008 | Sardera | |
| 7,509,131 B2 | 3/2009 | Krumm et al. | |
| 7,558,404 B2 | 7/2009 | Ma et al. | |
| 7,620,404 B2 | 11/2009 | Chesnais et al. | |
| 7,680,959 B2 | 3/2010 | Svendsen | |
| 7,787,886 B2 | 8/2010 | Markhovsky et al. | |
| 8,010,601 B2 | 8/2011 | Jennings et al. | |
| 8,208,943 B2 | 6/2012 | Petersen et al. | |
| 2001/0013009 A1 | 8/2001 | Greening et al. | |
| 2002/0010628 A1 | 1/2002 | Burns | |
| 2002/0049690 A1 | 4/2002 | Takano | |
| 2002/0086676 A1 | 7/2002 | Hendrey et al. | |
| 2002/0155844 A1 | 10/2002 | Rankin et al. | |
| 2003/0005056 A1 | 1/2003 | Yamamoto et al. | |
| 2003/0044021 A1* | 3/2003 | Wilkinson et al. | 381/56 |
| 2003/0080868 A1* | 5/2003 | Nelson | 340/551 |
| 2004/0009750 A1 | 1/2004 | Beros et al. | |
| 2004/0025185 A1 | 2/2004 | Goci et al. | |
| 2004/0192331 A1 | 9/2004 | Gorday et al. | |
| 2005/0038876 A1 | 2/2005 | Chaudhuri | |
| 2005/0070298 A1 | 3/2005 | Caspi et al. | |
| 2005/0174975 A1 | 8/2005 | Mgrdechian et al. | |
| 2005/0210387 A1 | 9/2005 | Alagappan et al. | |
| 2005/0231425 A1 | 10/2005 | Coleman et al. | |
| 2006/0046743 A1 | 3/2006 | Mirho | |
| 2006/0161599 A1 | 7/2006 | Rosen | |
| 2006/0166679 A1 | 7/2006 | Karaoguz et al. | |
| 2006/0238409 A1* | 10/2006 | Yoshioka et al. | 342/126 |
| 2006/0256959 A1 | 11/2006 | Hymes | |
| 2006/0266830 A1 | 11/2006 | Horozov et al. | |
| 2006/0270419 A1 | 11/2006 | Crowley et al. | |
| 2007/0005419 A1 | 1/2007 | Horvitz et al. | |
| 2007/0015518 A1 | 1/2007 | Winter et al. | |
| 2007/0030824 A1 | 2/2007 | Ribaudo et al. | |
| 2007/0075898 A1 | 4/2007 | Markhovsky et al. | |
| 2007/0135138 A1 | 6/2007 | Brown et al. | |
| 2007/0142065 A1 | 6/2007 | Richey et al. | |
| 2007/0167174 A1 | 7/2007 | Halcrow et al. | |
| 2007/0168208 A1 | 7/2007 | Aikas et al. | |
| 2007/0174243 A1 | 7/2007 | Fritz | |
| 2007/0186007 A1 | 8/2007 | Field et al. | |
| 2007/0203644 A1 | 8/2007 | Thota et al. | |
| 2007/0218900 A1 | 9/2007 | Abhyanker | |
| 2007/0255785 A1 | 11/2007 | Hayashi et al. | |
| 2007/0282621 A1 | 12/2007 | Altman et al. | |
| 2007/0290832 A1 | 12/2007 | Kalinichenko et al. | |
| 2008/0016018 A1 | 1/2008 | Malik | |
| 2008/0032666 A1 | 2/2008 | Hughes et al. | |
| 2008/0076418 A1 | 3/2008 | Beyer, Jr. | |
| 2008/0086741 A1 | 4/2008 | Feldman et al. | |
| 2008/0097999 A1 | 4/2008 | Horan | |
| 2008/0106599 A1 | 5/2008 | Liu et al. | |
| 2008/0113674 A1 | 5/2008 | Baig | |
| 2008/0118106 A1 | 5/2008 | Kilambi et al. | |
| 2008/0126476 A1 | 5/2008 | Nicholas et al. | |
| 2008/0140650 A1* | 6/2008 | Stackpole | 707/5 |
| 2008/0155080 A1 | 6/2008 | Marlow et al. | |
| 2008/0182563 A1 | 7/2008 | Wugofski et al. | |
| 2008/0182591 A1 | 7/2008 | Krikorian | |
| 2008/0188261 A1 | 8/2008 | Arnone | |
| 2008/0208652 A1 | 8/2008 | Srivastava | |
| 2008/0222295 A1 | 9/2008 | Robinson et al. | |
| 2008/0227473 A1 | 9/2008 | Haney | |
| 2008/0242271 A1 | 10/2008 | Schmidt et al. | |
| 2008/0250312 A1 | 10/2008 | Curtis | |
| 2008/0306826 A1 | 12/2008 | Kramer et al. | |
| 2008/0318597 A1 | 12/2008 | Berns et al. | |
| 2009/0023410 A1 | 1/2009 | Ghosh | |
| 2009/0024315 A1 | 1/2009 | Scheibe | |
| 2009/0030999 A1 | 1/2009 | Gatzke et al. | |
| 2009/0047972 A1 | 2/2009 | Neeraj | |
| 2009/0063205 A1* | 3/2009 | Shibasaki | 705/5 |
| 2009/0076894 A1 | 3/2009 | Bates et al. | |
| 2009/0082038 A1 | 3/2009 | McKiou et al. | |
| 2009/0106314 A1 | 4/2009 | Song et al. | |
| 2009/0112467 A1 | 4/2009 | Jiang et al. | |
| 2009/0115570 A1 | 5/2009 | Cusack, Jr. | |
| 2009/0115617 A1 | 5/2009 | Sano et al. | |
| 2009/0132652 A1 | 5/2009 | Athale et al. | |
| 2009/0144211 A1 | 6/2009 | O'Sullivan et al. | |
| 2009/0150501 A1 | 6/2009 | Davis et al. | |
| 2009/0164431 A1 | 6/2009 | Zivkovic et al. | |
| 2009/0164459 A1 | 6/2009 | Jennings et al. | |
| 2009/0164919 A1 | 6/2009 | Bates et al. | |
| 2009/0201896 A1 | 8/2009 | Davis et al. | |
| 2009/0210480 A1 | 8/2009 | Sivasubramaniam et al. | |
| 2010/0004857 A1 | 1/2010 | Pereira et al. | |
| 2010/0020776 A1 | 1/2010 | Youssef et al. | |
| 2010/0130226 A1 | 5/2010 | Arrasvuori et al. | |
| 2010/0197318 A1 | 8/2010 | Petersen et al. | |
| 2010/0197319 A1 | 8/2010 | Petersen et al. | |
| 2010/0198826 A1 | 8/2010 | Petersen et al. | |
| 2010/0198828 A1 | 8/2010 | Petersen et al. | |
| 2010/0198862 A1 | 8/2010 | Jennings et al. | |
| 2010/0198870 A1 | 8/2010 | Petersen et al. | |
| 2010/0198917 A1 | 8/2010 | Petersen et al. | |
| 2011/0136506 A1 | 6/2011 | Stewart | |
| 2012/0041983 A1 | 2/2012 | Jennings | |
| 2012/0047087 A1 | 2/2012 | Amidon et al. | |

OTHER PUBLICATIONS

'Pedestrian detection and tracking for counting applications in crowded situations', Sidla, 2006, IEEE, Proceedings of the IEEE international conference on video and signal based surveillance (AVSS'06).*
'Location awareness and local mobility', Bergqvist, 2007, Citeseer.*
"CitySense—Powered by Sense Networks," at <http://www.citysense.com/moreinfo.php>, copyright 2008, Sense Networks, printed Sep. 8, 2009, 2 pages.
Proceedings of the 22nd Information Systems Research Seminar in Scandinavia (IRIS 22): "Enterprise Architectures for Virtual Organizations," Aug. 7-10, 1999, Keuruu, Finland, vol. 1, edited by Timo K. Kakola, 424 pages.
"Statistical inference," Wikipedia, at <http://en.wikipedia.org/wiki/Inferential_statistics>, from the Internet Archive, dated Feb. 3, 2009, last updated Aug. 25, 2008, printed Apr. 20, 2012, 3 pages.
"Welcome to LuckyCal," at <http://www.luckycal.com>, copyright 2007-2010, LuckyCal, printed Apr. 20, 2012, 1 page.
Vigueras, G. et al., "A comparative study of partitioning methods for crowd simulations," Applied Soft Computing, vol. 10, Issue 1, Jan. 2010, received Dec. 20, 2008, received in revised form Jul. 1, 2009, available online Jul. 22, 2009, pp. 225-235, 12 pages.
Oh, Sejin et al., "CAMAR: Context-aware Mobile Augmented Reality in Smart Space," In Proceedings of International Workshop on Ubiquitous Virtual Reality 2009, Bruce Thomas et al. (Eds.), Jan. 15-18, 2009, University of South Australia, Adelaide, Australia, pp. 48-51, 4 pages.
"ConnectingCadence.com—Mapping the social world.," at <http://www.connectingcadence.com/>, found on the Internet Archive, copyright 2008, ConnectingCadence, printed Apr. 28, 2011, 1 page.
Wu et al., "Crowd Flow Segmentation Using a Novel Region Growing Scheme," In Proceedings PCM 2009, 10th Pacific Rim Conference on Multimedia, Bangkok, Thailand, Dec. 15-18, 2009, pp. 898-907, 10 pages.
Benford, S. et al., "Crowded Collaborative Virtual Environments," Proceedings of the SIGCHI Conference on Human Factors in Computing Systems, Atlanta, Georgia, Mar. 22-27, 1997, 7 pages.
Anciaux, N. et al., "Data Degradation: Making Private Data Less Sensitive Over Time," CIKM 2008, Oct. 26-30, 2008, Napa Valley, California, 2 pages.
Ngai, Wang Kay et al., "Efficient Clustering of Uncertain Data," Proceedings of the Sixth International Conference on Data Mining (ICDM'06), Dec. 18-22, 2006, pp. 436-445, copyright 2006, IEEE, 10 pages.

(56) References Cited

OTHER PUBLICATIONS

"Final: OpenID Attribute Exchange 1.0—Final," at <http://openid.net/specs/openid-attribute-exchange-1_0.html>, Dec. 5, 2007, printed May 11, 2012, 11 pages.

Ertoz, L. et al., "Finding Clusters of Different Sizes, Shapes, and Densities in Noisy, High Dimensional Data," Proceedings of the 2003 SIAM International Conference on Data Mining (SDM 2003), Jan. 24, 2003, pp. 47-58, San Francisco, CA, 12 pages.

"Flickr Shapefiles Public Dataset 1.0," posted by aaron on May 21, 2009, found at <http://code.flickr.com/blog/2009/05/21/flickr-shapefiles-public-dataset-10/>, Yahoo! Inc., printed Jul. 13, 2011, 5 pages.

Arrington, M., "I Saw the Future of Social Networking the Other Day," TechCrunch, Apr. 9, 2008, at <http://www.techcrunch.com/2008/04/09/i-saw-the-future-of-social-networking-the-other-day/>, printed May 27, 2009, 28 pages.

Estrin, M., "Is the MySpace crowd lying to marketers?", Oct. 16, 2007, posted at iMedia Connection, at <http://www.imediaconnection.com/content/16993.asp>, copyrighted by iMedia Communications, Inc., printed Apr. 28, 2011, 2 pages.

"MobiClique," copyright 2007-2009, Thomson, originally found at <http://www.thlab.net/~apietila/mobiclique/>, printed Oct. 23, 2009, 5 pages.

Hardt, D. et al., "OpenID Attribute Exchange 1.0—Final," at <http://openid.net/specs/openid-attribute-exchange-1_0.html>, Dec. 5, 2007, 11 pages.

"OpenID Foundation website," at <http://openid.net>, copyright 2006-2011, OpenID Foundation, printed Apr. 28, 2011, 2 pages.

"Plazes—Right Plaze, Right Time," at <http://plazes.com>, copyright 2004-2011, Plazes AG, printed May 3, 2011, 2 pages.

Cox, L.P. et al., "Presence-Exchanges: Toward Sustainable Presence-Sharing," In Proc. of 7th IEEE Workshop on Mobile Computing Systems and Applications, Apr. 6-7, 2006, Semiahmoo Resort, Washington, pp. 55â€ 60, 6 pages.

"Resource Description Framework (RDF)/W3C Semantic Web Activity," at <http://www.w3.org/RDF/>, from the Internet Archive dated Jul. 30, 2008, printed Aug. 10, 2012, 6 pages.

Abstract, "Self-Organized Pedestrian Crowd Dynamics: Experiments, Simulations, and Design Solutions," by Helbing, D. et al., Transportation Science, vol. 39, Issue 1, Feb. 2005, obtained from ACM Digital Library at <http://portal.acm.org/citation.cfm?id=1247227>, printed Apr. 28, 2011, 2 pages.

"Sense Networks," at <http://www.sensenetworks.com/about_us.php>, copyright 2008-2010, Sense Networks, printed Apr. 28, 2011, 1 page.

"Sense Networks—Machine Learning," at <http://www.sensenetworks.com/machine_learning.php>, copyright 2008-2009, Sense Networks, printed Jan. 12, 2009, 2 pages.

"Sense Networks—The Minimum Volume Embedding Algorithm," at <http://www.sensenetworks.com/mve_algorithm.php>, copyright 2008-2009, Sense Networks, printed Jan. 12, 2009, 2 pages.

"Six degrees of separation," at <http://en.wikipedia.org/wiki/Six_degrees_of_separation>, last modified on Apr. 19, 2011, printed Apr. 28, 2011, 11 pages.

Cox et al., "SmokeScreen: Flexible Privacy Controls for Presence-Sharing," Proceedings of the 5th International Conference on Mobile Systems, Applications, and Services (2007) (MobiSys '07), Jun. 11-13, 2007, San Juan, Puerto Rico, 13 pages.

Agostini, A. et al., "Towards Highly Adaptive Services for Mobile Computing," In Proceedings of IFIP TC8 Working Conference on Mobile Information Systems (MOBIS), Sep. 15-17, 2004, Oslo, Norway, Springer, 2004, pp. 121-134, 14 pages.

"What is LinkedIn?," at <http://www.linkedin.com/static?key=what_is_linkedin&trk=hb_what>, copyright 2011, LinkedIn Corporation, printed Apr. 28, 2011, 1 page.

* cited by examiner

PREDICTING OR RECOMMENDING A USERS FUTURE LOCATION BASED ON CROWD DATA

RELATED APPLICATIONS

This application claims the benefit of provisional patent application Ser. No. 61/163,091, filed Mar. 25, 2009, the disclosure of which is hereby incorporated herein by reference in its entirety.

FIELD OF THE DISCLOSURE

The present disclosure relates to predicting or recommending future locations for a user.

BACKGROUND

Various methods exist for predicting the future location of a user by using personal and private information about the user such as a location history of the user. The problem with these methods is that they all have the potential to reveal or misuse the private information of the user. As such, there is a need for a system and method for predicting the future location of a user in a manner that maintains user privacy.

SUMMARY

A system and method for predicting a future location of a user are provided. In general, a prediction basis including crowd data describing crowds in which a user was included during a number of reoccurring time windows is generated. Each reoccurring time window may be, for example, a day of the week (i.e., Monday, Tuesday, Wednesday, Thursday, Friday, Saturday, or Sunday), a portion of a day of the week (e.g., Monday Morning, Monday Afternoon, Monday Evening, Tuesday Evening, etc.), a day of the month (e.g., 1st day of the month), a day of the year (e.g., March 25th), or the like. The prediction basis of the user is then used to predict one or more future locations of the user.

In one embodiment, in order to predict a future location of the user, current crowd data is obtained for the user, where the current crowd data describes a crowd in which the user is currently included. The current crowd data of the user is then compared to at least a subset of relevant crowd data from the prediction basis in order to determine whether the user is likely to move. Specifically, in one embodiment, a determination is made that the user is likely to move if the current crowd data is different than the at least a subset of the relevant crowd data from the prediction basis by more than a predefined threshold degree. If a determination is made that the user is likely to move, expected crowd criteria describing a type of crowd in which the user is expected to be included is generated based on the at least a subset of the relevant crowd data from the prediction basis of the user. Then, one or more locations that match the expected crowd criteria are identified as the one or more future locations of the user. The one or more locations that match the expected crowd criteria may include one or more Points of Interest (POIs) at which crowds that match the expected crowd criteria are currently located, one or more POIs at which crowds that match the expected crowd criteria are expected to be located at a future time, locations of one or more crowds that currently match the expected crowd criteria, or one or more crowds that are expected to match the expected crowd criteria at a future time.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

Figure 1:
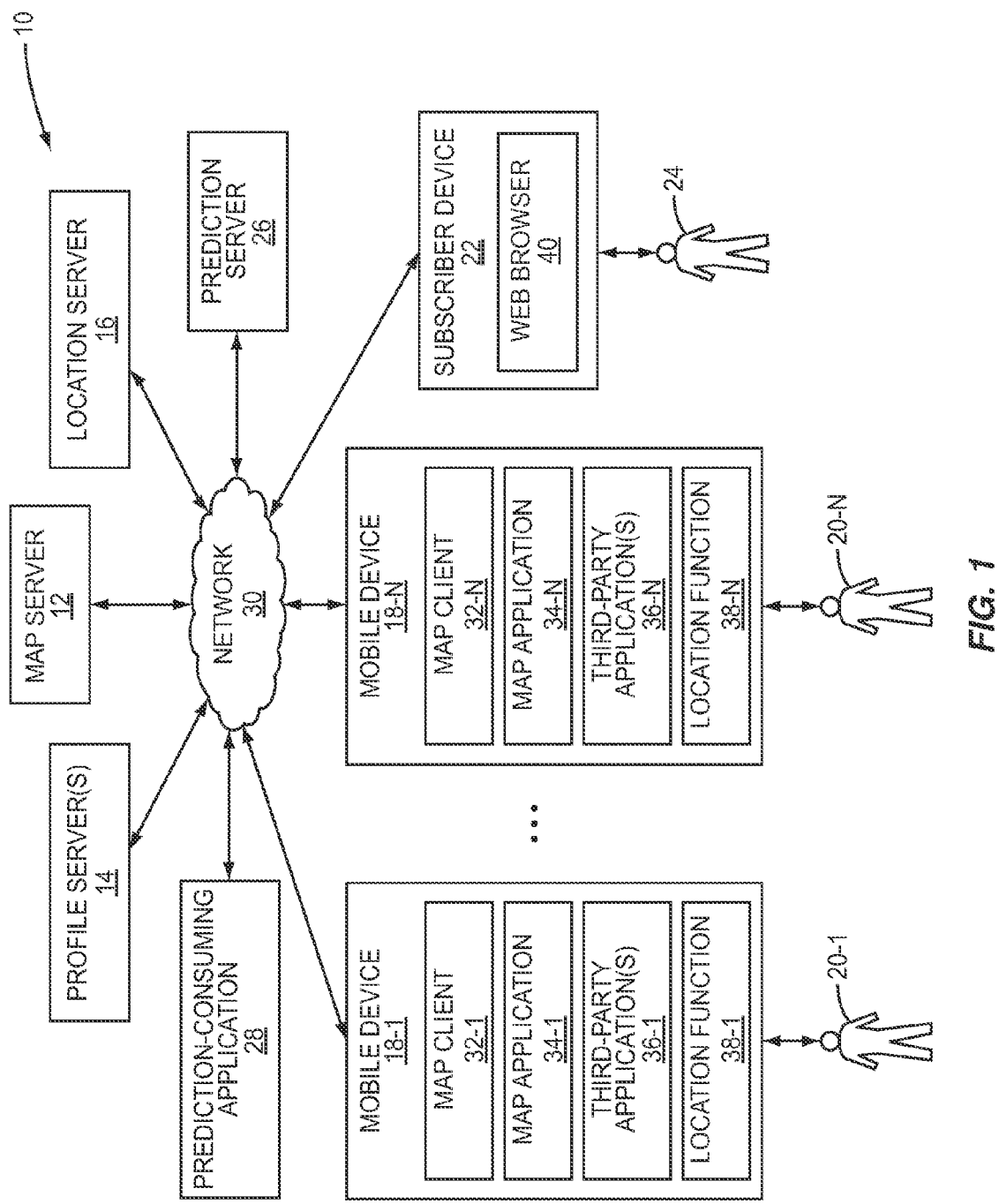
FIG. 1 illustrates a system for predicting future locations of a user according to one embodiment of the present disclosure.
Figure 6:
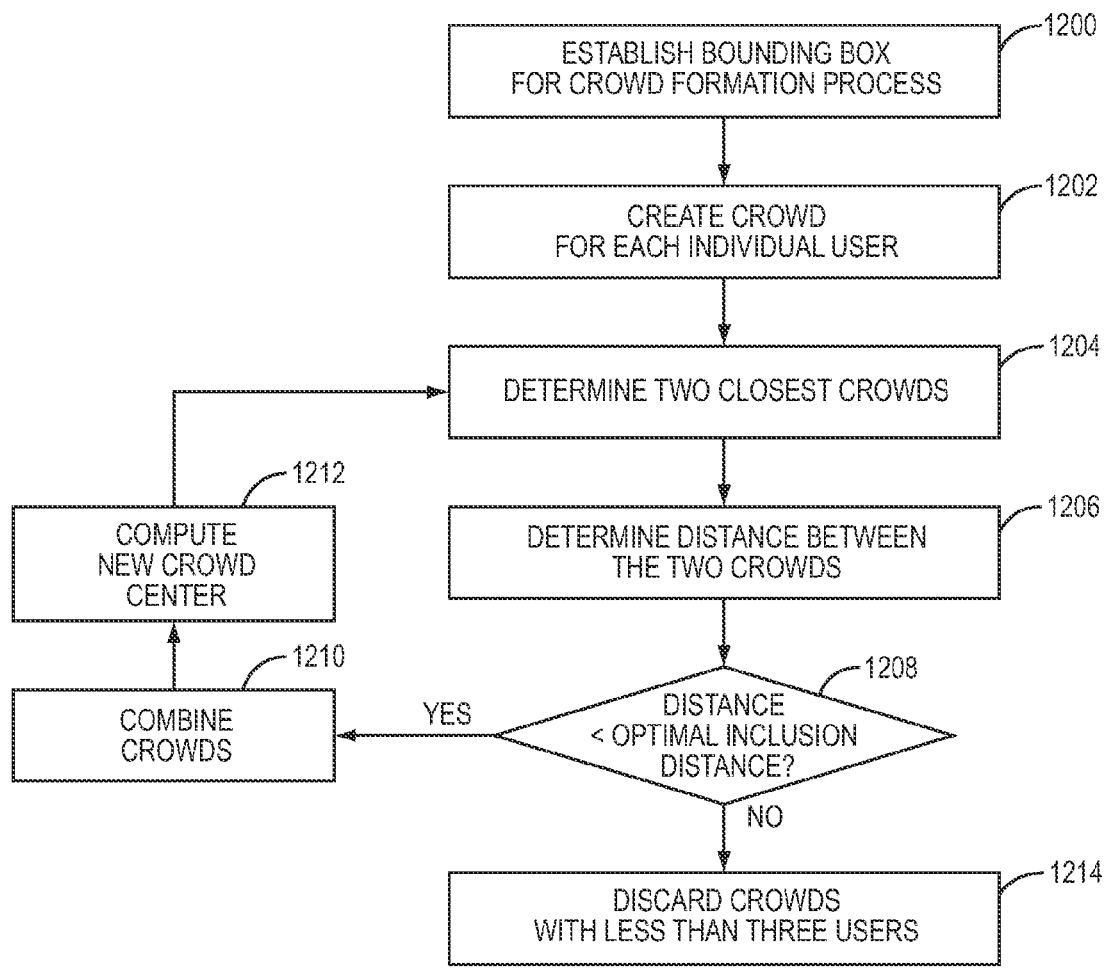
FIG. 6 is a flow chart for a spatial crowd formation process according to one embodiment of the present disclosure.
Figure 12:
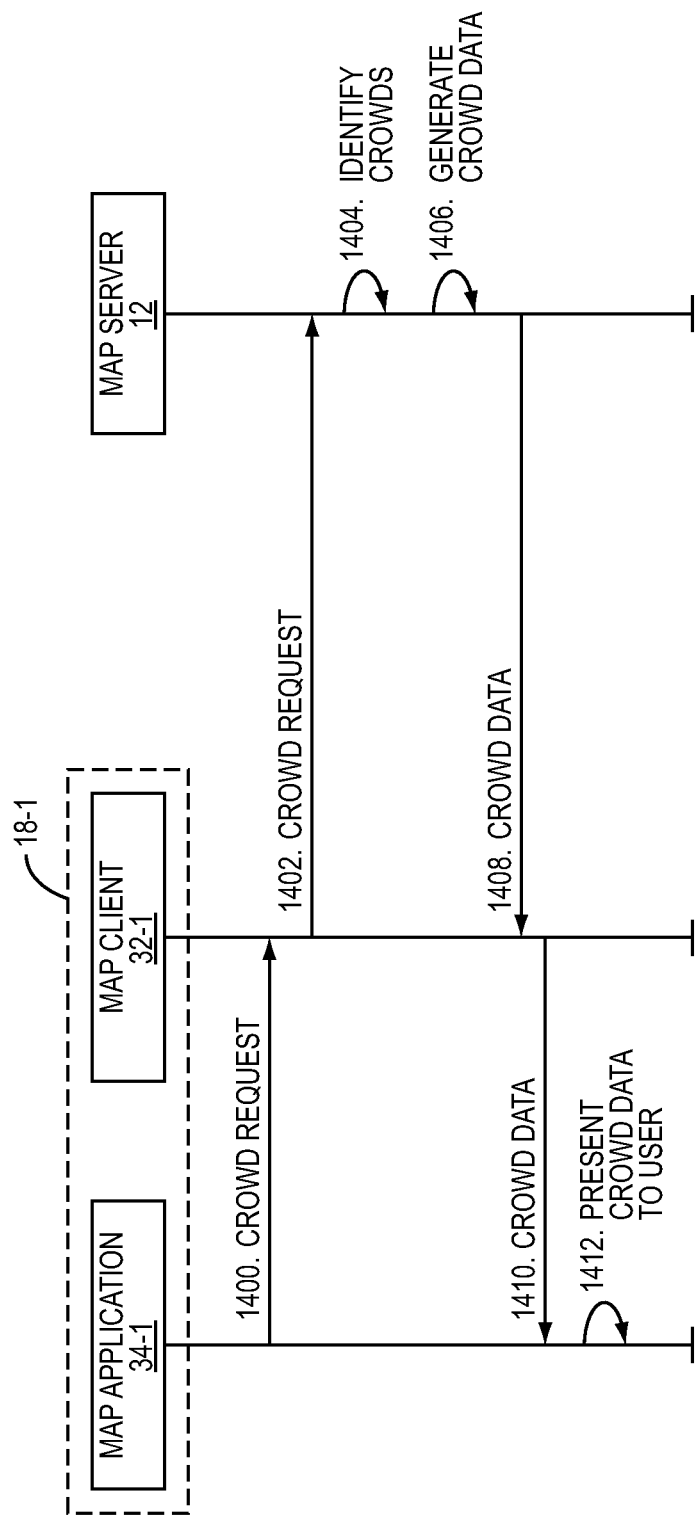
Figure 13:
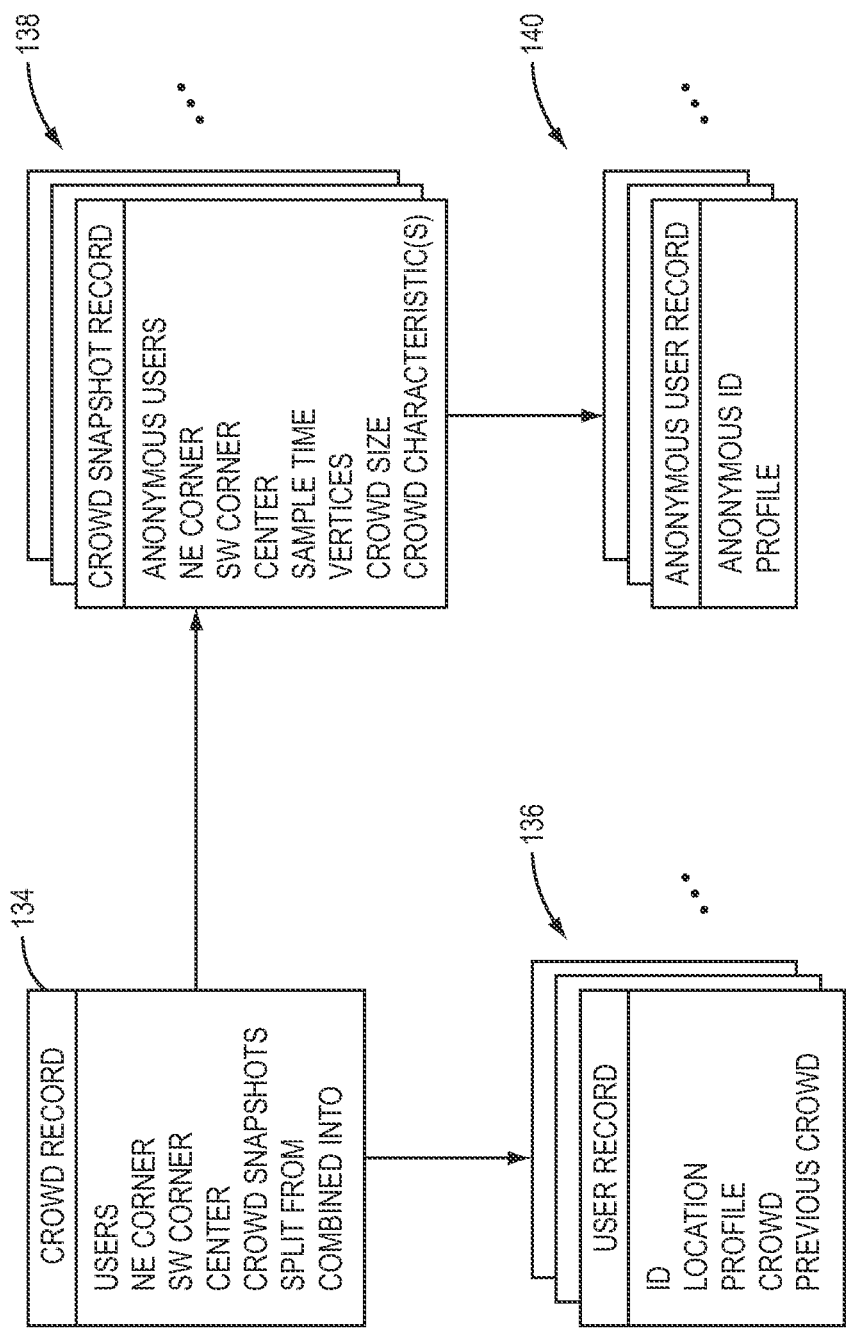
Figure 15:
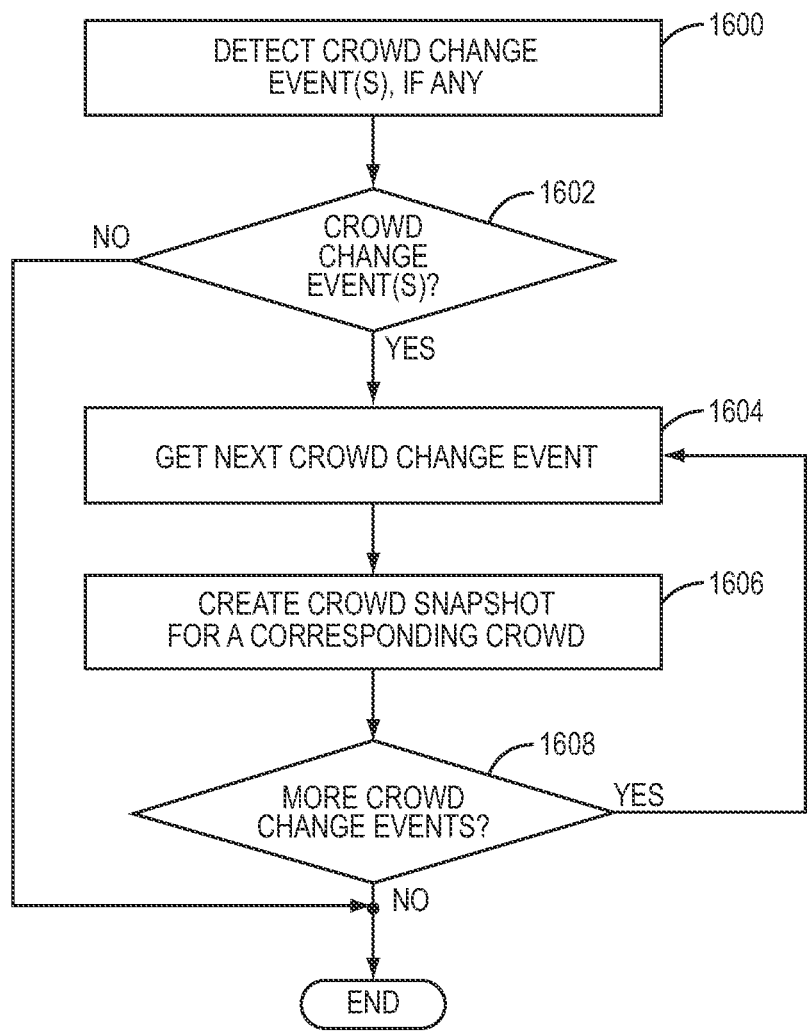
Figure 16:
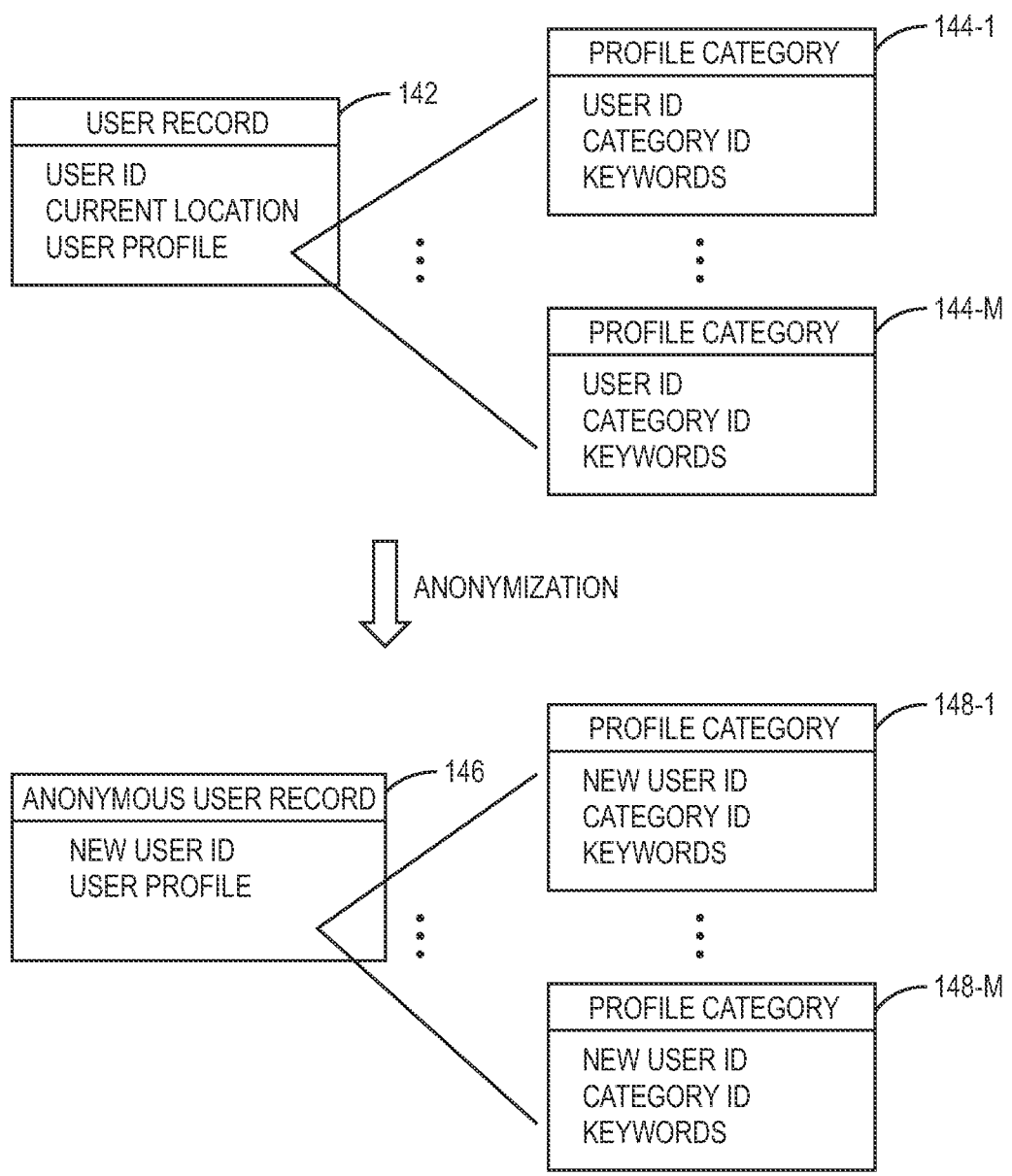
Figure 17:
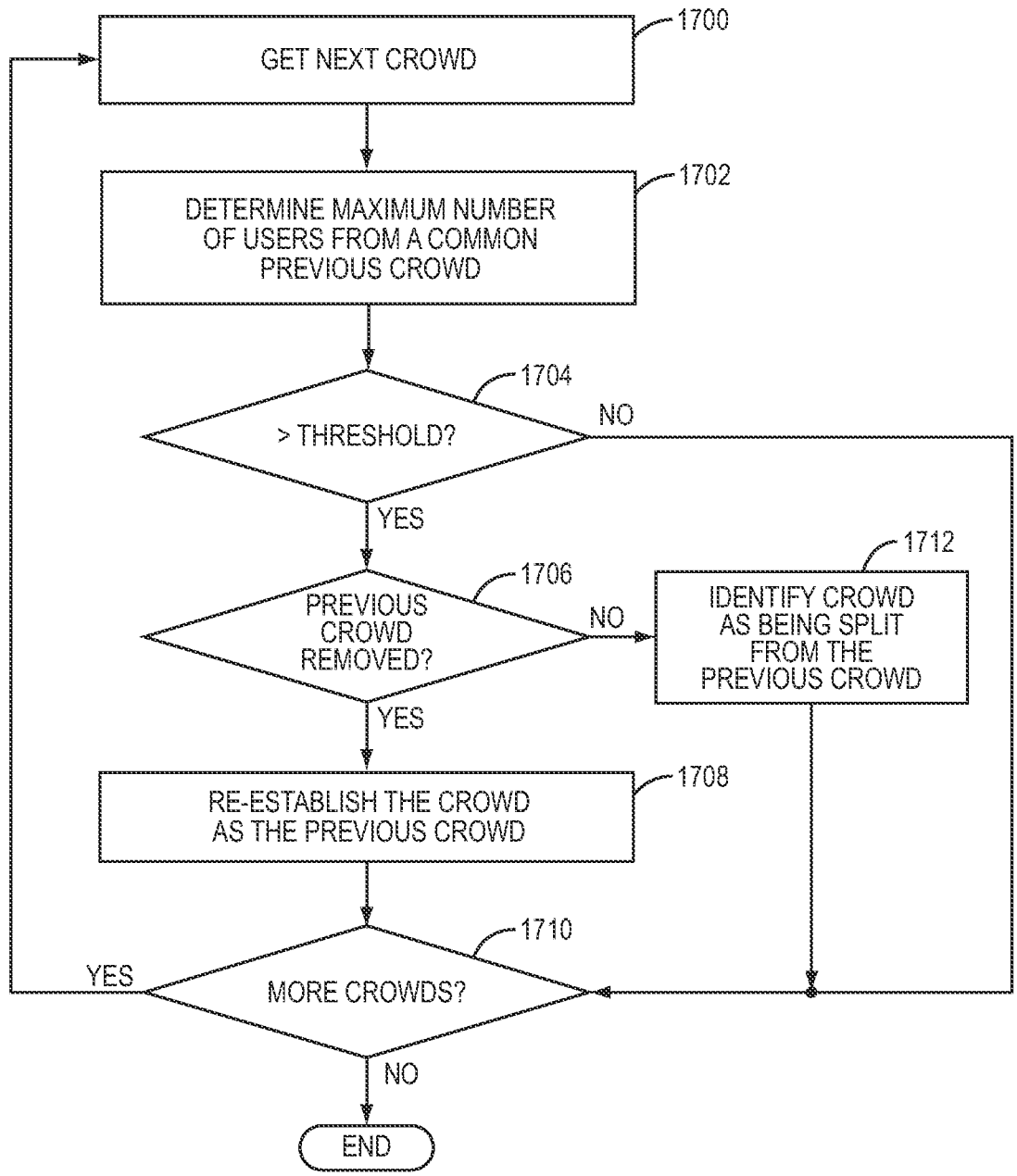
Figure 18:
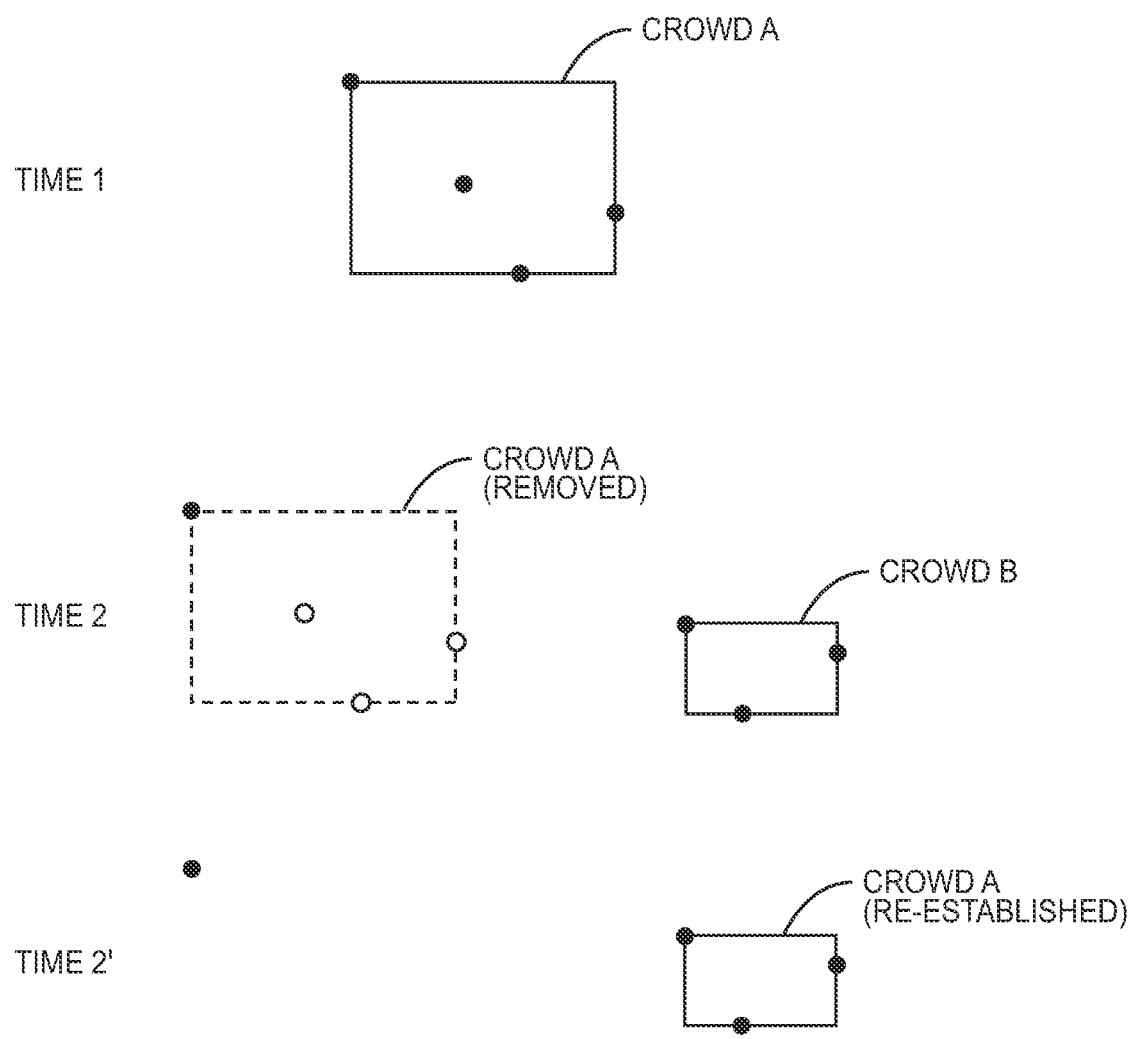
Figure 19:
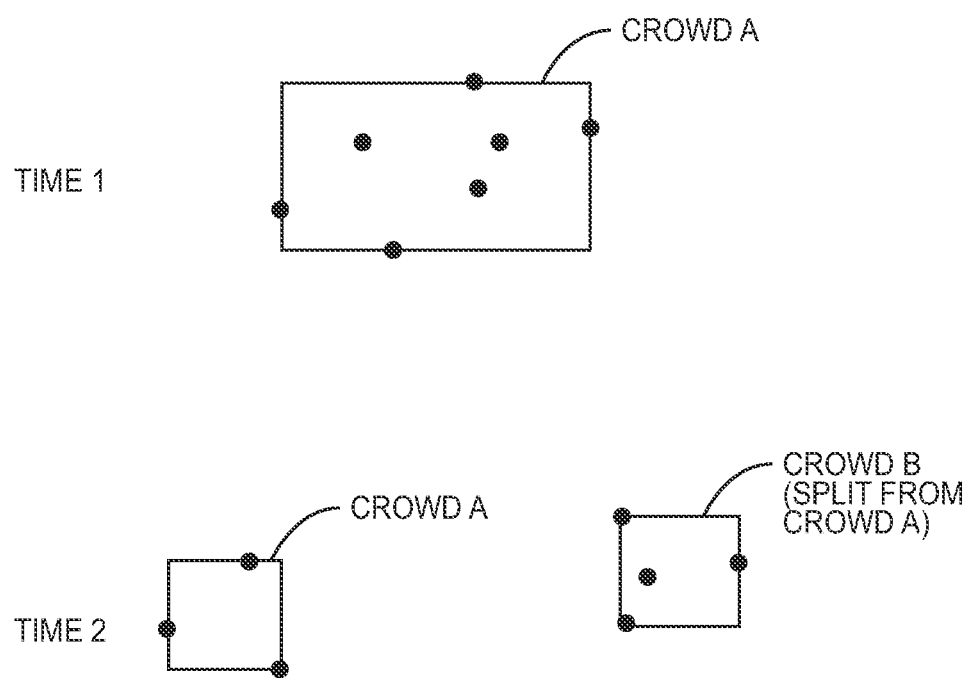
Figure 20:
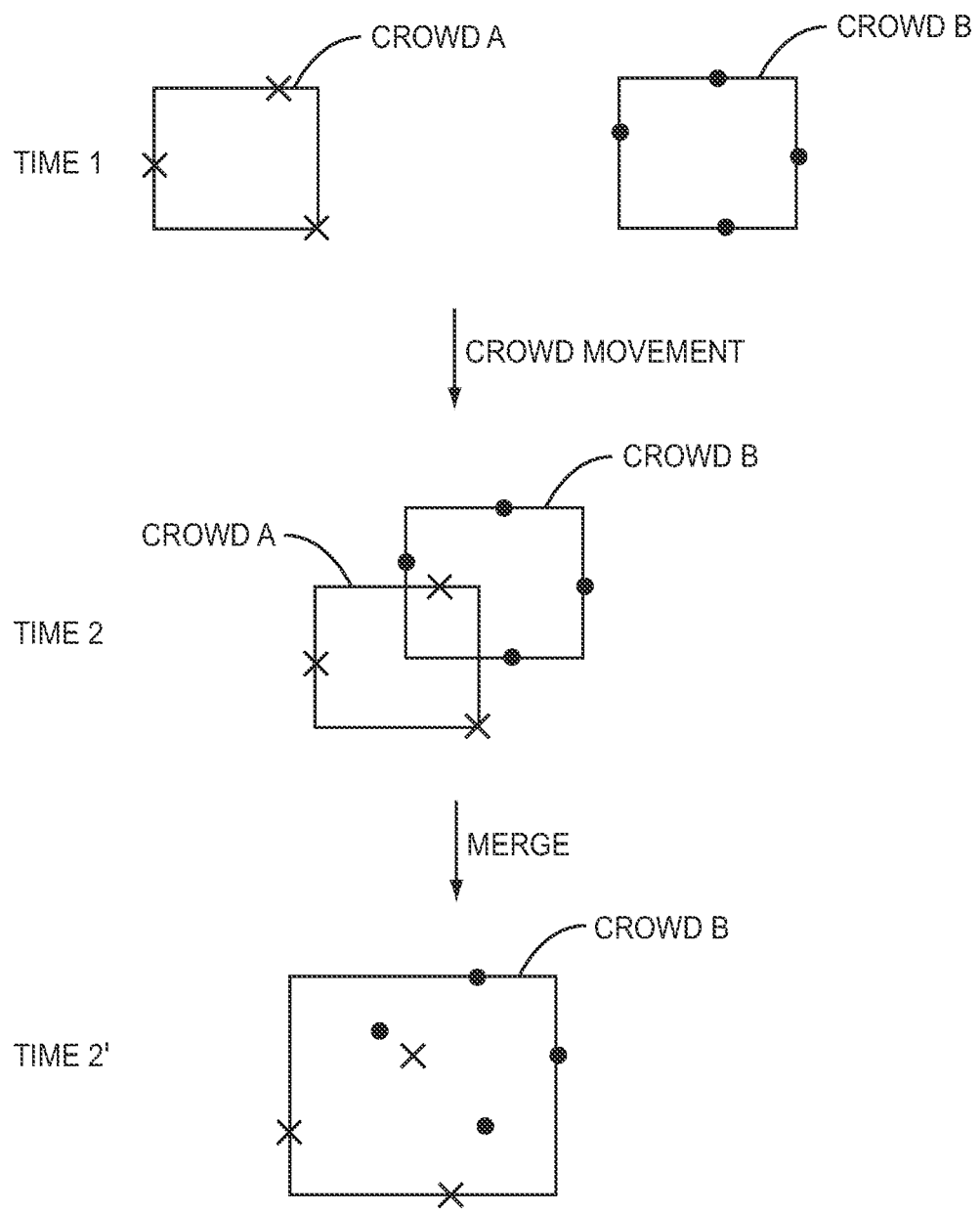
Figure 21:
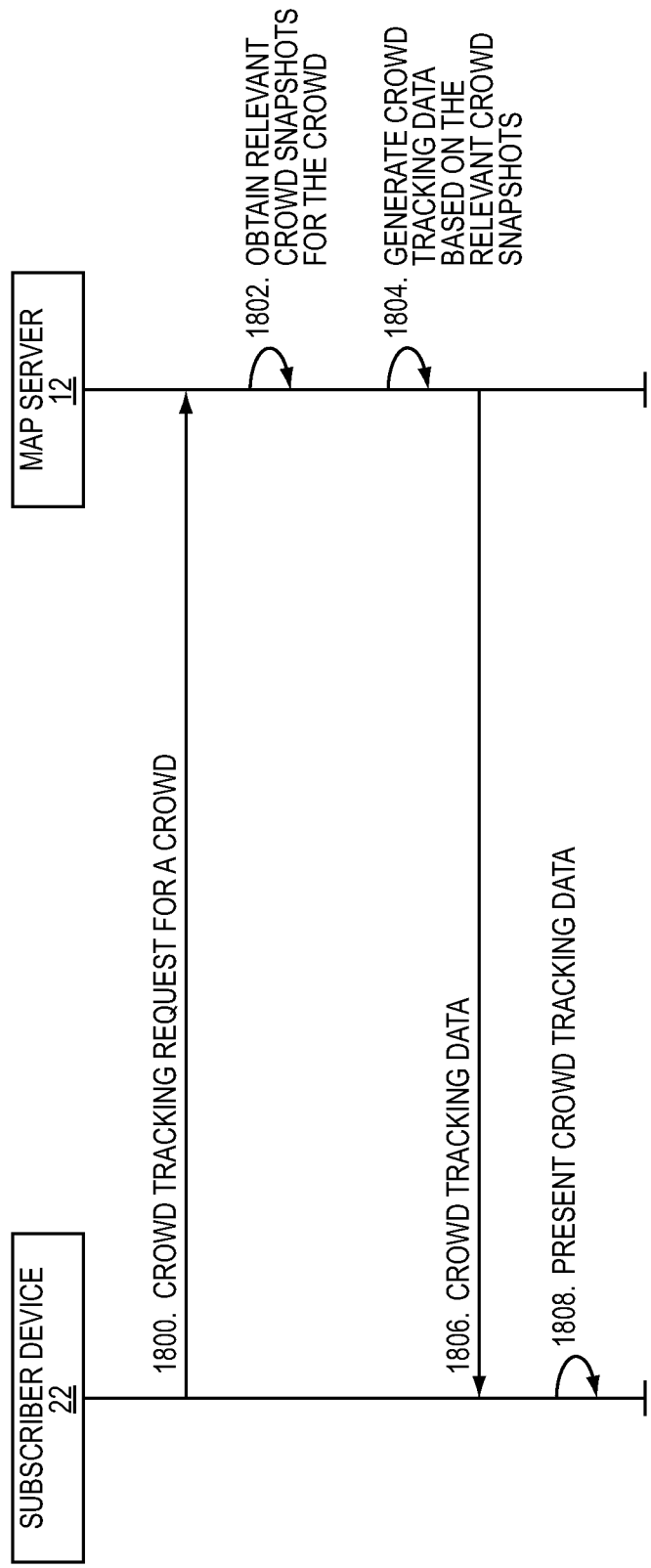
Figure 22:
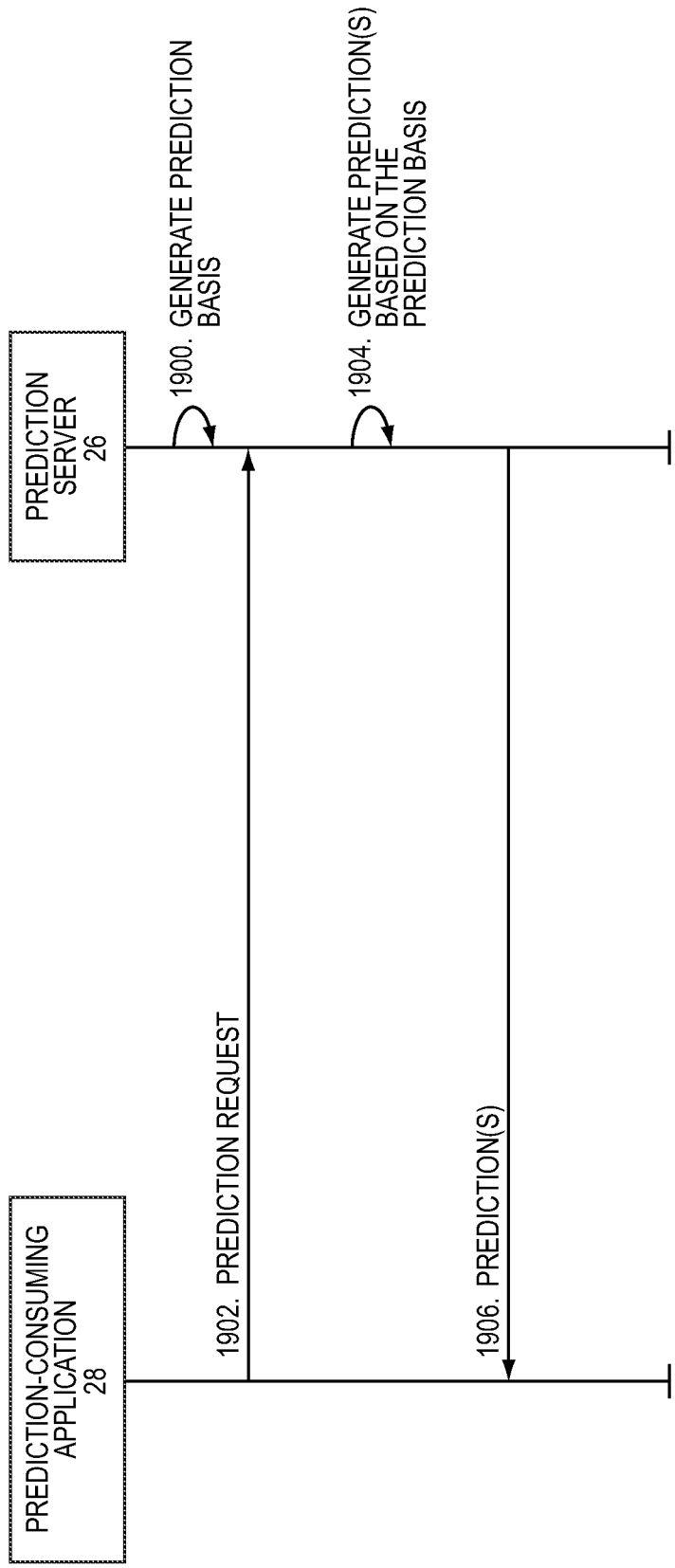
Figure 23:
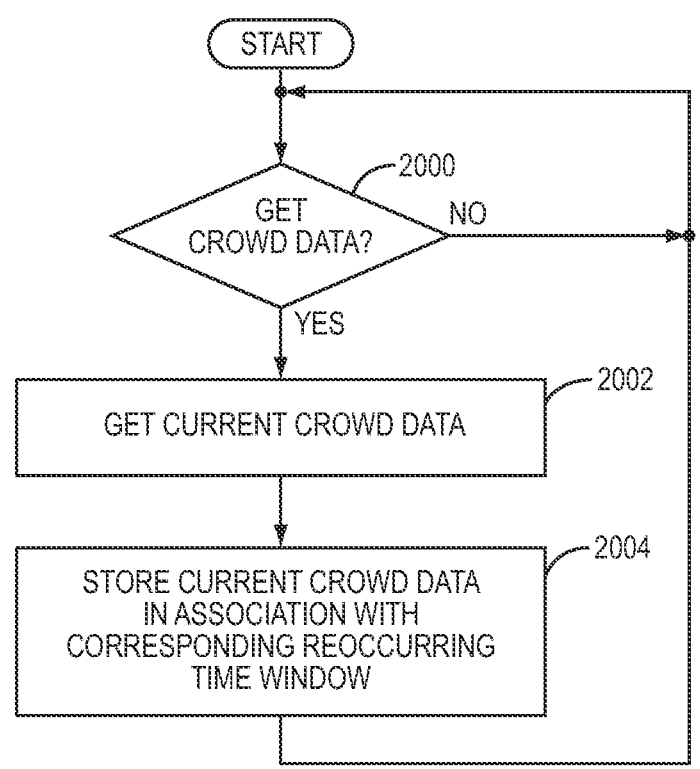
Figure 24:
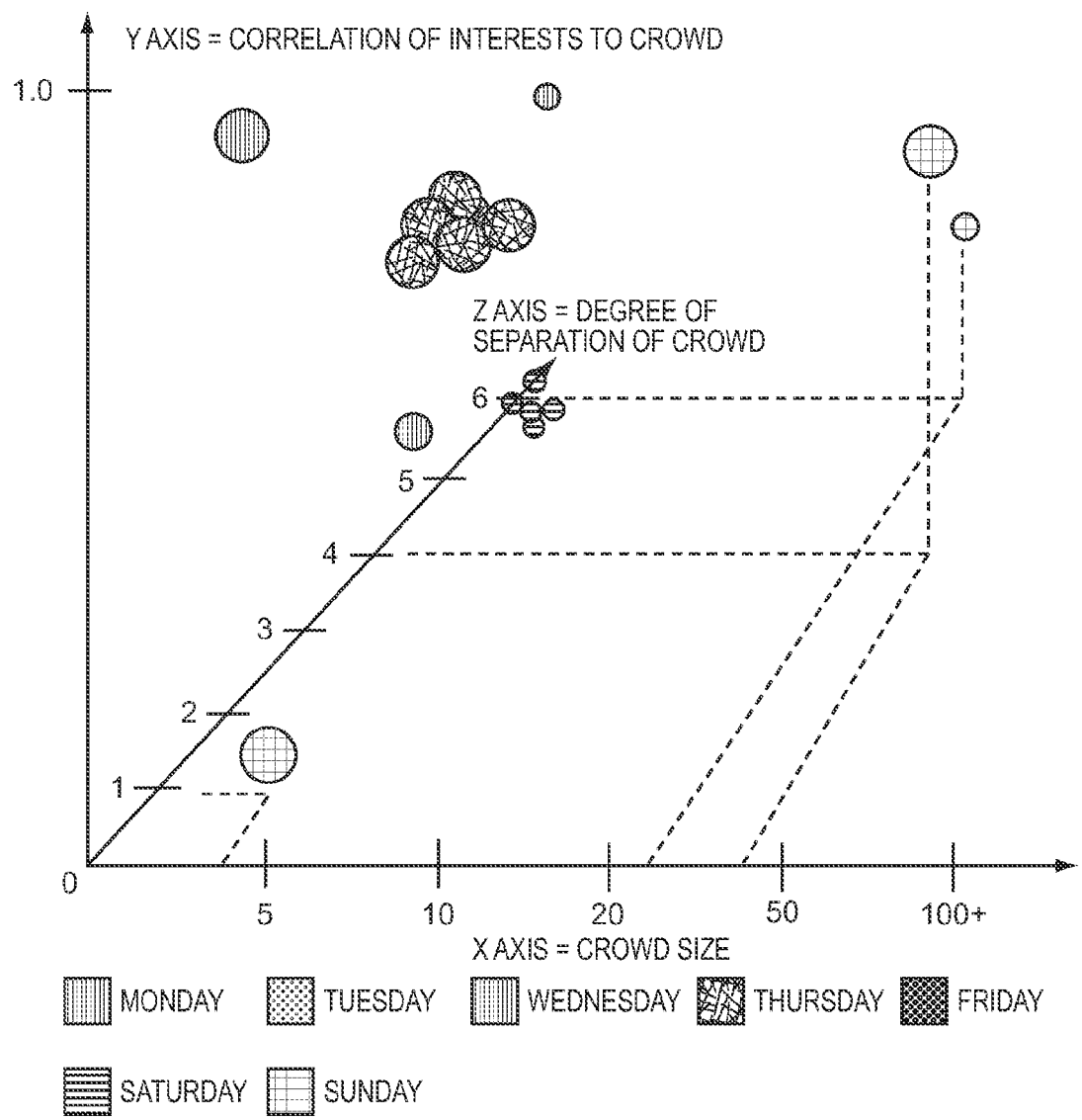
Figure 25:
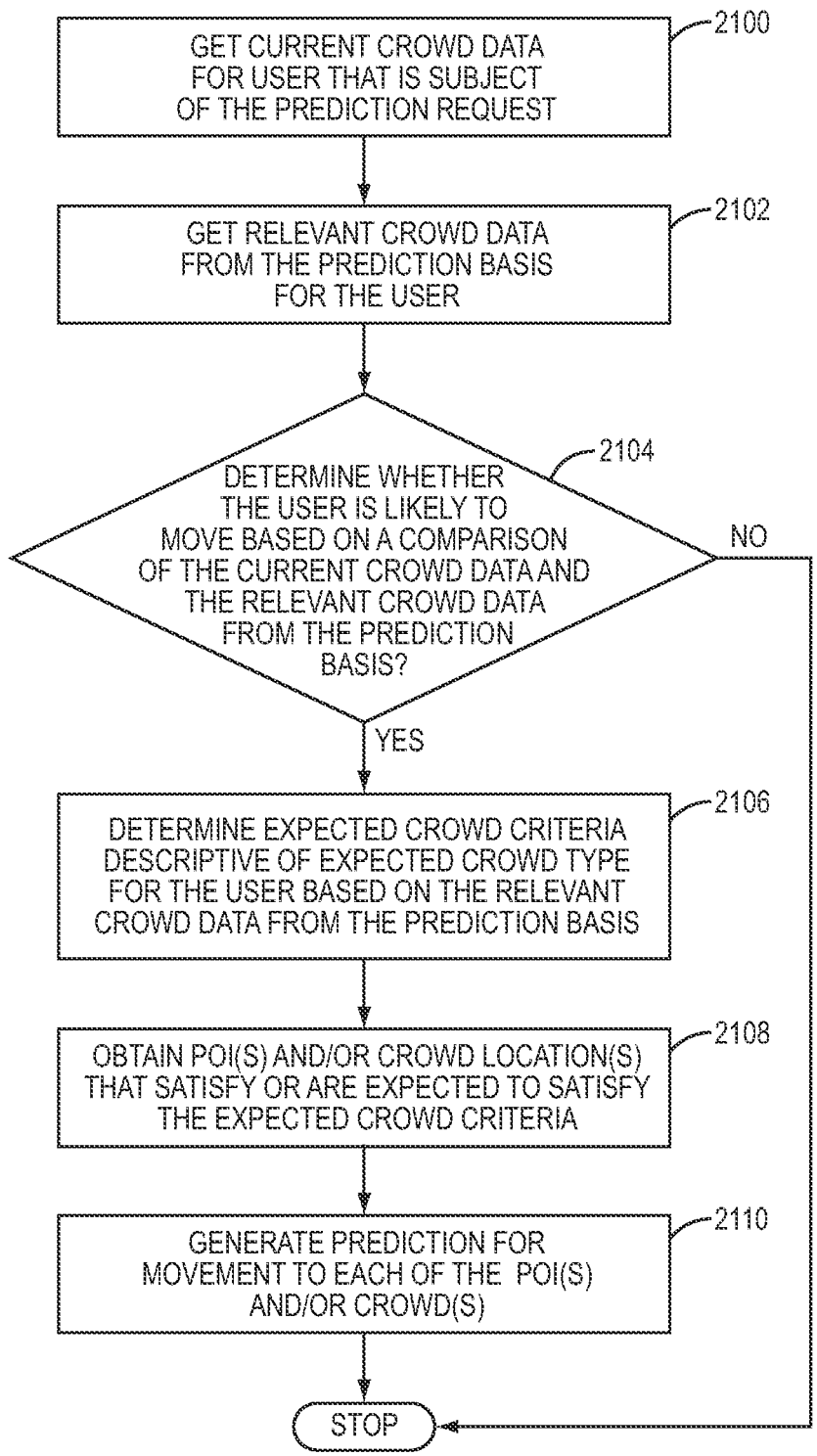
Figure 26:
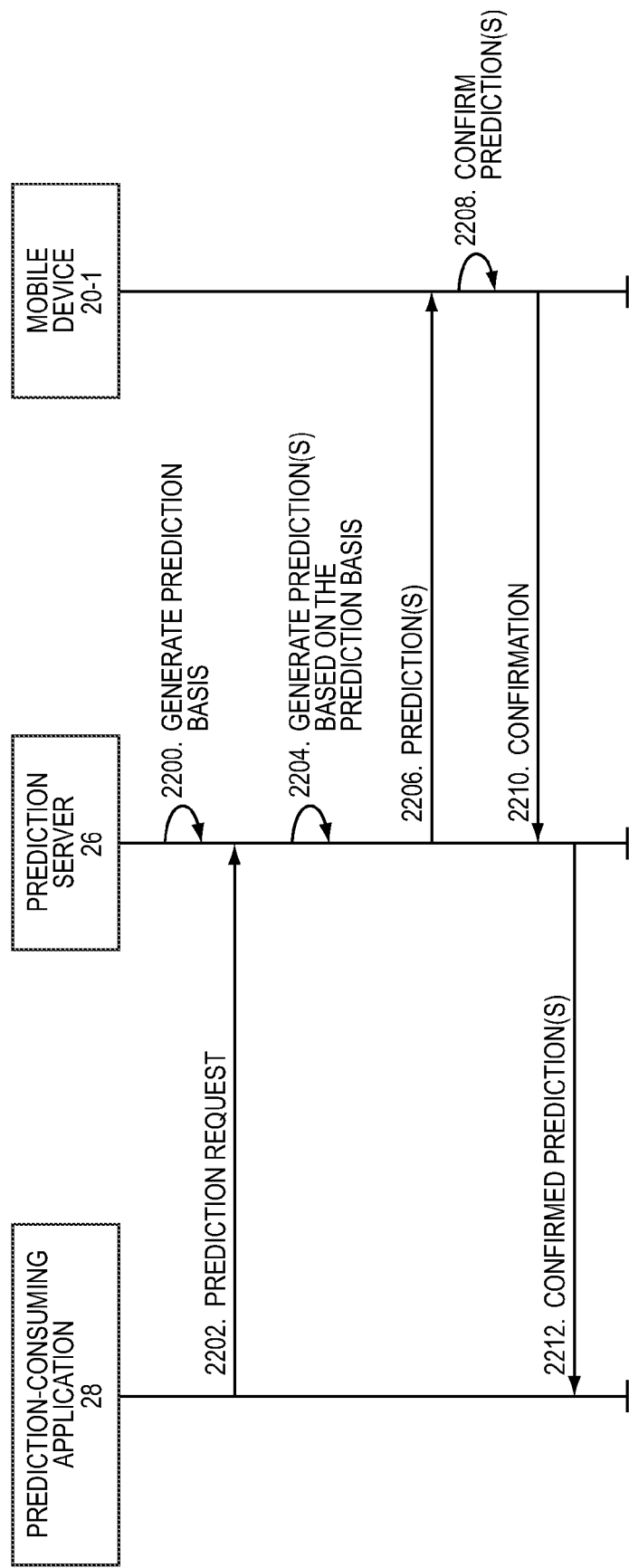
Figure 27:
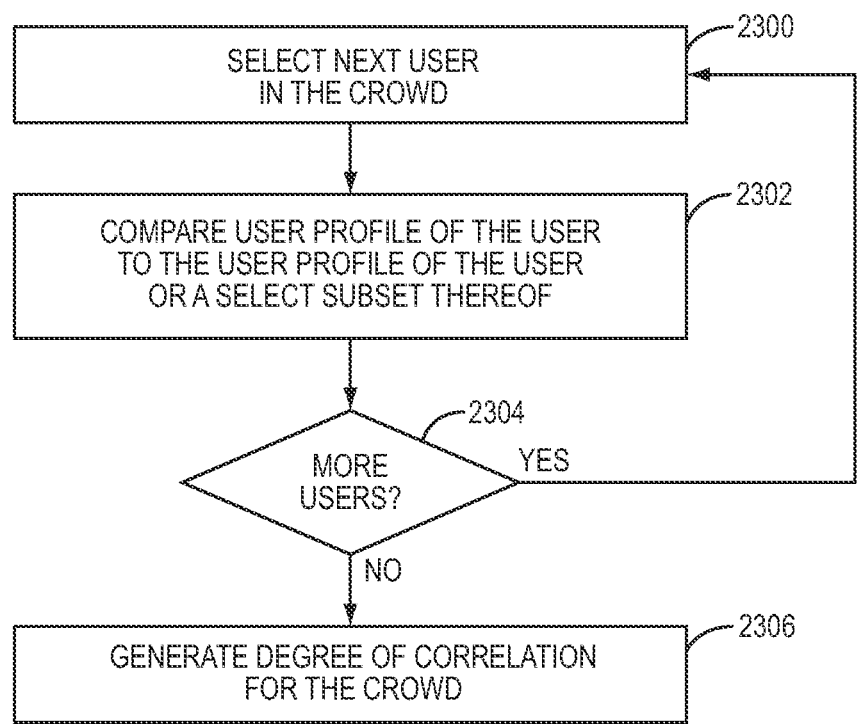
Figure 28:
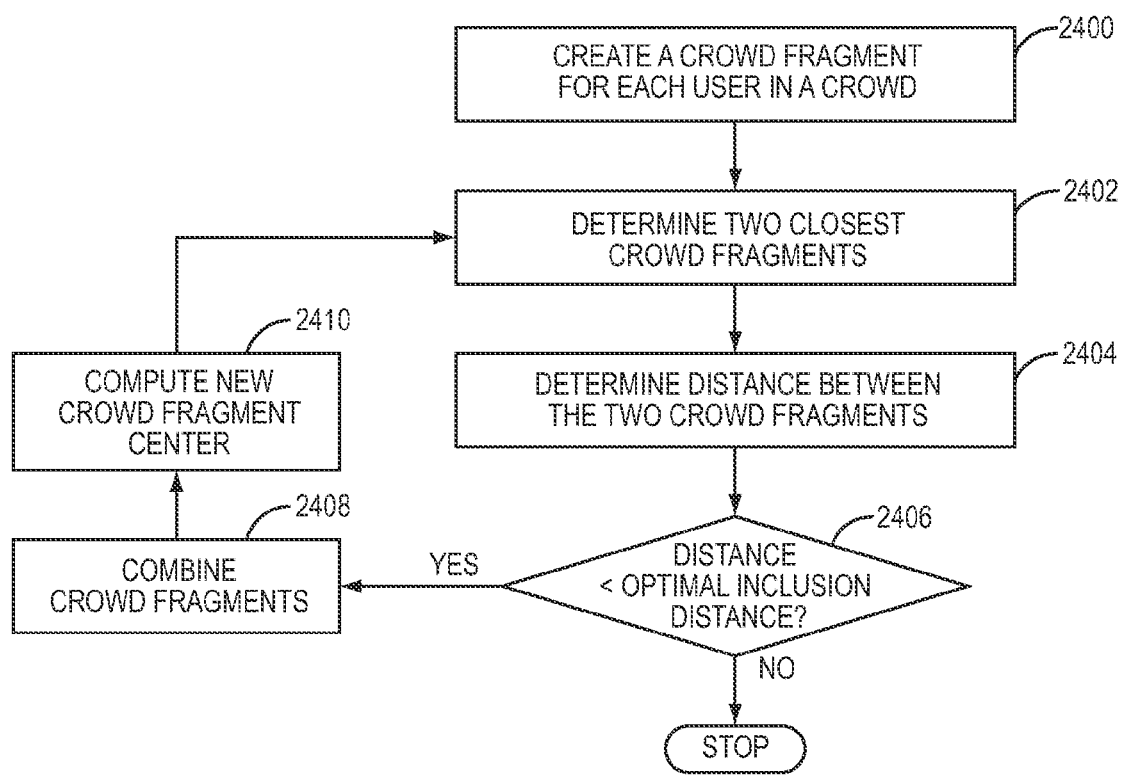
Figure 30:
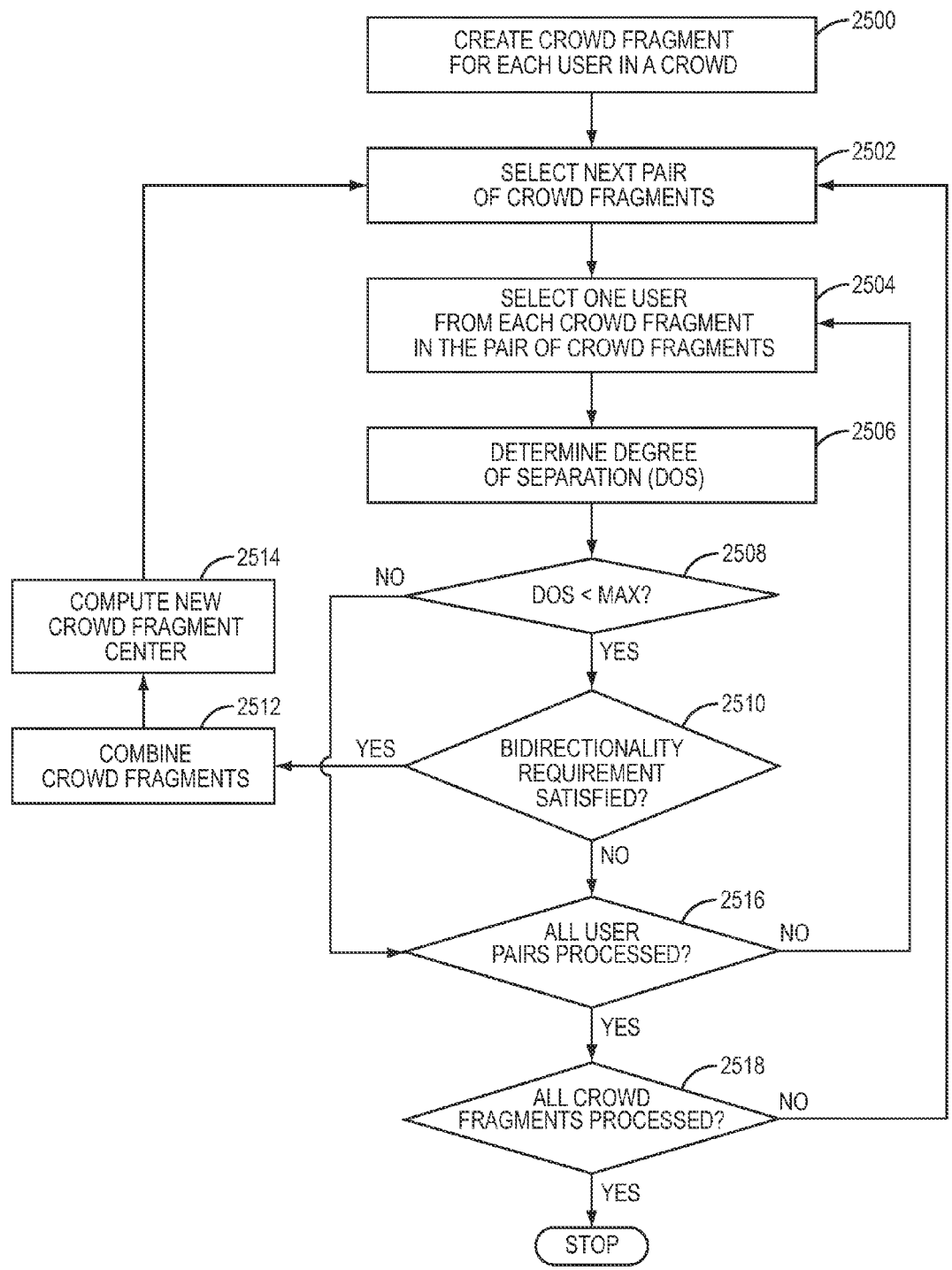
Figure 32:
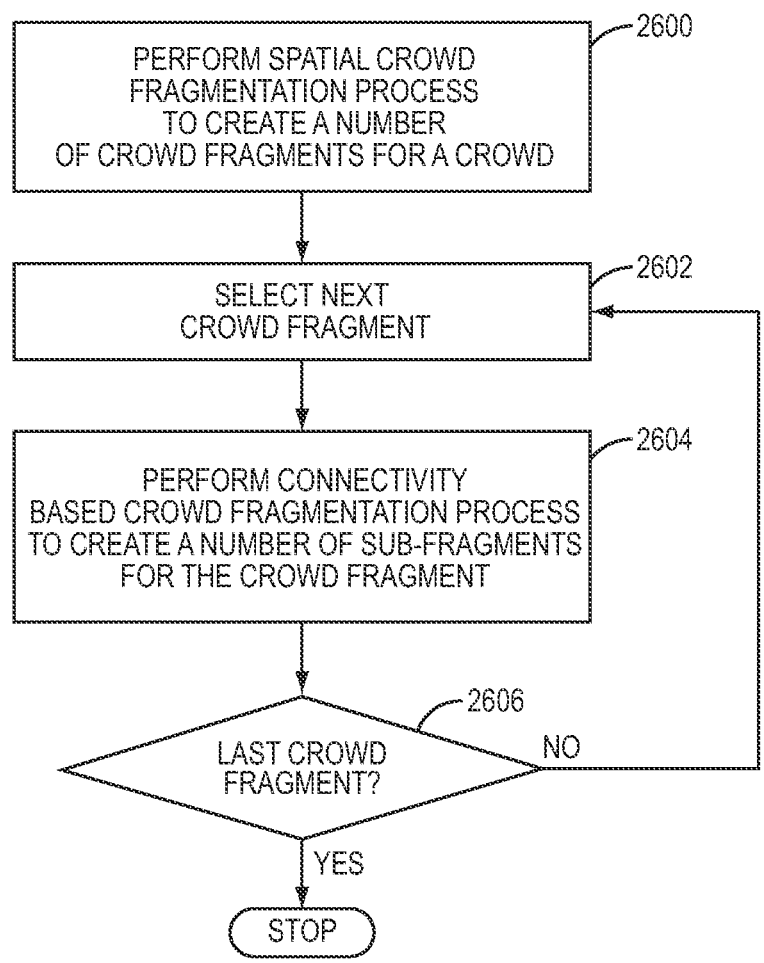
Figure 33:
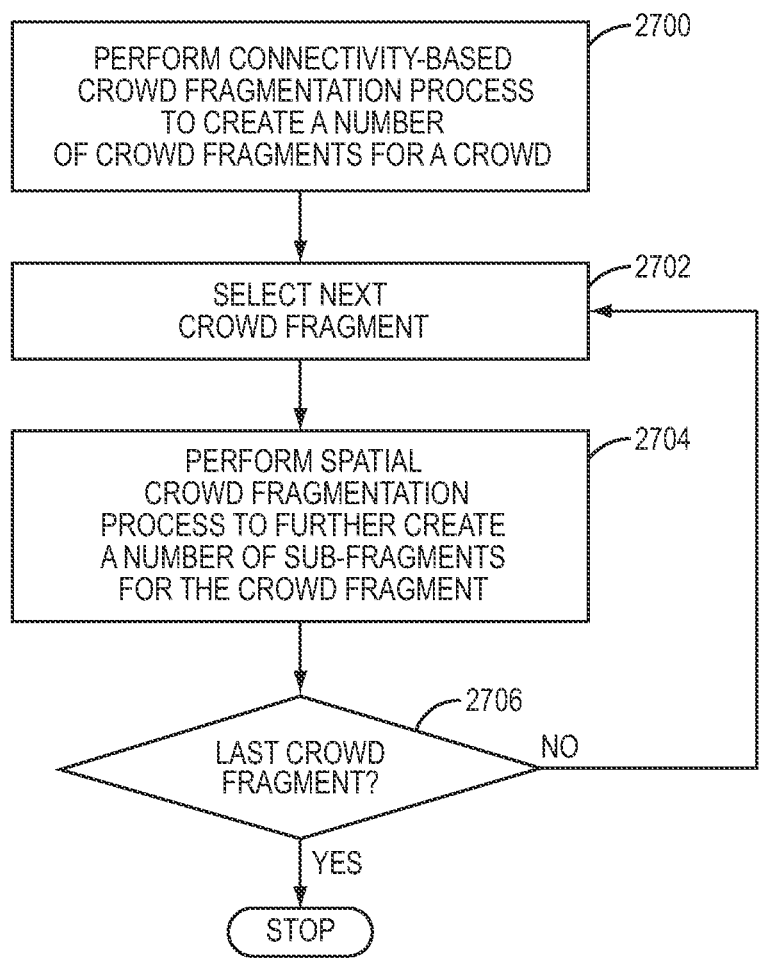
Figure 34:
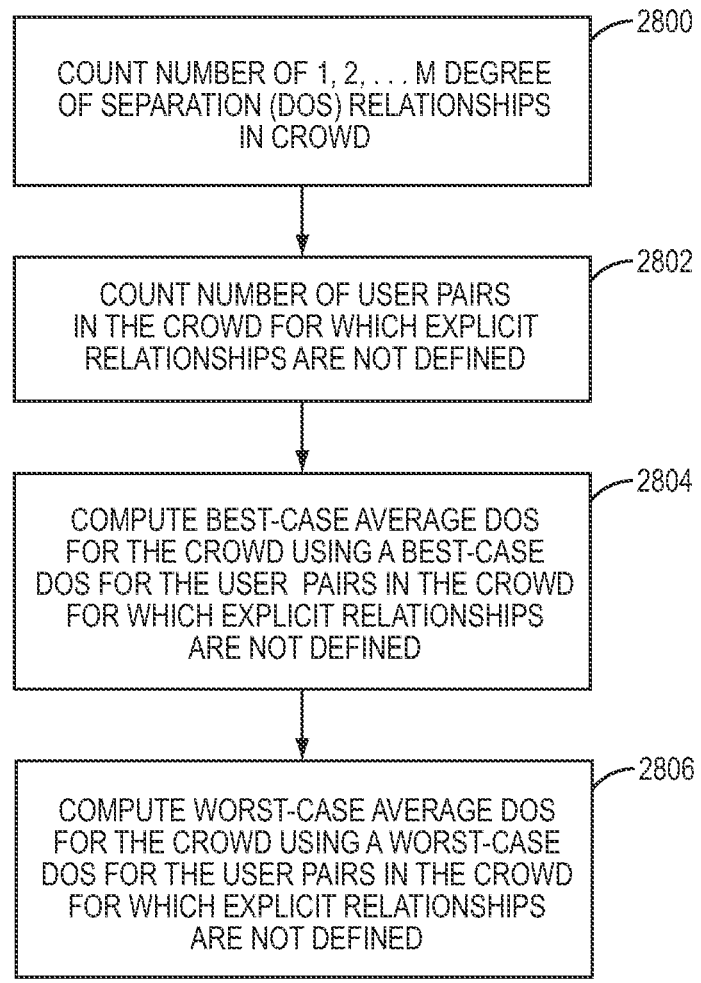
Figure 35:
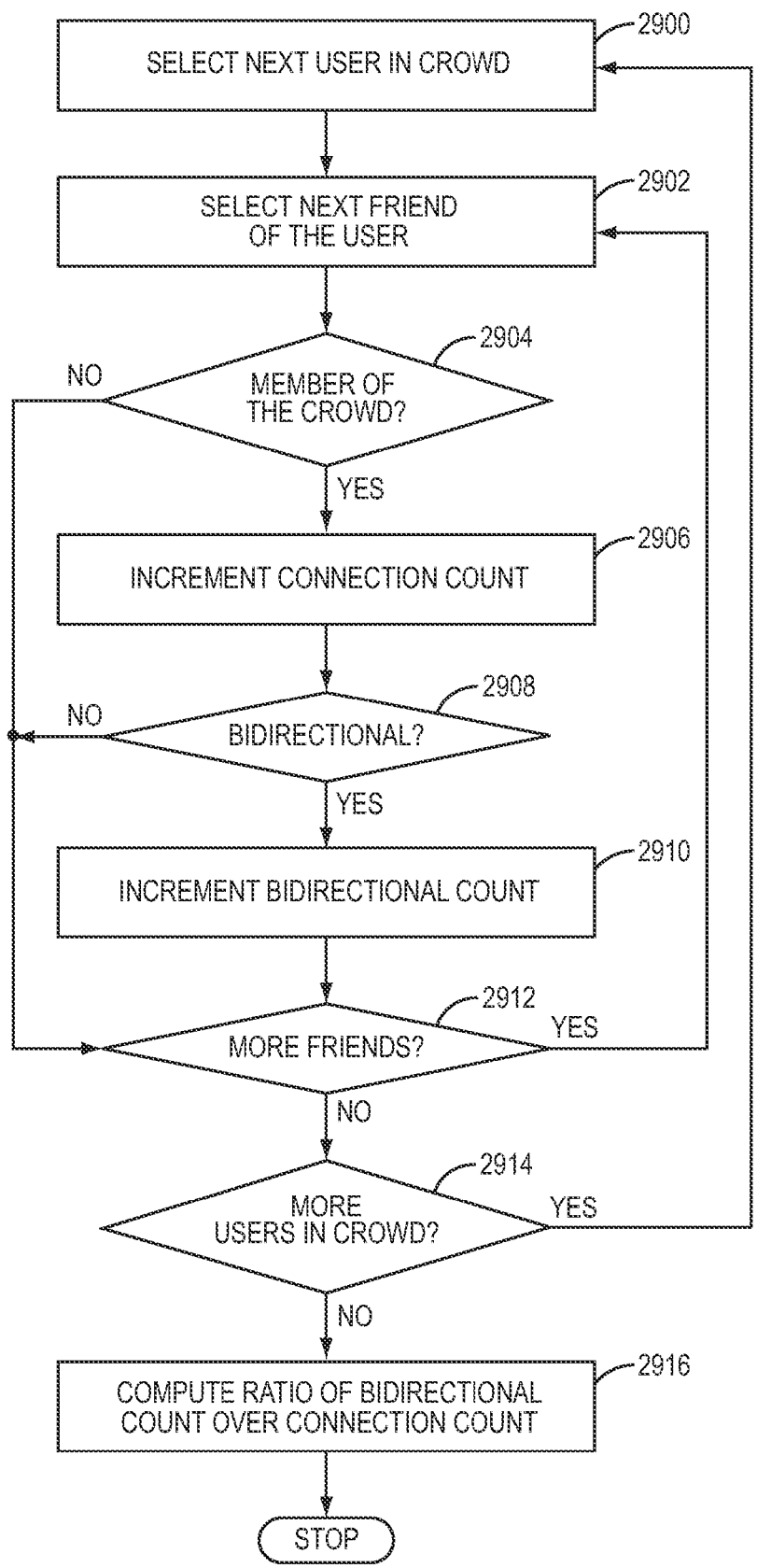
Figure 36:
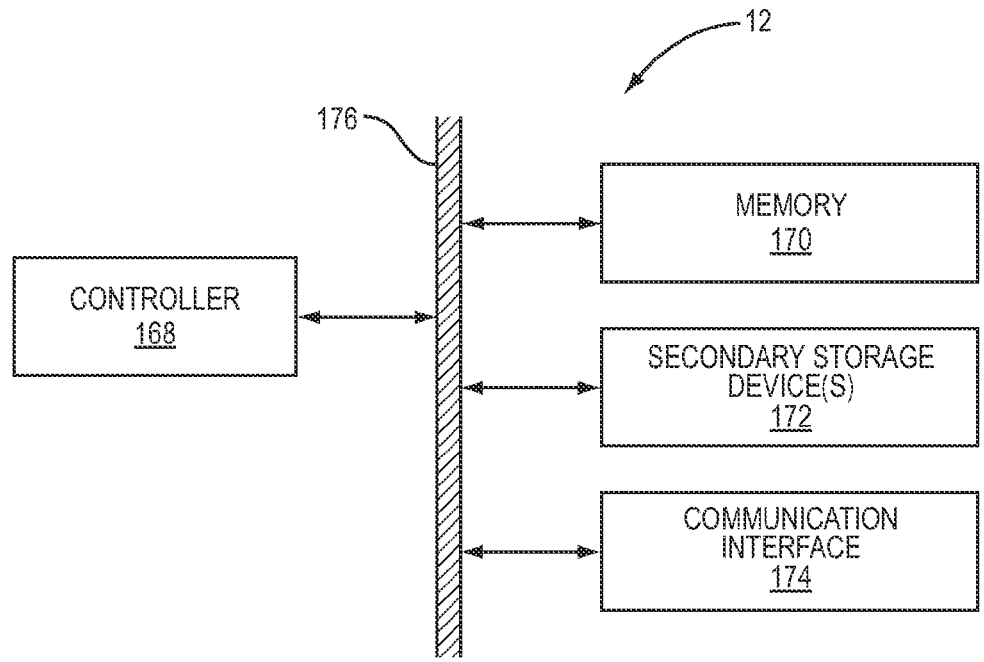
Figure 37:
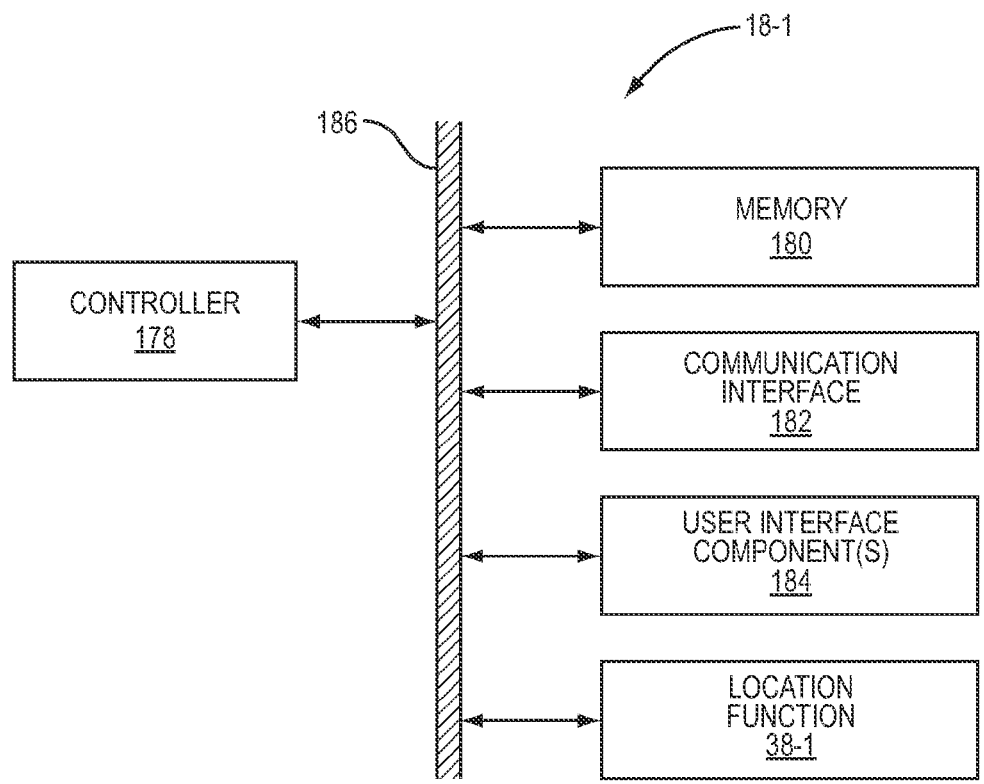
Figure 38:
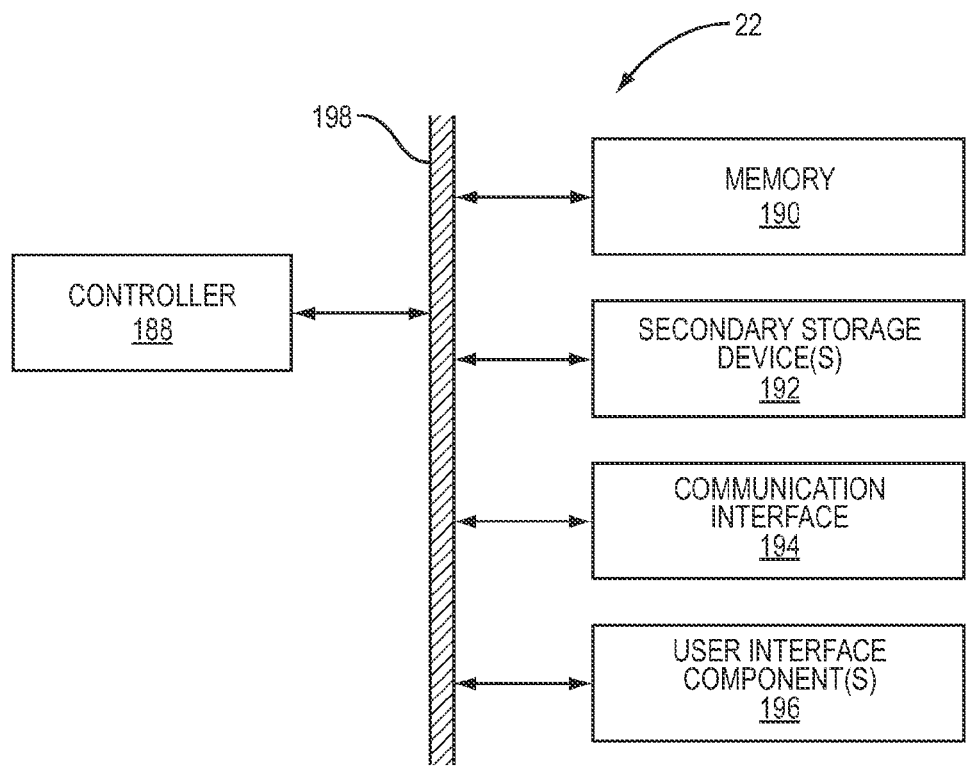
Figure 39:
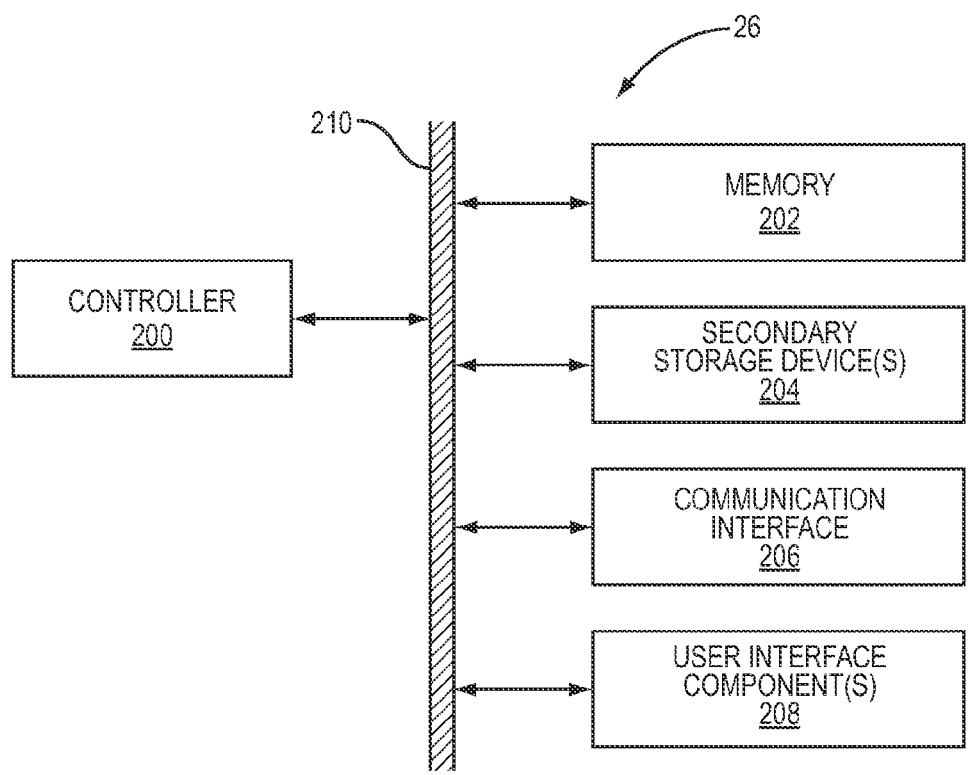

FIGS. 7A through 7D graphically illustrate the crowd formation process of FIG. 6 for an exemplary bounding box;

FIGS. 8A through 8D illustrate a flow chart for a spatial crowd formation process according to another embodiment of the present disclosure;

FIGS. 9A through 9D graphically illustrate the crowd formation process of FIGS. 8A through 8D for a scenario where the crowd formation process is triggered by a location update for a user having no old location;

FIGS. 10A through 10F graphically illustrate the crowd formation process of FIGS. 8A through 8D for a scenario where the new and old bounding boxes overlap;

FIGS. 11A through 11E graphically illustrate the crowd formation process of FIGS. 8A through 8D in a scenario where the new and old bounding boxes do not overlap;

FIG. 12 illustrates the operation the system of FIG. 1 to enable the mobile devices to request crowd data for currently formed crowds according to one embodiment of the present disclosure;

FIG. 13 illustrates exemplary data records that may be used to represent crowds, users, crowd snapshots, and anonymous users according to one embodiment of the present disclosure;

FIGS. 14A through 14D illustrate one embodiment of a spatial crowd formation process that may be used to enable crowd tracking according to one embodiment of the present disclosure;

FIG. 15 illustrates a process for creating crowd snapshots according to one embodiment of the present disclosure;

FIG. 16 graphically illustrates anonymization of a user record according to one embodiment of the present disclosure;

FIG. 17 illustrates a process that may be used to re-establish crowds and detect crowd splits according to one embodiment of the present disclosure;

FIG. 18 graphically illustrates the process of re-establishing a crowd for an exemplary crowd according to one embodiment of the present disclosure;

FIG. 19 graphically illustrates the process for capturing a crowd split for an exemplary crowd according to one embodiment of the present disclosure;

FIG. 20 graphically illustrates the merging of two exemplary pre-existing crowds according to one embodiment of the present disclosure;

FIG. 21 illustrates the operation of the MAP server of FIG. 1 to serve a request for crowd tracking data for a crowd according to one embodiment of the present disclosure;

FIG. 22 illustrates the operation of the prediction server of FIG. 1 to process a prediction request according to one embodiment of the present disclosure;

FIG. 23 illustrates the operation of the prediction server to generate a prediction basis for a user according to one embodiment of the present disclosure;

FIG. 24 is a graphical representation of a prediction basis of a user according to one embodiment of the present disclosure;

FIG. 25 illustrates the operation of the prediction server to predict future locations for a user based on the prediction basis generated for the user according to one embodiment of the present disclosure;

FIG. 26 illustrates the operation of the prediction server to process a prediction request according to another embodiment of the present disclosure in which the prediction server obtains confirmation of the predicted future locations;

FIG. 27 illustrates the operation of the MAP server of FIG. 1 to generate a degree of correlation of user profiles for a crowd according to one embodiment of the present disclosure;

FIG. 28 illustrates the operation of the MAP server of FIG. 1 to generate a degree of fragmentation of a crowd according to one embodiment of the present disclosure;

FIG. 29 graphically illustrates the process of FIG. 28 according to one embodiment of the present disclosure;

FIG. 30 illustrates the operation of the MAP server of FIG. 1 to generate a degree of fragmentation of a crowd according to another embodiment of the present disclosure;

FIG. 31 graphically illustrates the process of FIG. 30 according to one embodiment of the present disclosure;

FIG. 32 illustrates the operation of the MAP server of FIG. 1 to generate a degree of fragmentation of a crowd according to yet another embodiment of the present disclosure;

FIG. 33 illustrates the operation of the MAP server of FIG. 1 to generate a degree of fragmentation of a crowd according to yet another embodiment of the present disclosure;

FIG. 34 illustrates the operation of the MAP server of FIG. 1 to generate best-case average Degree of Separation (DOS) and a worst-base average DOS for a crowd according to one embodiment of the present disclosure;

FIG. 35 illustrates the operation of the MAP server of FIG. 1 to generate a degree of bidirectionality of relationships for a crowd according to one embodiment of the present disclosure;

FIG. 36 is a block diagram of the MAP server of FIG. 1 according to one embodiment of the present disclosure;

FIG. 37 is a block diagram of one of the mobile devices of FIG. 1 according to one embodiment of the present disclosure;

FIG. 38 is a block diagram of the subscriber device of FIG. 1 according to one embodiment of the present disclosure; and FIG. 39 is a block diagram of the prediction server of FIG. 1 according to one embodiment of the present disclosure.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

A system and method for predicting a future location of a user are provided. In general, a prediction basis including crowd data describing crowds in which a user was included during a number of reoccurring time windows is generated. Each reoccurring time window may be, for example, a day of the week (i.e., Monday, Tuesday, Wednesday, Thursday, Friday, Saturday, or Sunday), a portion of a day of the week (e.g., Monday Morning, Monday Afternoon, Monday Evening, Tuesday Evening, etc.), a day of the month (e.g., 1st day of the month), a day of the year (e.g., March 25th), or the like. The prediction basis of the user is then used to predict one or more future locations of the user.

FIG. 1 illustrates a system 10 that predicts a future location of a user according to one embodiment of the present disclosure. In this embodiment, the system 10 includes a Mobile Aggregate Profile (MAP) server 12, one or more profile servers 14, a location server 16, a number of mobile devices 18-1 through 18-N having associated users 20-1 through 20-N, a subscriber device 22 having an associated subscriber 24, a prediction server 26, and a prediction-consuming application 28 communicatively coupled via a network 30. The network 30 may be any type of network or any combination of networks. Specifically, the network 30 may include wired components, wireless components, or both wired and wireless components. In one exemplary embodiment, the network 30 is a distributed public network such as the Internet, where the mobile devices 18-1 through 18-N are enabled to connect to the network 30 via local wireless connections (e.g., WiFi or IEEE 802.11 connections) or wireless telecommunications connections (e.g., 3G or 4G telecommunications connections such as GSM, LTE, W-CDMA, or WiMAX connections). Before proceeding, it should be noted that, for the following discussion, the prediction server 26 is said to predict future locations. However, it should be appreciated that the predicted future locations may also be used as recommended future locations for the corresponding users.

As discussed below in detail, the MAP server 12 operates to obtain current locations, including location updates, and user profiles of the users 20-1 through 20-N of the mobile devices 18-1 through 18-N. The current locations of the users 20-1 through 20-N can be expressed as positional geographic coordinates such as latitude-longitude pairs, and a height vector (if applicable), or any other similar information capable of identifying a given physical point in space in a two-dimensional or three-dimensional coordinate system. Using the current locations and user profiles of the users 20-1 through 20-N, the MAP server 12 is enabled to provide a number of features such as, but not limited to, maintaining a historical record of anonymized user profile data by location, generating aggregate profile data over time for a Point of Interest (POI) or Area of Interest (AOI) using the historical record of anonymized user profile data, identifying crowds of users using current locations and/or user profiles of the users 20-1 through 20-N, generating aggregate profiles for crowds of users at a POI or in an AOI using the current user profiles of users in the crowds, and crowd tracking. While not essential, for additional information regarding the MAP server 12, the interested reader is directed to U.S. patent application Ser. No. 12/645,535 entitled MAINTAINING A HISTORICAL RECORD OF ANONYMIZED USER PROFILE DATA BY LOCATION FOR USERS IN A MOBILE ENVIRONMENT, U.S. patent application Ser. No. 12/645,532 entitled FORMING CROWDS AND PROVIDING ACCESS TO CROWD DATA IN A MOBILE ENVIRONMENT, U.S. patent application Ser. No. 12/645,539 entitled ANONYMOUS CROWD TRACKING, U.S. patent application Ser. No. 12/645,544 entitled MODIFYING A USER'S CONTRIBUTION TO AN AGGREGATE PROFILE BASED ON TIME BETWEEN LOCATION UPDATES AND EXTERNAL EVENTS, U.S. patent application Ser. No. 12/645,546 entitled CROWD FORMATION FOR MOBILE DEVICE USERS, U.S. patent application Ser. No. 12/645,556 entitled SERVING A REQUEST FOR DATA FROM A HISTORICAL RECORD OF ANONYMIZED USER PROFILE DATA IN A MOBILE ENVIRONMENT, and U.S. patent application Ser. No. 12/645,560 entitled HANDLING CROWD REQUESTS FOR LARGE GEOGRAPHIC AREAS, all of which were filed on Dec. 23, 2009 and are hereby incorporated herein by reference in their entireties. Note that while the MAP server 12 is illustrated as a single server for simplicity and ease of discussion, it should be appreciated that the MAP server 12 may be implemented as a single physical server or multiple physical servers operating in a collaborative manner for purposes of redundancy and/or load sharing.

In general, the one or more profile servers 14 operate to store user profiles for a number of persons including the users 20-1 through 20-N of the mobile devices 18-1 through 18-N. For example, the one or more profile servers 14 may be servers providing social network services such as the Facebook® social networking service, the MySpace® social networking service, the LinkedIN® social networking service, and/or the like. As discussed below, using the one or more profile servers 14, the MAP server 12 is enabled to directly or indirectly obtain the user profiles of the users 20-1 through 20-N of the mobile devices 18-1 through 18-N. The location server 16 generally operates to receive location updates from the mobile devices 18-1 through 18-N and make the location updates available to entities such as, for instance, the MAP server 12. In one exemplary embodiment, the location server 16 is a server operating to provide Yahoo!'s FireEagle service. Before proceeding, it should be noted that while the system 10 of FIG. 1 illustrates an embodiment where the one or more profile servers 14 and the location server 16 are separate from the MAP server 12, the present disclosure is not limited thereto. In an alternative embodiment, the functionality of the one or more profile servers 14 and/or the location server 16 may be implemented within the MAP server 12.

The mobile devices 18-1 through 18-N may be mobile smart phones, portable media player devices, mobile gaming devices, or the like. Some exemplary mobile devices that may be programmed or otherwise configured to operate as the mobile devices 18-1 through 18-N are the Apple® iPhone, the Palm Pre, the Samsung Rogue, the Blackberry Storm, and the Apple® iPod Touch® device. However, this list of exemplary mobile devices is not exhaustive and is not intended to limit the scope of the present disclosure. The mobile devices 18-1 through 18-N include MAP clients 32-1 through 32-N, MAP applications 34-1 through 34-N, third-party applications 36-1 through 36-N, and location functions 38-1 through 38-N, respectively. Using the mobile device 18-1 as an example, the MAP client 32-1 is preferably implemented in software. In general, in the preferred embodiment, the MAP client 32-1 is a middleware layer operating to interface an application layer (i.e., the MAP application 34-1 and the third-party applications 36-1) to the MAP server 12. More specifically, the MAP client 32-1 enables the MAP application 34-1 and the third-party applications 36-1 to request and receive data from the MAP server 12. It should be noted that the functionality of the MAP client 32-1 may alternatively be implemented within the MAP application 34-1 and the third-party applications 36-1.

The MAP application 34-1 is also preferably implemented in software. The MAP application 34-1 generally provides a user interface component between the user 20-1 and the MAP server 12. More specifically, among other things, the MAP application 34-1 enables the user 20-1 to initiate crowd requests for crowd data (e.g., aggregate profile data and/or crowd characteristics data) from the MAP server 12 for a POI or AOI and to view the corresponding crowd data received from the MAP server 12. The MAP application 34-1 also enables the user 20-1 to configure various settings. For example, the MAP application 34-1 may enable the user 20-1 to select a desired social networking service (e.g., Facebook, MySpace, LinkedIN, etc.) from which to obtain the user profile of the user 20-1 and provide any necessary credentials (e.g., username and password) needed to access the user profile from the social networking service.

The third-party applications 36-1 are preferably implemented in software. The third-party applications 36-1 operate to access the MAP server 12 via the MAP client 32-1. The third-party applications 36-1 may utilize data obtained from the MAP server 12 in any desired manner. As an example, one of the third-party applications 36-1 may be a gaming application that utilizes historical aggregate profile data to notify the user 20-1 of POIs or AOIs where persons having an interest in the game have historically congregated. The location function 38-1 may be implemented in hardware, software, or a combination thereof. In general, the location function 38-1 operates to determine or otherwise obtain the location of the mobile device 18-1. For example, the location function 38-1 may be or include a Global Positioning System (GPS) receiver.

The subscriber device 22 is a physical device such as a personal computer, a mobile computer (e.g., a notebook computer, a netbook computer, a tablet computer, etc.), a mobile smart phone, or the like. The subscriber 24 associated with the subscriber device 22 is a person or entity. In general, the subscriber device 22 enables the subscriber 24 to access the MAP server 12 via a web browser 40 to obtain various types of data, preferably for a fee. For example, the subscriber 24 may pay a fee to have access to historical aggregate profile data for one or more POIs and/or one or more AOIs, pay a fee to have access to crowd data such as aggregate profiles for crowds located at one or more POIs and/or located in one or more AOIs, pay a fee to track crowds, or the like. Note that the web browser 40 is exemplary. In another embodiment, the subscriber device 22 is enabled to access the MAP server 12 via a custom application.

The prediction server 26 is preferably a physical server that operates to predict future locations of one or more of the users 20-1 through 20-N. Preferably, the prediction server 26 hosts one or more software applications that control the prediction server 26 to perform the functions described herein. In an alternative embodiment, the functionality of the prediction server 26 may be implemented within the MAP server 12. In general, the prediction server 26 monitors crowd data for the users 20-1 through 20-N during a number of reoccurring time windows to generate a prediction basis for each of the users 20-1 through 20-N. Each reoccurring time window is a time window of a defined duration that reoccurs periodically. For instance, each reoccurring time window may repeat daily, weekly, bi-weekly, monthly, yearly, or the like. For example, each reoccurring time window may be a day of the week (e.g., Monday, Tuesday, Wednesday, Thursday, Friday, Saturday, or Sunday), a portion of a day of the week (e.g., Monday Morning, Monday Afternoon, Monday Evening, Tuesday Morning, Tuesday Afternoon, Tuesday evening, etc.), a day of the month (e.g., 1st day of the month), a day of the year (e.g., March 25th), or the like. Note that the preceding examples are not intended to limit the scope of the present disclosure. The reoccurring time windows may be of any desired duration and reoccur at any desired period.

Using the user 20-1 as an example, the prediction server 26 obtains crowd data for the user 20-1 from the MAP server 12 in order to generate a prediction basis for the user 20-1 that includes crowd data for a number of instances of each of the reoccurring time windows. For example, if one of the reoccurring time windows is Monday, then the prediction basis for the user 20-1 is generated to include crowd data for a crowd in which the user 20-1 is or was included for each of a number of Mondays (i.e., crowd data for each of a number of instances of the reoccurring Monday time window). Thereafter, the prediction server 26 predicts future locations of the user 20-1 using the prediction basis of the user 20-1 and additional crowd data from the MAP server 12, as is described below in detail.

Lastly, the prediction-consuming application 28 is a software application that may be implemented on a third-party server (not shown). Alternatively, the prediction-consuming application 28 may be implemented as one of the third-party applications 36-1 through 36-N or as an application hosted by the subscriber device 22. In general, the prediction-consuming application 28 operates to request predicted location for one or more of the users 20-1 through 20-N from the prediction server 26. Using the user 20-1 as an example, in response to a request for future locations of the user 20-1, the prediction server 26 generates one or more predicted locations for the user 20-1 based on the prediction basis of the user 20-1 and returns the predicted locations to the prediction-consuming application 28. The prediction-consuming application 28 may then utilize the predicted locations. The manner in which the prediction-consuming application 28 utilizes the predicted locations may vary depending on the particular implementation. For example, the prediction-consuming application 28 may utilize the predicted locations to generate targeted advertisements for the user 20-1.

The focus of the present disclosure is the prediction server 26 and manner in which the prediction server 26 predicts future locations of one or more of the users 20-1 through 20-N. However, before describing the prediction server 26 and the operation thereof in detail, a discussion of some of the functions provided by the MAP server 12 are beneficial. As such, FIGS. 2-21 describe some functions of the MAP server 12 that may be utilized when predicting future locations.

Figure 2:
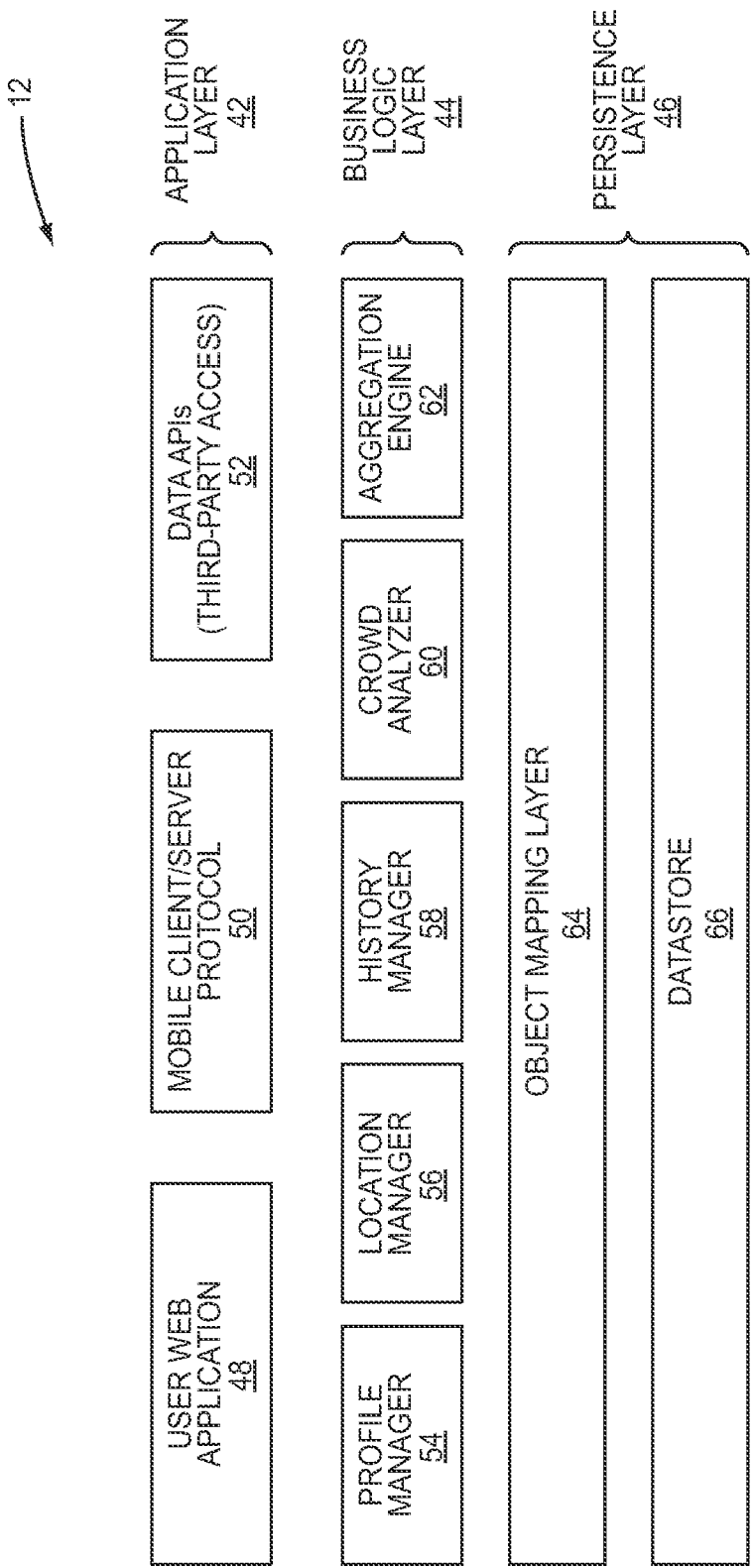
FIG. 2 is a block diagram of the MAP server of FIG. 1 according to one embodiment of the present disclosure.

FIG. 2 is a block diagram of the MAP server 12 of FIG. 1 according to one embodiment of the present disclosure. As illustrated, the MAP server 12 includes an application layer 42, a business logic layer 44, and a persistence layer 46. The application layer 42 includes a user web application 48, a mobile client/server protocol component 50, and one or more data Application Programming Interfaces (APIs) 52. The user web application 48 is preferably implemented in software and operates to provide a web interface for users, such as the subscriber 24, to access the MAP server 12 via a web browser. The mobile client/server protocol component 50 is preferably implemented in software and operates to provide an interface between the MAP server 12 and the MAP clients 32-1 through 32-N hosted by the mobile devices 18-1 through 18-N. The data APIs 52 enable third-party services, such as the prediction server 26, to access the MAP server 12.

The business logic layer 44 includes a profile manager 54, a location manager 56, a history manager 58, a crowd analyzer 60, and an aggregation engine 62, each of which is preferably implemented in software. The profile manager 54 generally operates to obtain the user profiles of the users 20-1 through 20-N directly or indirectly from the one or more profile servers 14 and store the user profiles in the persistence layer 46. The location manager 56 operates to obtain the current locations of the users 20-1 through 20-N including location updates. As discussed below, the current locations of the users 20-1 through 20-N may be obtained directly from the mobile devices 18-1 through 18-N and/or obtained from the location server 16. The history manager 58 generally operates to maintain a historical record of anonymized user profile data by location.

The crowd analyzer 60 operates to form crowds of users. In one embodiment, the crowd analyzer 60 utilizes a spatial crowd formation algorithm. However, the present disclosure is not limited thereto. In addition, the crowd analyzer 60 further characterize crowds to reflect, for example, degree of fragmentation, best-case and worst-case degree of separation (DOS), and/or degree of bi-directionality, as discussed below in more detail. Still further, the crowd analyzer 60 may also operate to track crowds. The aggregation engine 62 generally operates to provide aggregate profile data in response to requests from the mobile devices 18-1 through 18-N and the subscriber device 22. The aggregate profile data may be historical aggregate profile data for one or more POIs or one or more AOIs or aggregate profile data for crowd(s) currently at one or more POIs or within one or more AOIs.

The persistence layer 46 includes an object mapping layer 64 and a datastore 66. The object mapping layer 64 is preferably implemented in software. The datastore 66 is preferably a relational database, which is implemented in a combination of hardware (i.e., physical data storage hardware) and software (i.e., relational database software). In this embodiment, the business logic layer 44 is implemented in an object-oriented programming language such as, for example, Java. As such, the object mapping layer 64 operates to map objects used in the business logic layer 44 to relational database entities stored in the datastore 66. Note that, in one embodiment, data is stored in the datastore 66 in a Resource Description Framework (RDF) compatible format.

In an alternative embodiment, rather than being a relational database, the datastore 66 may be implemented as an RDF datastore. More specifically, the RDF datastore may be compatible with RDF technology adopted by Semantic Web activities. Namely, the RDF datastore may use the Friend-Of-A-Friend (FOAF) vocabulary for describing people, their social networks, and their interests. In this embodiment, the MAP server 12 may be designed to accept raw FOAF files describing persons, their friends, and their interests. These FOAF files are currently output by some social networking services such as Livejournal and Facebook. The MAP server 12 may then persist RDF descriptions of the users 20-1 through 20-N as a proprietary extension of the FOAF vocabulary that includes additional properties desired for the system 10.

Figure 3:
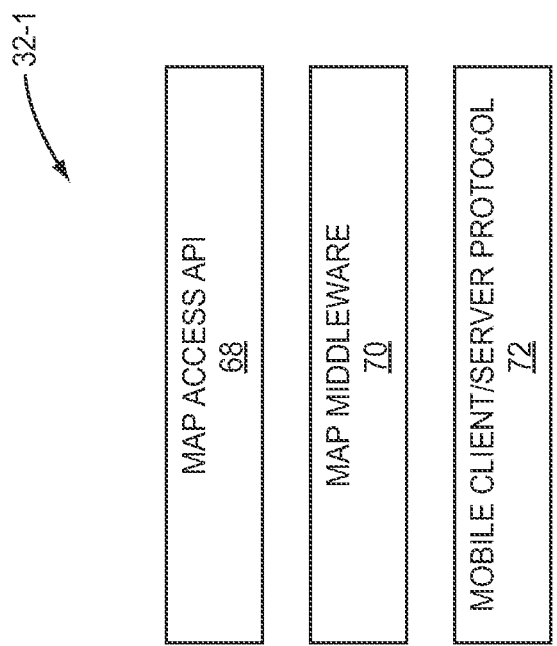
FIG. 3 is a block diagram of the MAP client of one of the mobile devices of FIG. 1 according to one embodiment of the present disclosure.

FIG. 3 illustrates the MAP client 32-1 of FIG. 1 in more detail according to one embodiment of the present disclosure. This discussion is equally applicable to the other MAP clients 32-2 through 32-N. As illustrated, in this embodiment, the MAP client 32-1 includes a MAP access API 68, a MAP middleware component 70, and a mobile client/server protocol component 72. The MAP access API 68 is implemented in software and provides an interface by which the MAP client 32-1 and the third-party applications 36-1 are enabled to access the MAP server 12. The MAP middleware component 70 is implemented in software and performs the operations needed for the MAP client 32-1 to operate as an interface between the MAP application 34-1 and the third-party applications 36-1 at the mobile device 18-1 and the MAP server 12. The mobile client/server protocol component 72 enables communication between the MAP client 32-1 and the MAP server 12 via a defined protocol.

Figure 4:
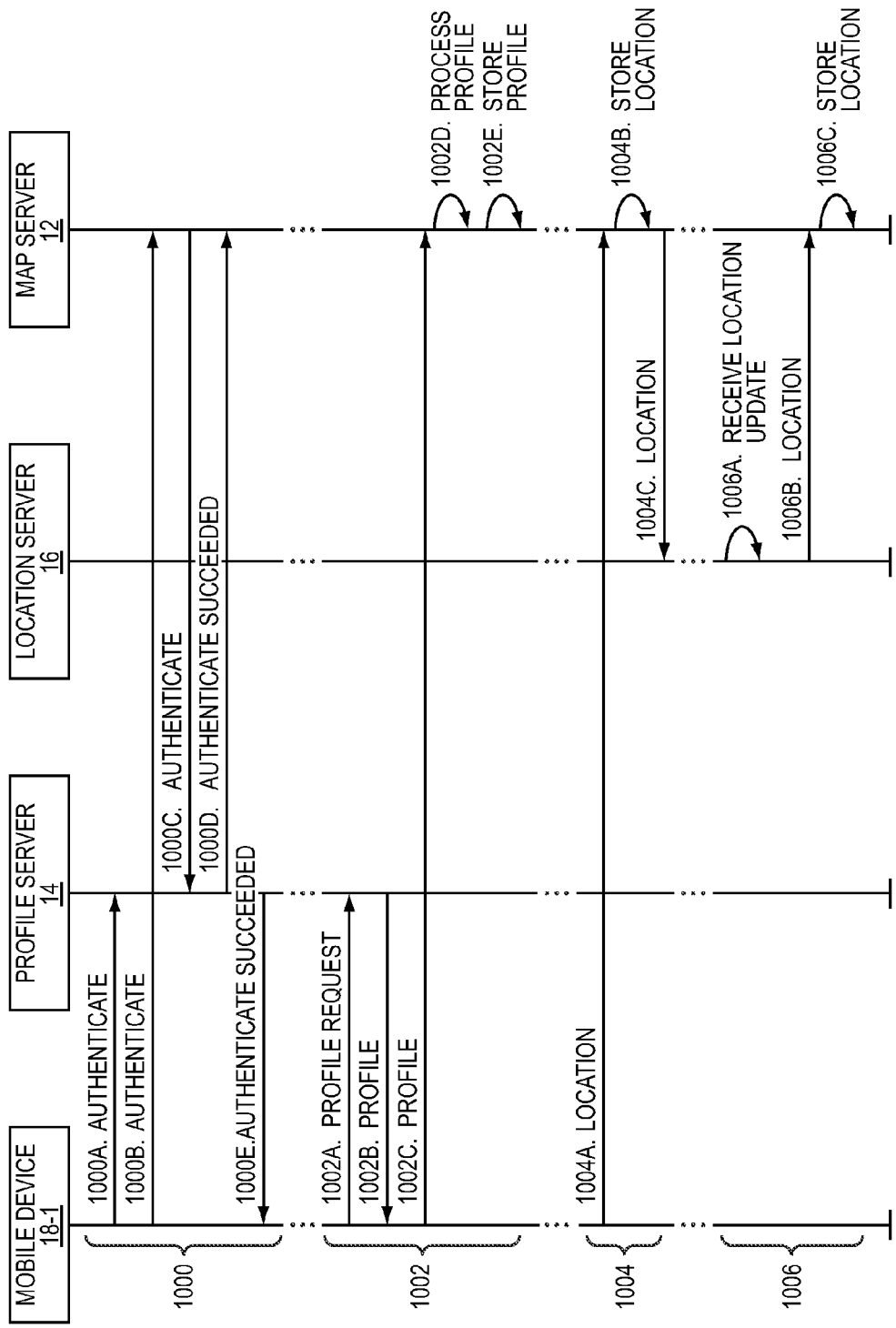
FIG. 4 illustrates the operation of the system of FIG. 1 to provide user profiles and current locations of the users of the mobile devices to the MAP server according to one embodiment of the present disclosure.

FIG. 4 illustrates the operation of the system 10 of FIG. 1 to provide the user profile of the user 20-1 of the mobile device 18-1 to the MAP server 12 according to one embodiment of the present disclosure. This discussion is equally applicable to user profiles of the other users 20-2 through 20-N of the other mobile devices 18-2 through 18-N. First, an authentication process is performed (step 1000). For authentication, in this embodiment, the mobile device 18-1 authenticates with the profile server 14 (step 1000A) and the MAP server 12 (step 1000B). In addition, the MAP server 12 authenticates with the profile server 14 (step 1000C). Preferably, authentication is performed using OpenID or similar technology. However, authentication may alternatively be performed using separate credentials (e.g., username and password) of the user 20-1 for access to the MAP server 12 and the profile server 14. Assuming that authentication is successful, the profile server 14 returns an authentication succeeded message to the MAP server 12 (step 1000D), and the profile server 14 returns an authentication succeeded message to the MAP client 32-1 of the mobile device 18-1 (step 1000E).

At some point after authentication is complete, a user profile process is performed such that a user profile of the user 20-1 is obtained from the profile server 14 and delivered to the MAP server 12 (step 1002). In this embodiment, the MAP client 32-1 of the mobile device 18-1 sends a profile request to the profile server 14 (step 1002A). In response, the profile server 14 returns the user profile of the user 20-1 to the mobile device 18-1 (step 1002B). The MAP client 32-1 of the mobile device 18-1 then sends the user profile of the user 20-1 to the MAP server 12 (step 1002C). Note that while in this embodiment the MAP client 32-1 sends the complete user profile of the user 20-1 to the MAP server 12, in an alternative embodiment, the MAP client 32-1 may filter the user profile of the user 20-1 according to criteria specified by the user 20-1. For example, the user profile of the user 20-1 may include demographic information, general interests, music interests, and movie interests, and the user 20-1 may specify that the demographic information or some subset thereof is to be filtered, or removed, before sending the user profile to the MAP server 12.

Upon receiving the user profile of the user 20-1 from the MAP client 32-1 of the mobile device 18-1, the profile manager 54 of the MAP server 12 processes the user profile (step 1002D). More specifically, in the preferred embodiment, the profile manager 54 includes social network handlers for the social network services supported by the MAP server 12. Thus, for example, if the MAP server 12 supports user profiles from Facebook, MySpace, and LinkedIN, the profile manager 54 may include a Facebook handler, a MySpace handler, and a LinkedIN handler. The social network handlers process user profiles to generate user profiles for the MAP server 12 that include lists of keywords for each of a number of profile categories. The profile categories may be the same for each of the social network handlers or different for each of the social network handlers. Thus, for this example assume that the user profile of the user 20-1 is from Facebook. The profile manager 54 uses a Facebook handler to process the user profile of the user 20-1 to map the user profile of the user 20-1 from Facebook to a user profile for the MAP server 12 including lists of keywords for a number of predefined profile categories. For example, for the Facebook handler, the profile categories may be a demographic profile category, a social interaction profile category, a general interests profile category, a music interests profile category, and a movie interests profile category. As such, the user profile of the user 20-1 from Facebook may be processed by the Facebook handler of the profile manager 54 to create a list of keywords such as, for example, liberal, High School Graduate, 35-44, College Graduate, etc. for the demographic profile category, a list of keywords such as Seeking Friendship for the social interaction profile category, a list of keywords such as politics, technology, photography, books, etc. for the general interests profile category, a list of keywords including music genres, artist names, album names, or the like for the music interests profile category, and a list of keywords including movie titles, actor or actress names, director names, move genres, or the like for the movie interests profile category. In one embodiment, the profile manager 54 may use natural language processing or semantic analysis. For example, if the Facebook user profile of the user 20-1 states that the user 20-1 is 20 years old, semantic analysis may result in the keyword of 18-24 years old being stored in the user profile of the user 20-1 for the MAP server 12.

After processing the user profile of the user 20-1, the profile manager 54 of the MAP server 12 stores the resulting user profile for the user 20-1 (step 1002E). More specifically, in one embodiment, the MAP server 12 stores user records for the users 20-1 through 20-N in the datastore 66 (FIG. 2). The user profile of the user 20-1 is stored in the user record of the user 20-1. The user record of the user 20-1 includes a unique identifier of the user 20-1, the user profile of the user 20-1, and, as discussed below, a current location of the user 20-1. Note that the user profile of the user 20-1 may be updated as desired. For example, in one embodiment, the user profile of the user 20-1 is updated by repeating step 1002 each time the user 20-1 activates the MAP application 34-1.

Note that while the discussion herein focuses on an embodiment where the user profiles of the users 20-1 through 20-N are obtained from the one or more profile servers 14, the user profiles of the users 20-1 through 20-N may be obtained in any desired manner. For example, in one alternative embodiment, the user 20-1 may identify one or more favorite websites. The profile manager 54 of the MAP server 12 may then crawl the one or more favorite websites of the user 20-1 to obtain keywords appearing in the one or more favorite websites of the user 20-1. These keywords may then be stored as the user profile of the user 20-1.

At some point, a process is performed such that a current location of the mobile device 18-1 and thus a current location of the user 20-1 is obtained by the MAP server 12 (step 1004). In this embodiment, the MAP application 34-1 of the mobile device 18-1 obtains the current location of the mobile device 18-1 from the location function 38-1 of the mobile device 18-1. The MAP application 34-1 then provides the current location of the mobile device 18-1 to the MAP client 32-1, and the MAP client 32-1 then provides the current location of the mobile device 18-1 to the MAP server 12 (step 1004A). Note that step 1004A may be repeated periodically or in response to a change in the current location of the mobile device 18-1 in order for the MAP application 34-1 to provide location updates for the user 20-1 to the MAP server 12.

In response to receiving the current location of the mobile device 18-1, the location manager 56 of the MAP server 12 stores the current location of the mobile device 18-1 as the current location of the user 20-1 (step 1004B). More specifically, in one embodiment, the current location of the user 20-1 is stored in the user record of the user 20-1 maintained in the datastore 66 of the MAP server 12. In the preferred embodiment, only the current location of the user 20-1 is stored in the user record of the user 20-1. In this manner, the MAP server 12 maintains privacy for the user 20-1 since the MAP server 12 does not maintain a historical record of the location of the user 20-1. In this manner, privacy of the users 20-1 through 20-N is maintained.

In addition to storing the current location of the user 20-1, the location manager 56 sends the current location of the user 20-1 to the location server 16 (step 1004C). In this embodiment, by providing location updates to the location server 16, the MAP server 12 in return receives location updates for the user 20-1 from the location server 16. This is particularly beneficial when the mobile device 18-1 does not permit background processes, which is the case for the Apple® iPhone. As such, if the mobile device 18-1 is an Apple® iPhone or similar device that does not permit background processes, the MAP application 34-1 will not be able to provide location updates for the user 20-1 to the MAP server 12 unless the MAP application 34-1 is active.

Therefore, when the MAP application 34-1 is not active, other applications running on the mobile device 18-1 (or some other device of the user 20-1) may directly or indirectly provide location updates to the location server 16 for the user 20-1. This is illustrated in step 1006 where the location server 16 receives a location update for the user 20-1 directly or indirectly from another application running on the mobile device 18-1 or an application running on another device of the user 20-1 (step 1006A). The location server 16 then provides the location update for the user 20-1 to the MAP server 12 (step 1006B). In response, the location manager 56 updates and stores the current location of the user 20-1 in the user record of the user 20-1 (step 1006C). In this manner, the MAP server 12 is enabled to obtain location updates for the user 20-1 even when the MAP application 34-1 is not active at the mobile device 18-1.

Figure 5:
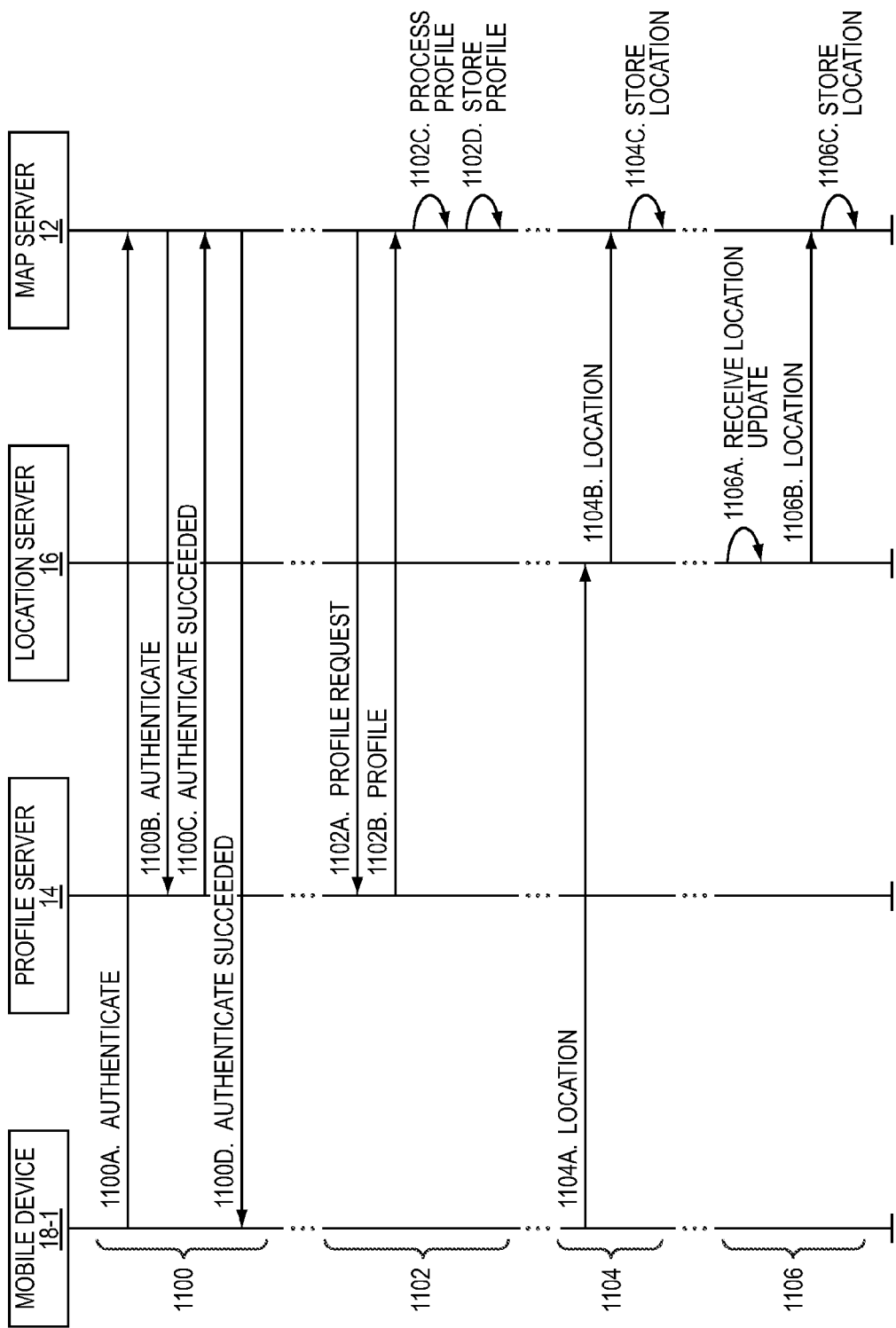
FIG. 5 illustrates the operation of the system of FIG. 1 to provide user profiles and current locations of the users of the mobile devices to the MAP server according to another embodiment of the present disclosure.

FIG. 5 illustrates the operation of the system 10 of FIG. 1 to provide the user profile of the user 20-1 of the mobile device 18-1 according to another embodiment of the present disclosure. This discussion is equally applicable to user profiles of the other users 20-2 through 20-N of the other mobile devices 18-2 through 18-N. First, an authentication process is performed (step 1100). For authentication, in this embodiment, the mobile device 18-1 authenticates with the MAP server 12 (step 1100A), and the MAP server 12 authenticates with the profile server 14 (step 1100B). Preferably, authentication is performed using OpenID or similar technology. However, authentication may alternatively be performed using separate credentials (e.g., username and password) of the user 20-1 for access to the MAP server 12 and the profile server 14. Assuming that authentication is successful, the profile server 14 returns an authentication succeeded message to the MAP server 12 (step 1100C), and the MAP server 12 returns an authentication succeeded message to the MAP client 32-1 of the mobile device 18-1 (step 1100D).

At some point after authentication is complete, a user profile process is performed such that a user profile of the user 20-1 is obtained from the profile server 14 and delivered to the MAP server 12 (step 1102). In this embodiment, the profile manager 54 of the MAP server 12 sends a profile request to the profile server 14 (step 1102A). In response, the profile server 14 returns the user profile of the user 20-1 to the profile manager 54 of the MAP server 12 (step 1102B). Note that while in this embodiment the profile server 14 returns the complete user profile of the user 20-1 to the MAP server 12, in an alternative embodiment, the profile server 14 may return a filtered version of the user profile of the user 20-1 to the MAP server 12. The profile server 14 may filter the user profile of the user 20-1 according to criteria specified by the user 20-1. For example, the user profile of the user 20-1 may include demographic information, general interests, music interests, and movie interests, and the user 20-1 may specify that the demographic information or some subset thereof is to be filtered, or removed, before sending the user profile to the MAP server 12.

Upon receiving the user profile of the user 20-1, the profile manager 54 of the MAP server 12 processes to the user profile (step 1102C). More specifically, as discussed above, in the preferred embodiment, the profile manager 54 includes social network handlers for the social network services supported by the MAP server 12. The social network handlers process user profiles to generate user profiles for the MAP server 12 that include lists of keywords for each of a number of profile categories. The profile categories may be the same for each of the social network handlers or different for each of the social network handlers.

After processing the user profile of the user 20-1, the profile manager 54 of the MAP server 12 stores the resulting user profile for the user 20-1 (step 1102D). More specifically, in one embodiment, the MAP server 12 stores user records for the users 20-1 through 20-N in the datastore 66 (FIG. 2). The user profile of the user 20-1 is stored in the user record of the user 20-1. The user record of the user 20-1 includes a unique identifier of the user 20-1, the user profile of the user 20-1, and, as discussed below, a current location of the user 20-1. Note that the user profile of the user 20-1 may be updated as desired. For example, in one embodiment, the user profile of the user 20-1 is updated by repeating step 1102 each time the user 20-1 activates the MAP application 34-1.

Note that the while the discussion herein focuses on an embodiment where the user profiles of the users 20-1 through 20-N are obtained from the one or more profile servers 14, the user profiles of the users 20-1 through 20-N may be obtained in any desired manner. For example, in one alternative embodiment, the user 20-1 may identify one or more favorite websites. The profile manager 54 of the MAP server 12 may then crawl the one or more favorite websites of the user 20-1 to obtain keywords appearing in the one or more favorite websites of the user 20-1. These keywords may then be stored as the user profile of the user 20-1.

At some point, a process is performed such that a current location of the mobile device 18-1 and thus a current location of the user 20-1 is obtained by the MAP server 12 (step 1104). In this embodiment, the MAP application 34-1 of the mobile device 18-1 obtains the current location of the mobile device 18-1 from the location function 38-1 of the mobile device 18-1. The MAP application 34-1 then provides the current location of the user 20-1 of the mobile device 18-1 to the location server 16 (step 1104A). Note that step 1104A may be repeated periodically or in response to changes in the location of the mobile device 18-1 in order to provide location updates for the user 20-1 to the MAP server 12. The location server 16 then provides the current location of the user 20-1 to the MAP server 12 (step 1104B). The location server 16 may provide the current location of the user 20-1 to the MAP server 12 automatically in response to receiving the current location of the user 20-1 from the mobile device 18-1 or in response to a request from the MAP server 12.

In response to receiving the current location of the mobile device 18-1, the location manager 56 of the MAP server 12 stores the current location of the mobile device 18-1 as the current location of the user 20-1 (step 1104C). More specifically, in one embodiment, the current location of the user 20-1 is stored in the user record of the user 20-1 maintained in the datastore 66 of the MAP server 12. Note that only the current location of the user 20-1 is stored in the user record of the user 20-1. In this manner, the MAP server 12 maintains privacy for the user 20-1 since the MAP server 12 does not maintain a historical record of the location of the user 20-1. As discussed below in detail, historical data maintained by the MAP server 12 is anonymized in order to maintain the privacy of the users 20-1 through 20-N.

As discussed above, the use of the location server 16 is particularly beneficial when the mobile device 18-1 does not permit background processes, which is the case for the Apple® iPhone. As such, if the mobile device 18-1 is an Apple® iPhone or similar device that does not permit background processes, the MAP application 34-1 will not provide location updates for the user 20-1 to the location server 16 unless the MAP application 34-1 is active. However, other applications running on the mobile device 18-1 (or some other device of the user 20-1) may provide location updates to the location server 16 for the user 20-1 when the MAP application 34-1 is not active. This is illustrated in step 1106 where the location server 16 receives a location update for the user 20-1 from another application running on the mobile device 18-1 or an application running on another device of the user 20-1 (step 1106A). The location server 16 then provides the location update for the user 20-1 to the MAP server 12 (step 1106B). In response, the location manager 56 updates and stores the current location of the user 20-1 in the user record of the user 20-1 (step 1106C). In this manner, the MAP server 12 is enabled to obtain location updates for the user 20-1 even when the MAP application 34-1 is not active at the mobile device 18-1.

Using the current locations of the users 20-1 through 20-N and the user profiles of the users 20-1 through 20-N, the MAP server 12 can provide a number of features. FIG. 6 begins a discussion of the operation of the crowd analyzer 60 to form crowds of users according to one embodiment of the present disclosure. Specifically, FIG. 6 is a flow chart for a spatial crowd formation process according to one embodiment of the present disclosure. Note that, in one embodiment, this process is performed in response to a request for crowd data (i.e., reactively). In another embodiment, this process may be performed proactively by the crowd analyzer 60 as, for example, a background process.

First, the crowd analyzer 60 establishes a bounding box for the crowd formation process (step 1200). Note that while a bounding box is used in this example, other geographic shapes may be used to define a bounding region for the crowd formation process (e.g., a bounding circle). In one embodiment, if crowd formation is performed in response to a specific request, the bounding box is established based on the request. For example, the request may identify a Point of Interest (POI), in which case a bounding box of a predefined size that is centered at the POI is established. As another example, the request may identify an Area of Interest (AOI), in which case a bounding box corresponding to the AOI is established. As yet another example, the request may identify a particular location, in which case a bounding box of a predefined size that is centered at that location is established. Alternatively, if the crowd formation process is performed proactively, the bounding box is a bounding box of a predefined size.

The crowd analyzer 60 then creates a crowd for each individual user in the bounding box (step 1202). More specifically, the crowd analyzer 60 queries the datastore 66 of the MAP server 12 to identify users currently located within the bounding box. Then, a crowd of one user is created for each user currently located within the bounding box. Next, the crowd analyzer 60 determines the two closest crowds in the bounding box (step 1204) and determines a distance between the two crowds (step 1206). The distance between the two crowds is a distance between crowd centers of the two crowds. Note that the crowd center of a crowd of one is the current location of the user in the crowd. The crowd analyzer 60 then determines whether the distance between the two crowds is less than an optimal inclusion distance (step 1208). In this embodiment, the optimal inclusion distance is a predefined static distance. If the distance between the two crowds is less than the optimal inclusion distance, the crowd analyzer 60 combines the two crowds (step 1210) and computes a new crowd center for the resulting crowd (step 1212). The crowd center may be computed based on the current locations of the users in the crowd using a center of mass algorithm. At this point the process returns to step 1204 and is repeated until the distance between the two closest crowds is not less than the optimal inclusion distance. At that point, the crowd analyzer 60 discards any crowds with less than three users (step 1214). Note that throughout this disclosure crowds are only maintained if the crowds include three or more users. However, while three users is the preferred minimum number of users in a crowd, the present disclosure is not limited thereto. The minimum number of users in a crowd may be defined as any number greater than or equal to two users.

Figure 7A:
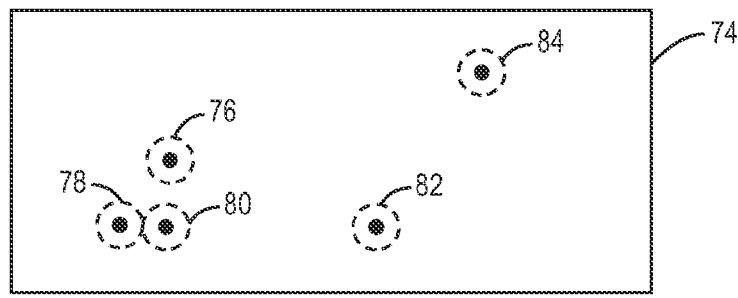
Figure 7B:
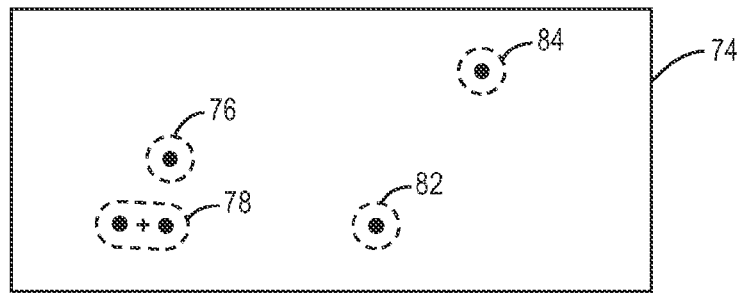
Figure 7C:
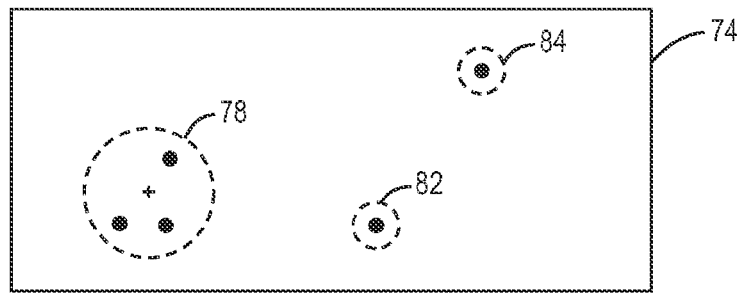
Figure 7D:
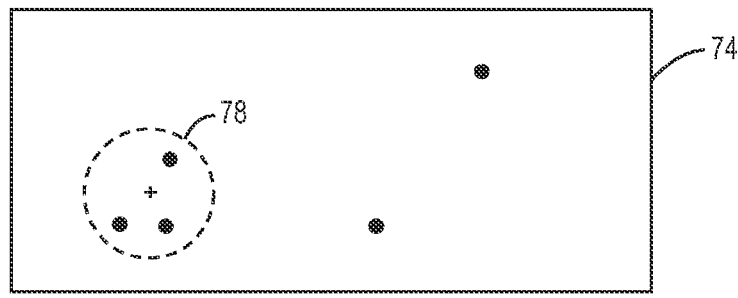

FIGS. 7A through 7D graphically illustrate the crowd formation process of FIG. 6 for an exemplary bounding box 74. Crowds are noted by dashed circles, and the crowd centers are noted by cross-hairs (+). As illustrated in FIG. 7A, initially, the crowd analyzer 60 creates crowds 76 through 84 for the users in the geographic area, where, at this point, each of the crowds 76 through 84 includes one user. The current locations of the users are the crowd centers of the crowds 76 through 84. Next, the crowd analyzer 60 determines the two closest crowds and a distance between the two closest crowds. In this example, at this point, the two closest crowds are crowds 78 and 80, and the distance between the two closest crowds 78 and 80 is less than the optimal inclusion distance. As such, the two closest crowds 78 and 80 are combined by merging crowd 80 into crowd 78, and a new crowd center (+) is computed for the crowd 78, as illustrated in FIG. 7B. Next, the crowd analyzer 60 again determines the two closest crowds, which are now crowds 76 and 78. The crowd analyzer 60 then determines a distance between the crowds 76 and 78. Since the distance is less than the optimal inclusion distance, the crowd analyzer 60 combines the two crowds 76 and 78 by merging the crowd 76 into the crowd 78, and a new crowd center (+) is computed for the crowd 78, as illustrated in FIG. 7C. At this point, there are no more crowds separated by less than the optimal inclusion distance. As such, the crowd analyzer 60 discards crowds having less than three users, which in this example are crowds 82 and 84. As a result, at the end of the crowd formation process, the crowd 78 has been formed with three users, as illustrated in FIG. 7D.

FIGS. 8A through 8D illustrate a spatial crowd formation process according to another embodiment of the present disclosure. In this embodiment, the spatial crowd formation process is triggered in response to receiving a location update for one of the users 20-1 through 20-N and is preferably repeated for each location update received for the users 20-1 through 20-N. As such, first, the crowd analyzer 60 receives a location update, or a new location, for a user (step 1300). Assume that, for this example, the location update is received for the user 20-1. In response, the crowd analyzer 60 retrieves an old location of the user 20-1, if any (step 1302). The old location is the current location of the user 20-1 prior to receiving the new location. The crowd analyzer 60 then creates a new bounding box of a predetermined size centered at the new location of the user 20-1 (step 1304) and an old bounding box of a predetermined size centered at the old location of the user 20-1, if any (step 1306). The predetermined size of the new and old bounding boxes may be any desired size. As one example, the predetermined size of the new and old bounding boxes is 40 meters by 40 meters. Note that if the user 20-1 does not have an old location (i.e., the location received in step 1300 is the first location received for the user 20-1), then the old bounding box is essentially null. Also note that while bounding "boxes" are used in this example, the bounding areas may be of any desired shape.

Next, the crowd analyzer 60 determines whether the new and old bounding boxes overlap (step 1308). If so, the crowd analyzer 60 creates a bounding box encompassing the new and old bounding boxes (step 1310). For example, if the new and old bounding boxes are 40×40 meter regions and a 1×1 meter square at the northeast corner of the new bounding box overlaps a 1×1 meter square at the southwest corner of the old bounding box, the crowd analyzer 60 may create a 79×79 meter square bounding box encompassing both the new and old bounding boxes.

The crowd analyzer 60 then determines the individual users and crowds relevant to the bounding box created in step 1310 (step 1312). The crowds relevant to the bounding box are crowds that are within or overlap the bounding box (e.g., have at least one user located within the bounding box). The individual users relevant to the bounding box are users that are currently located within the bounding box and not already part of a crowd. Next, the crowd analyzer 60 computes an optimal inclusion distance for individual users based on user density within the bounding box (step 1314). More specifically, in one embodiment, the optimal inclusion distance for individuals, which is also referred to herein as an initial optimal inclusion distance, is set according to the following equation:

$$\text{initial\_optimal\_inclusion\_dist} = a \cdot \sqrt{\frac{A_{BoundingBox}}{\text{number\_of\_users}}},$$

where a is a number between 0 and 1, $A_{BoundingBox}$ is an area of the bounding box, and number_of_users is the total number of users in the bounding box. The total number of users in the bounding box includes both individual users that are not already in a crowd and users that are already in a crowd. In one embodiment, a is ⅔.

The crowd analyzer 60 then creates a crowd for each individual user within the bounding box that is not already included in a crowd and sets the optimal inclusion distance for the crowds to the initial optimal inclusion distance (step 1316). At this point, the process proceeds to FIG. 8B where the crowd analyzer 60 analyzes the crowds relevant to the bounding box to determine whether any of the crowd members (i.e., users in the crowds) violate the optimal inclusion distance of their crowds (step 1318). Any crowd member that violates the optimal inclusion distance of his or her crowd is then removed from that crowd (step 1320). The crowd analyzer 60 then creates a crowd of one user for each of the users removed from their crowds in step 1320 and sets the optimal inclusion distance for the newly created crowds to the initial optimal inclusion distance (step 1322).

Next, the crowd analyzer 60 determines the two closest crowds for the bounding box (step 1324) and a distance between the two closest crowds (step 1326). The distance between the two closest crowds is the distance between the crowd centers of the two closest crowds. The crowd analyzer 60 then determines whether the distance between the two closest crowds is less than the optimal inclusion distance of a larger of the two closest crowds (step 1328). If the two closest crowds are of the same size (i.e., have the same number of users), then the optimal inclusion distance of either of the two closest crowds may be used. Alternatively, if the two closest crowds are of the same size, the optimal inclusion distances of both of the two closest crowds may be used such that the crowd analyzer 60 determines whether the distance between the two closest crowds is less than the optimal inclusion distances of both of the two closest crowds. As another alternative, if the two closest crowds are of the same size, the crowd analyzer 60 may compare the distance between the two closest crowds to an average of the optimal inclusion distances of the two closest crowds.

If the distance between the two closest crowds is less than the optimal inclusion distance, the two closest crowds are combined or merged (step 1330), and a new crowd center for the resulting crowd is computed (step 1332). Again, a center of mass algorithm may be used to compute the crowd center of a crowd. In addition, a new optimal inclusion distance for the resulting crowd is computed (step 1334). In one embodiment, the new optimal inclusion distance for the resulting crowd is computed as:

$$\text{average} = \frac{1}{n+1} \cdot \left( \text{initial\_optimal\_inclusion\_dist} + \sum_{i=1}^{n} d_i \right),$$

$$\text{optimial\_inclusion\_dist} = \text{average} + \sqrt{\left(\frac{1}{n} \cdot \sum_{i=1}^{n} (d_i - \text{average})^2\right)},$$

where n is the number of users in the crowd and $d_i$ is a distance between the ith user and the crowd center. In other words, the new optimal inclusion distance is computed as the average of the initial optimal inclusion distance and the distances between the users in the crowd and the crowd center plus one standard deviation.

At this point, the crowd analyzer 60 determines whether a maximum number of iterations have been performed (step 1336). The maximum number of iterations is a predefined number that ensures that the crowd formation process does not indefinitely loop over steps 1318 through 1334 or loop over steps 1318 through 1334 more than a desired maximum number of times. If the maximum number of iterations has not been reached, the process returns to step 1318 and is repeated until either the distance between the two closest crowds is not less than the optimal inclusion distance of the larger crowd or the maximum number of iterations has been reached. At that point, the crowd analyzer 60 discards crowds with less than three users, or members (step 1338) and the process ends.

Figure 8A:
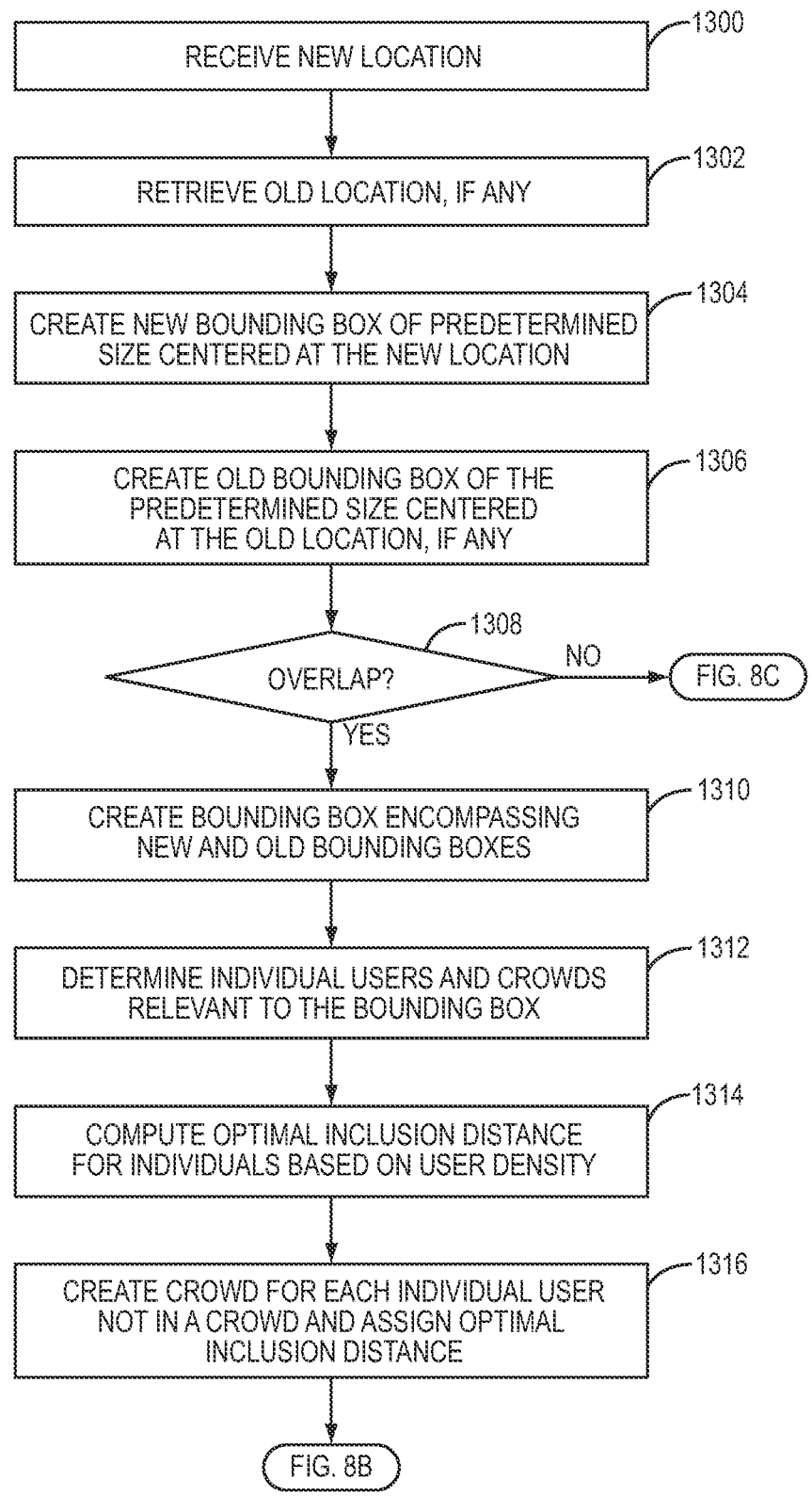
Figure 8B:
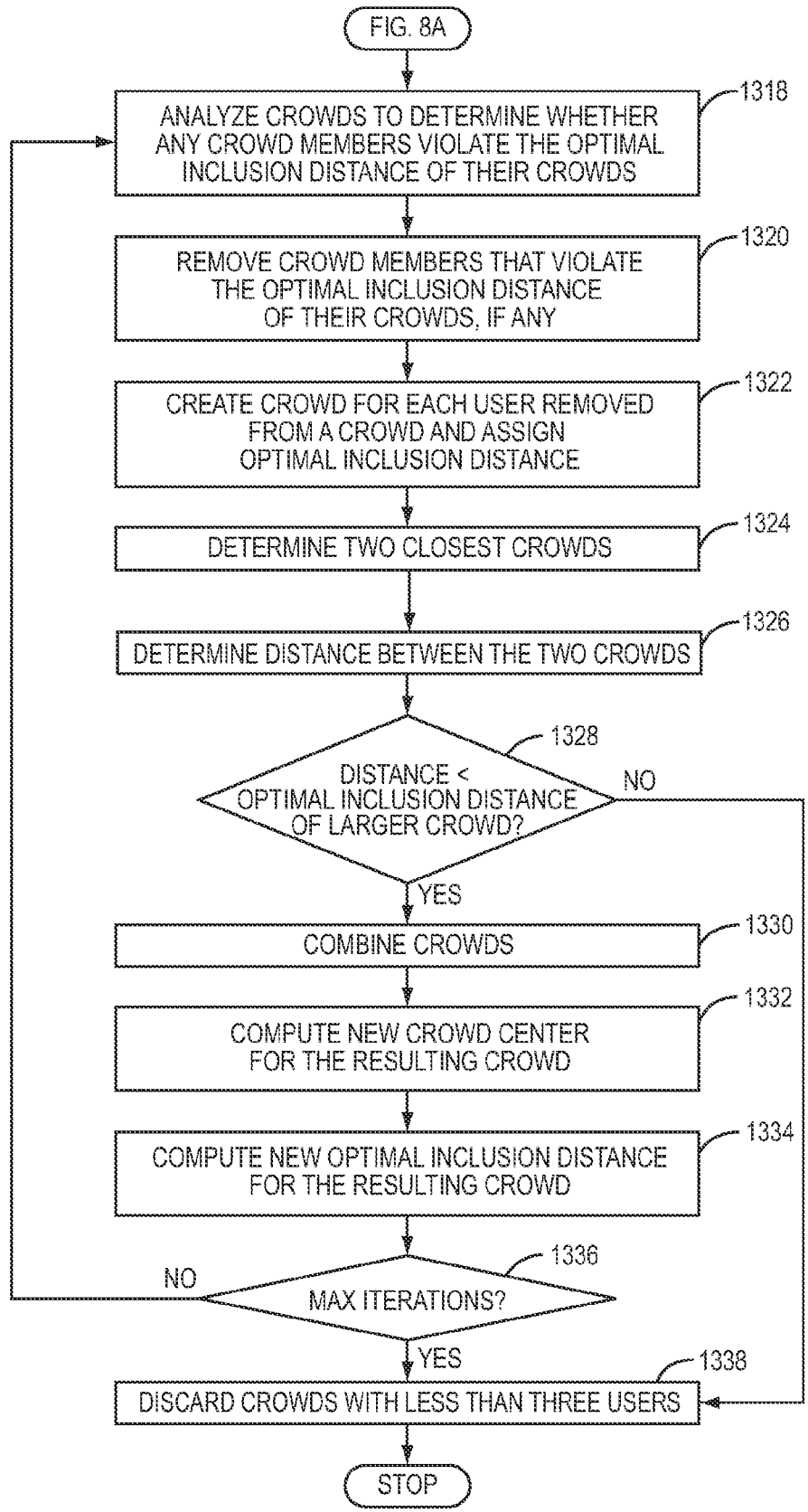
Figure 8C:
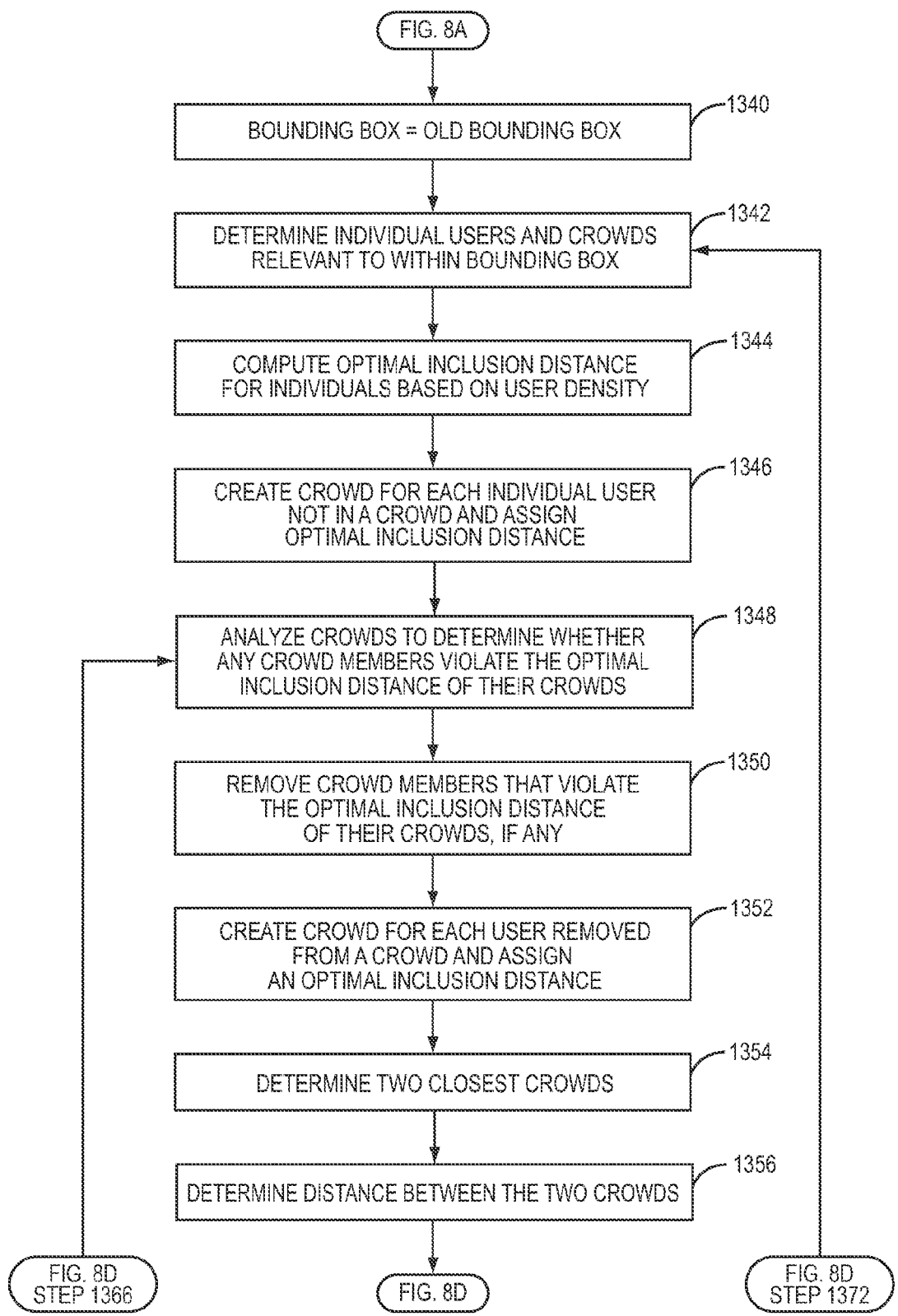
Figure 8D:
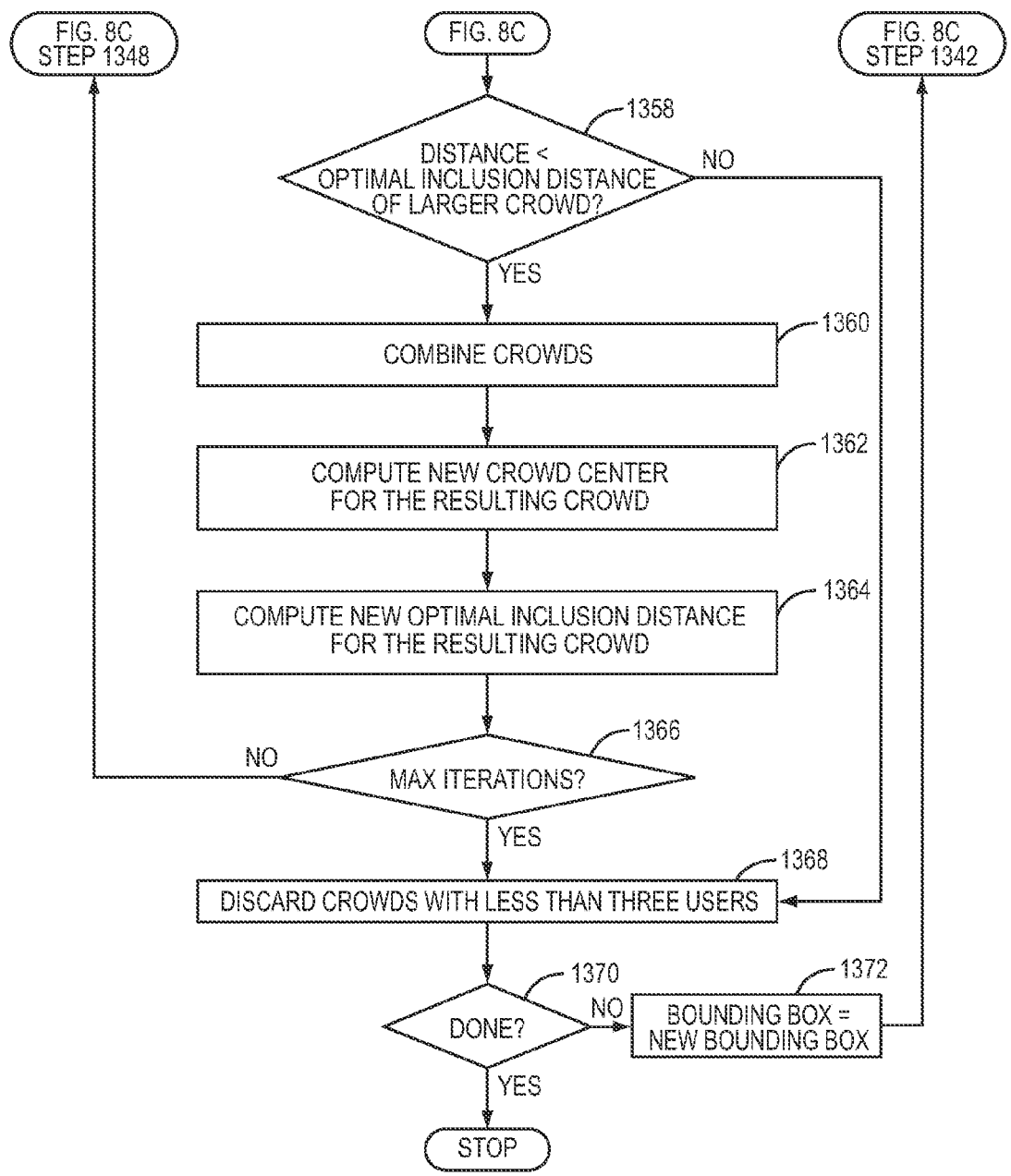

Returning to step 1308 in FIG. 8A, if the new and old bounding boxes do not overlap, the process proceeds to FIG. 8C and the bounding box to be processed is set to the old bounding box (step 1340). In general, the crowd analyzer 60 then processes the old bounding box in much the same manner as described above with respect to steps 1312 through 1338. More specifically, the crowd analyzer 60 determines the individual users and crowds relevant to the bounding box (step 1342). The crowds relevant to the bounding box are crowds that are within or overlap the bounding box (e.g., have at least one user located within the bounding box). The individual users relevant to the bounding box are users that are currently located within the bounding box and not already part of a crowd. Next, the crowd analyzer 60 computes an optimal inclusion distance for individual users based on user density within the bounding box (step 1344). More specifically, in one embodiment, the optimal inclusion distance for individuals, which is also referred to herein as an initial optimal inclusion distance, is set according to the following equation:

$$\text{initial\_optimal\_inclusion\_dist} = a \cdot \sqrt{\frac{A_{BoundingBox}}{\text{number\_of\_users}}},$$

where a is a number between 0 and 1, $A_{BoundingBox}$ is an area of the bounding box, and number_of_users is the total number of users in the bounding box. The total number of users in the bounding box includes both individual users that are not already in a crowd and users that are already in a crowd. In one embodiment, a is ⅔.

The crowd analyzer 60 then creates a crowd of one user for each individual user within the bounding box that is not already included in a crowd and sets the optimal inclusion distance for the crowds to the initial optimal inclusion distance (step 1346). At this point, the crowd analyzer 60 analyzes the crowds for the bounding box to determine whether any crowd members (i.e., users in the crowds) violate the optimal inclusion distance of their crowds (step 1348). Any crowd member that violates the optimal inclusion distance of his or her crowd is then removed from that crowd (step 1350). The crowd analyzer 60 then creates a crowd of one user for each of the users removed from their crowds in step 1350 and sets the optimal inclusion distance for the newly created crowds to the initial optimal inclusion distance (step 1352).

Next, the crowd analyzer 60 determines the two closest crowds in the bounding box (step 1354) and a distance between the two closest crowds (step 1356). The distance between the two closest crowds is the distance between the crowd centers of the two closest crowds. The crowd analyzer 60 then determines whether the distance between the two closest crowds is less than the optimal inclusion distance of a larger of the two closest crowds (step 1358). If the two closest crowds are of the same size (i.e., have the same number of users), then the optimal inclusion distance of either of the two closest crowds may be used. Alternatively, if the two closest crowds are of the same size, the optimal inclusion distances of both of the two closest crowds may be used such that the crowd analyzer 60 determines whether the distance between the two closest crowds is less than the optimal inclusion distances of both of the two closest crowds. As another alternative, if the two closest crowds are of the same size, the crowd analyzer 60 may compare the distance between the two closest crowds to an average of the optimal inclusion distances of the two closest crowds.

If the distance between the two closest crowds is less than the optimal inclusion distance, the two closest crowds are combined or merged (step 1360), and a new crowd center for the resulting crowd is computed (step 1362). Again, a center of mass algorithm may be used to compute the crowd center of a crowd. In addition, a new optimal inclusion distance for the resulting crowd is computed (step 1364). As discussed above, in one embodiment, the new optimal inclusion distance for the resulting crowd is computed as:

$$\text{average} = \frac{1}{n+1} \cdot \left( \text{initial\_optimal\_inclusion\_dist} + \sum_{i=1}^{n} d_i \right),$$

$$\text{optimial\_inclusion\_dist} = \text{average} + \sqrt{\left(\frac{1}{n} \cdot \sum_{i=1}^{n} (d_i - \text{average})^2\right)},$$

where n is the number of users in the crowd and $d_i$ is a distance between the ith user and the crowd center. In other words, the new optimal inclusion distance is computed as the average of the initial optimal inclusion distance and the distances between the users in the crowd and the crowd center plus one standard deviation.

At this point, the crowd analyzer 60 determines whether a maximum number of iterations have been performed (step 1366). If the maximum number of iterations has not been reached, the process returns to step 1348 and is repeated until either the distance between the two closest crowds is not less than the optimal inclusion distance of the larger crowd or the maximum number of iterations has been reached. At that point, the crowd analyzer 60 discards crowds with less than three users, or members (step 1368). The crowd analyzer 60 then determines whether the crowd formation process for the new and old bounding boxes is done (step 1370). In other words, the crowd analyzer 60 determines whether both the new and old bounding boxes have been processed. If not, the bounding box is set to the new bounding box (step 1372), and the process returns to step 1342 and is repeated for the new bounding box. Once both the new and old bounding box have been processed, the crowd formation process ends.

Figure 9A:
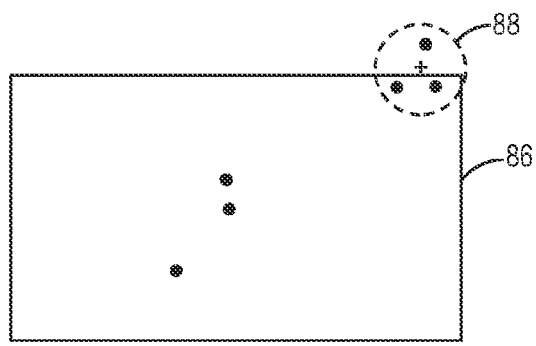
Figure 9B:
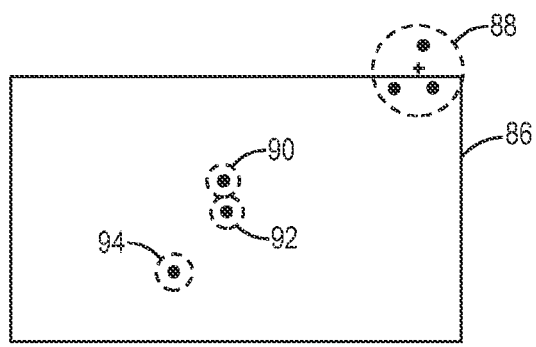

FIGS. 9A through 9D graphically illustrate the crowd formation process of FIGS. 8A through 8D for a scenario where the crowd formation process is triggered by a location update for a user having no old location. In this scenario, the crowd analyzer 60 creates a new bounding box 86 for the new location of the user, and the new bounding box 86 is set as the bounding box to be processed for crowd formation. Then, as illustrated in FIG. 9A, the crowd analyzer 60 identifies all individual users currently located within the bounding box 86 and all crowds located within or overlapping the bounding box. In this example, crowd 88 is an existing crowd relevant to the bounding box 86. Crowds are indicated by dashed circles, crowd centers are indicated by cross-hairs (+), and users are indicated as dots. Next, as illustrated in FIG. 9B, the crowd analyzer 60 creates crowds 90 through 94 of one user for the individual users, and the optional inclusion distances of the crowds 90 through 94 are set to the initial optimal inclusion distance. As discussed above, the initial optimal inclusion distance is computed by the crowd analyzer 60 based on a density of users within the bounding box 86.

Figure 9C:
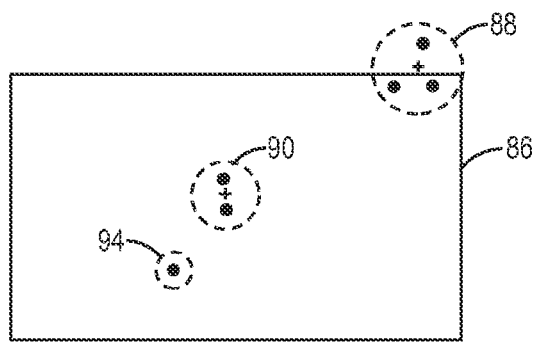
Figure 9D:
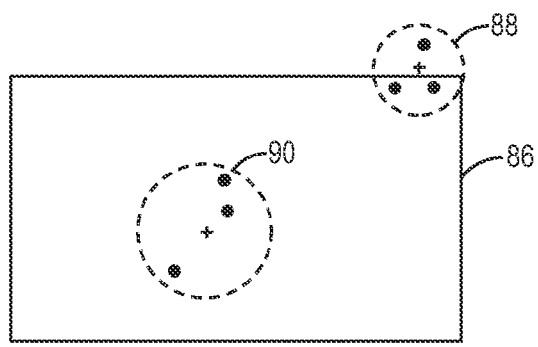

The crowd analyzer 60 then identifies the two closest crowds 90 and 92 in the bounding box 86 and determines a distance between the two closest crowds 90 and 92. In this example, the distance between the two closest crowds 90 and 92 is less than the optimal inclusion distance. As such, the two closest crowds 90 and 92 are merged and a new crowd center and new optimal inclusion distance are computed, as illustrated in FIG. 9C. The crowd analyzer 60 then repeats the process such that the two closest crowds 90 and 94 in the bounding box 86 are again merged, as illustrated in FIG. 9D. At this point, the distance between the two closest crowds 88 and 90 is greater than the appropriate optimal inclusion distance. As such, the crowd formation process is complete.

Figure 10A:
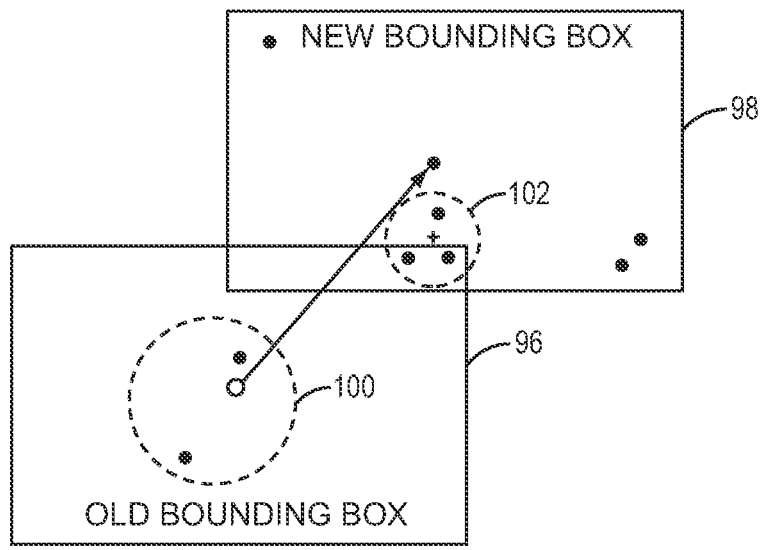

FIGS. 10A through 10F graphically illustrate the crowd formation process of FIGS. 8A through 8D for a scenario where the new and old bounding boxes overlap. As illustrated in FIG. 10A, a user moves from an old location to a new location, as indicated by an arrow. The crowd analyzer 60 receives a location update for the user giving the new location of the user. In response, the crowd analyzer 60 creates an old bounding box 96 for the old location of the user and a new bounding box 98 for the new location of the user. Crowd 100 exists in the old bounding box 96, and crowd 102 exists in the new bounding box 98.

Figure 10B:
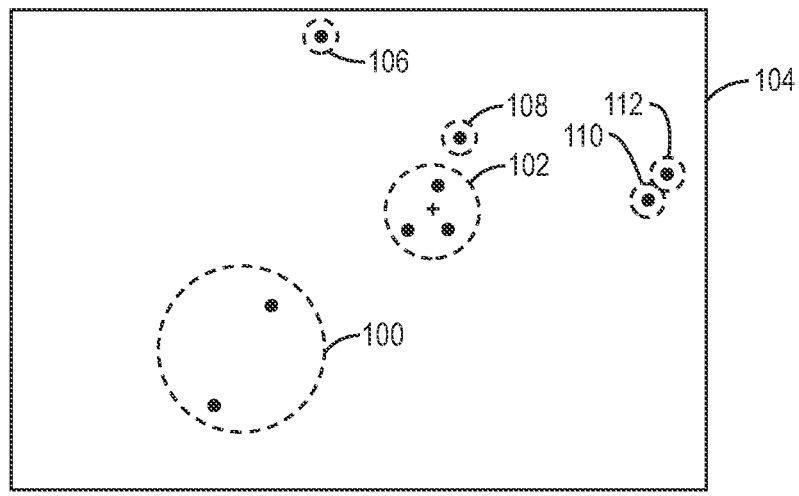

Since the old bounding box 96 and the new bounding box 98 overlap, the crowd analyzer 60 creates a bounding box 104 that encompasses both the old bounding box 96 and the new bounding box 98, as illustrated in FIG. 10B. In addition, the crowd analyzer 60 creates crowds 106 through 112 for individual users currently located within the bounding box 104. The optimal inclusion distances of the crowds 106 through 112 are set to the initial optimal inclusion distance computed by the crowd analyzer 60 based on the density of users in the bounding box 104.

Figure 10C:
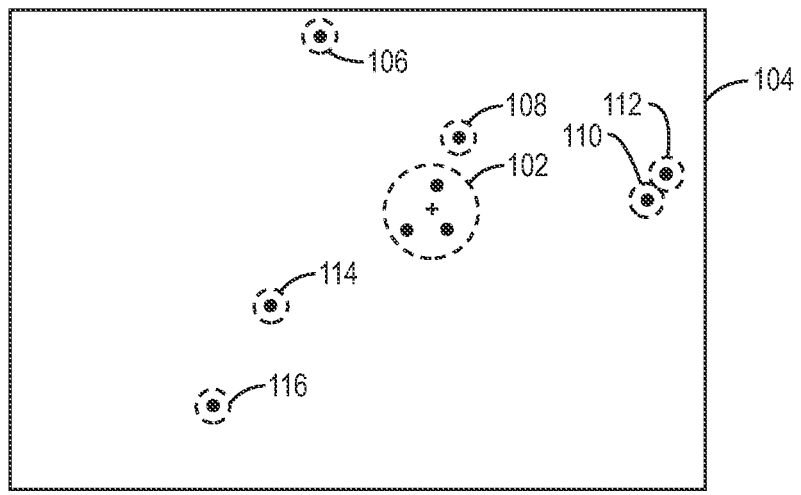

Next, the crowd analyzer 60 analyzes the crowds 100, 102, and 106 through 112 to determine whether any members of the crowds 100, 102, and 106 through 112 violate the optimal inclusion distances of the crowds 100, 102, and 106 through 112. In this example, as a result of the user leaving the crowd 100 and moving to his new location, both of the remaining members of the crowd 100 violate the optimal inclusion distance of the crowd 100. As such, the crowd analyzer 60 removes the remaining users from the crowd 100 and creates crowds 114 and 116 of one user each for those users, as illustrated in FIG. 10C.

Figure 10D:
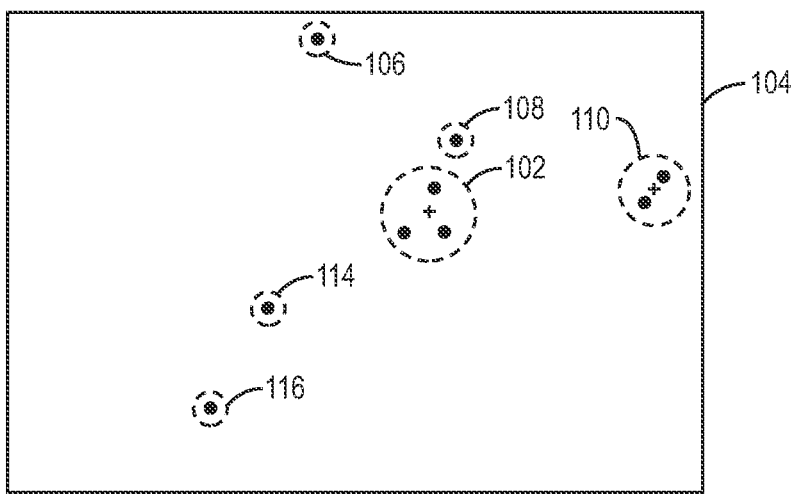

The crowd analyzer 60 then identifies the two closest crowds in the bounding box 104, which in this example are the crowds 110 and 112. Next, the crowd analyzer 60 computes a distance between the two crowds 110 and 112. In this example, the distance between the two crowds 110 and 112 is less than the initial optimal inclusion distance and, as such, the two crowds 110 and 112 are combined. In this example, crowds are combined by merging the smaller crowd into the larger crowd. Since the two crowds 110 and 112 are of the same size, the crowd analyzer 60 merges the crowd 112 into the crowd 110, as illustrated in FIG. 10D. A new crowd center and new optimal inclusion distance are then computed for the crowd 110.

Figure 10E:
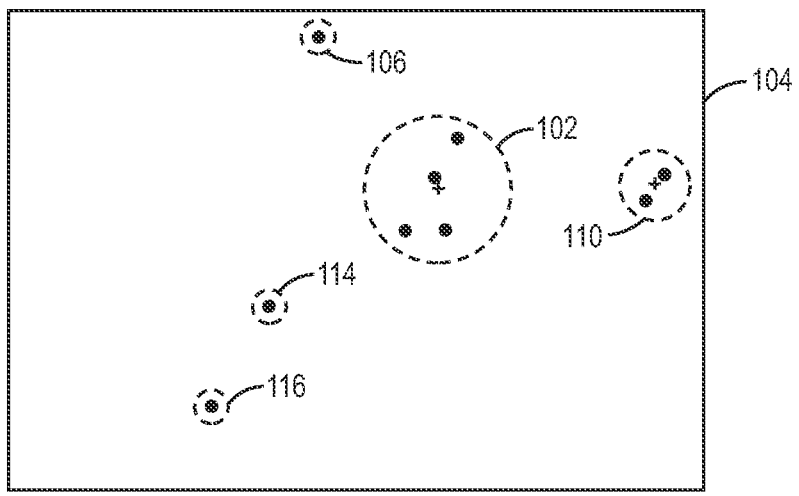
Figure 10F:
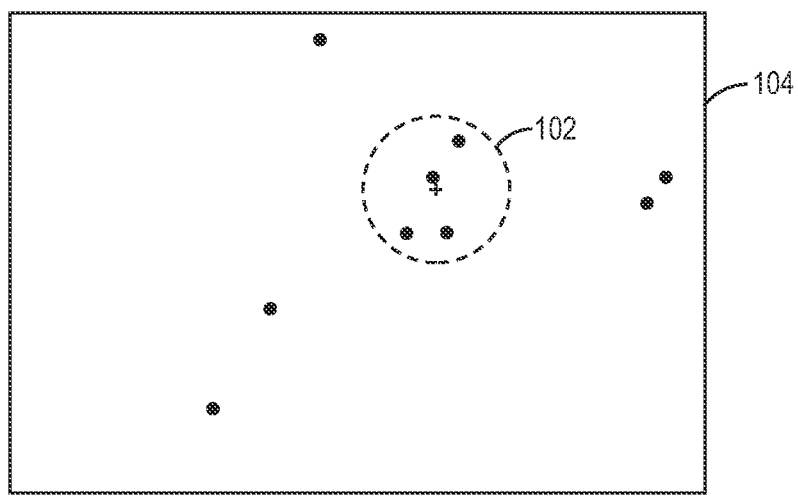

At this point, the crowd analyzer 60 repeats the process and determines that the crowds 102 and 108 are now the two closest crowds. In this example, the distance between the two crowds 102 and 108 is less than the optimal inclusion distance of the larger of the two crowds 102 and 108, which is the crowd 102. As such, the crowd 108 is merged into the crowd 102 and a new crowd center and optimal inclusion distance are computed for the crowd 102, as illustrated in FIG. 10E. At this point, there are no two crowds closer than the optimal inclusion distance of the larger of the two crowds. As such, the crowd analyzer 60 discards any crowds having less than three members, as illustrated in FIG. 10F. In this example, the crowds 106, 110, 114, and 116 have less than three members and are therefore removed. The crowd 102 has three or more members and, as such, is not removed. At this point, the crowd formation process is complete.

Figure 11A:
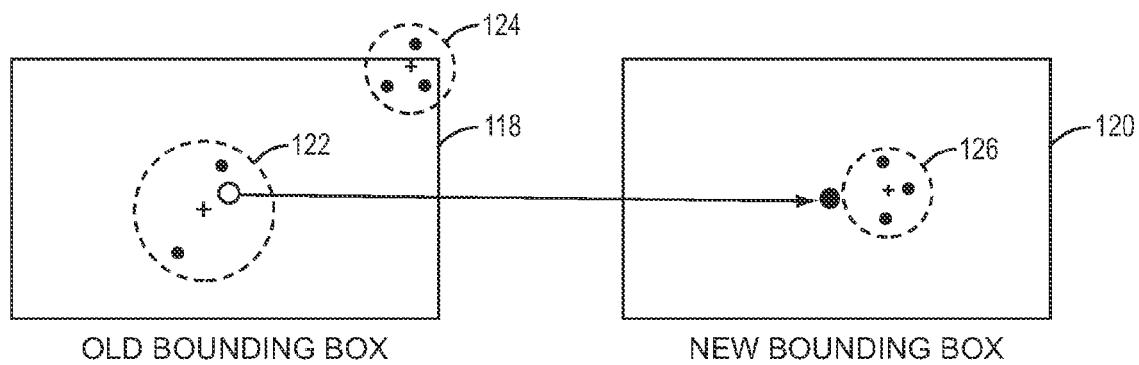

FIGS. 11A through 11E graphically illustrate the crowd formation process of FIGS. 8A through 8D in a scenario where the new and old bounding boxes do not overlap. As illustrated in FIG. 11A, in this example, the user moves from an old location to a new location. The crowd analyzer 60 creates an old bounding box 118 for the old location of the user and a new bounding box 120 for the new location of the user. Crowds 122 and 124 exist in the old bounding box 118, and crowd 126 exists in the new bounding box 120. In this example, since the old and new bounding boxes 118 and 120 do not overlap, the crowd analyzer 60 processes the old and new bounding boxes 118 and 120 separately.

Figure 11B:
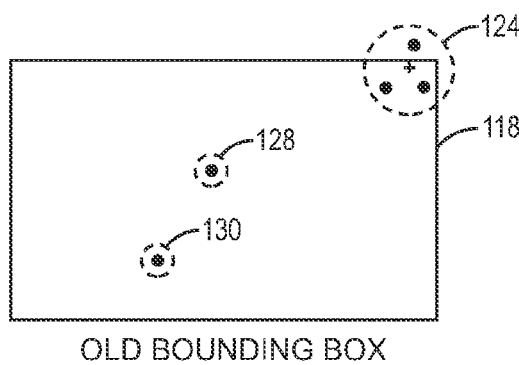
Figure 11C:
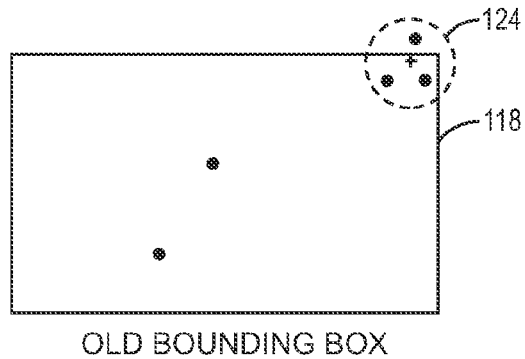

More specifically, as illustrated in FIG. 11B, as a result of the movement of the user from the old location to the new location, the remaining users in the crowd 122 no longer satisfy the optimal inclusion distance for the crowd 122. As such, the remaining users in the crowd 122 are removed from the crowd 122, and crowds 128 and 130 of one user each are created for the removed users as shown in FIG. 11C. In this example, no two crowds in the old bounding box 118 are close enough to be combined. As such, processing of the old bounding box 118 is complete, and the crowd analyzer 60 proceeds to process the new bounding box 120.

Figure 11D:
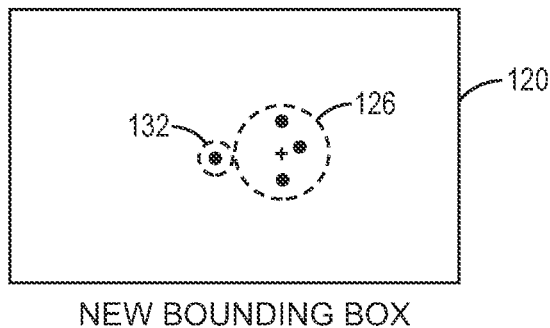
Figure 11E:
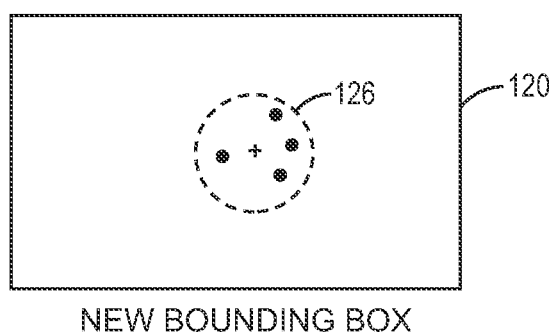

As illustrated in FIG. 11D, processing of the new bounding box 120 begins by the crowd analyzer 60 creating a crowd 132 of one user for the user. The crowd analyzer 60 then identifies the crowds 126 and 132 as the two closest crowds in the new bounding box 120 and determines a distance between the two crowds 126 and 132. In this example, the distance between the two crowds 126 and 132 is less than the optimal inclusion distance of the larger crowd, which is the crowd 126. As such, the crowd analyzer 60 combines the crowds 126 and 132 by merging the crowd 132 into the crowd 126, as illustrated in FIG. 11E. A new crowd center and new optimal inclusion distance are then computed for the crowd 126. At this point, the crowd formation process is complete.

Before proceeding, a variation of the spatial formation process discussed above with respect to FIGS. 8A through 8D, 9A through 9D, 10A through 10F, and 11A through 11E will be described. In this alternative embodiment, a location accuracy of the location update from the user received in step 1300 is considered. More specifically, in step 1300, the location update received by the MAP server 12 includes the updated location of the user 20-1 as well as a location accuracy for the location of the user 20-1, which may be expressed as, for example, a radius in meters from the location of the user 20-1. In the embodiment where the location of the user 20-1 is obtained from a GPS receiver of the mobile device 18-1, the location accuracy of the location of the user 20-1 may be provided by the GPS receiver or derived from data from the GPS receiver as well be appreciated by one having ordinary skill in the art.

Then, in steps 1302 and 1304, sizes of the new and old bounding boxes centered at the new and old locations of the user 20-1 are set as a function of the location accuracy of the new and old locations of the user 20-1. If the new location of the user 20-1 is inaccurate, then the new bounding box will be large. If the new location of the user 20-1 is accurate, then the new bounding box will be small. For example, the length and width of the new bounding box may be set to M times the location accuracy of the new location of the user 20-1, where the location accuracy is expressed as a radius in meters from the new location of the user 20-1. The number M may be any desired number. For example, the number M may be 5. In a similar manner, the location accuracy of the old location of the user 20-1 may be used to set the length and width of the old bounding box.

In addition, the location accuracy may be considered when computing the initial optimal inclusion distances used for crowds of one user in steps 1314 and 1344. As discussed above, the initial optimal inclusion distance is computed based on the following equation:

$$\text{initial\_optimal\_inclusion\_dist} = a \cdot \sqrt{\frac{A_{BoundingBox}}{\text{number\_of\_users}}},$$

where a is a number between 0 and 1, $A_{BoundingBox}$ is an area of the bounding box, and number_of_users is the total number of users in the bounding box. The total number of users in the bounding box includes both individual users that are not already in a crowd and users that are already in a crowd. In one embodiment, a is ⅔. However, if the computed initial optimal inclusion distance is less than the location accuracy of the current location of the individual user in a crowd, then the location accuracy, rather than the computed value, is used for the initial optimal inclusion distance for that crowd. As such, as location accuracy decreases, crowds become larger and more inclusive. In contrast, as location accuracy increases, crowds become smaller and less inclusive. In other words, the granularity with which crowds are formed is a function of the location accuracy.

Likewise, when new optimal inclusion distances for crowds are recomputed in steps 1334 and 1364, location accuracy may also be considered. As discussed above, the new optimal inclusion distance may first be computed based on the following equation:

$$\text{average} = \frac{1}{n+1} \cdot \left( \text{initial\_optimal\_inclusion\_dist} + \sum_{i=1}^{n} d_i \right),$$

$$\text{optimial\_inclusion\_dist} = \text{average} + \sqrt{\left( \frac{1}{n} \cdot \sum_{i=1}^{n} (d_i - \text{average})^2 \right)},$$

where n is the number of users in the crowd and $d_i$ is a distance between the ith user and the crowd center. In other words, the new optimal inclusion distance is computed as the average of the initial optimal inclusion distance and the distances between the users in the crowd and the crowd center plus one standard deviation. However, if the computed value for the new optimal inclusion distance is less than an average location accuracy of the users in the crowd, the average location accuracy of the users in the crowd, rather than the computed value, is used as the new optimal inclusion distance.

FIG. 12 illustrates the operation the system 10 of FIG. 1 to enable the mobile devices 18-1 through 18-N to request crowd data for currently formed crowds according to one embodiment of the present disclosure. Note that while in this example the request is initiated by the MAP application 34-1 of the mobile device 18-1, this discussion is equally applicable to the MAP applications 34-2 through 34-N of the other mobile devices 18-2 through 18-N. In addition, in a similar manner, requests may be received from the third-party applications 36-1 through 36-N. Also, while this discussion focuses on a request from the mobile device 18-1, the MAP server 12 may receive and respond to requests from the subscriber device 22 in a similar manner.

First, the MAP application 34-1 sends a crowd request to the MAP client 32-1 (step 1400). The crowd request is a request for crowd data for crowds currently formed near a specified POI or within a specified AOI. The crowd request may be initiated by the user 20-1 of the mobile device 18-1 via the MAP application 34-1 or may be initiated automatically by the MAP application 34-1 in response to an event such as, for example, start-up of the MAP application 34-1, movement of the user 20-1, or the like. In one embodiment, the crowd request is for a POI, where the POI is a POI corresponding to the current location of the user 20-1, a POI selected from a list of POIs defined by the user 20-1, a POI selected from a list of POIs defined by the MAP application 34-1 or the MAP server 12, a POI selected by the user 20-1 from a map, a POI implicitly defined via a separate application (e.g., POI is implicitly defined as the location of the nearest Starbucks coffee house in response to the user 20-1 performing a Google search for "Starbucks"), or the like. If the POI is selected from a list of POIs, the list of POIs may include static POIs which may be defined by street addresses or latitude and longitude coordinates, dynamic POIs which may be defined as the current locations of one or more friends of the user 20-1, or both. Note that in some embodiments, the user 20-1 may be enabled to define a POI by selecting a crowd center of a crowd as a POI, where the POI would thereafter remain static at that point and would not follow the crowd.

In another embodiment, the crowd request is for an AOI, where the AOI may be an AOI of a predefined shape and size centered at the current location of the user 20-1, an AOI selected from a list of AOIs defined by the user 20-1, an AOI selected from a list of AOIs defined by the MAP application 34-1 or the MAP server 12, an AOI selected by the user 20-1 from a map, an AOI implicitly defined via a separate application (e.g., AOI is implicitly defined as an area of a predefined shape and size centered at the location of the nearest Starbucks coffee house in response to the user 20-1 performing a Google search for "Starbucks"), or the like. If the AOI is selected from a list of AOIs, the list of AOIs may include static AOIs, dynamic AOIs which may be defined as areas of a predefined shape and size centered at the current locations of one or more friends of the user 20-1, or both. Note that in some embodiments, the user 20-1 may be enabled to define an AOI by selecting a crowd such that an AOI is created of a predefined shape and size centered at the crowd center of the selected crowd. The AOI would thereafter remain static and would not follow the crowd. The POI or the AOI of the crowd request may be selected by the user 20-1 via the MAP application 34-1. In yet another embodiment, the MAP application 34-1 automatically uses the current location of the user 20-1 as the POI or as a center point for an AOI of a predefined shape and size.

Upon receiving the crowd request, the MAP client 32-1 forwards the crowd request to the MAP server 12 (step 1402). Note that in some embodiments, the MAP client 32-1 may process the crowd request before forwarding the crowd request to the MAP server 12. For example, in some embodiments, the crowd request may include more than one POI or more than one AOI. As such, the MAP client 32-1 may generate a separate crowd request for each POI or each AOI.

In response to receiving the crowd request from the MAP client 32-1, the MAP server 12 identifies one or more crowds relevant to the crowd request (step 1404). More specifically, in one embodiment, the crowd analyzer 60 performs a crowd formation process such as that described above in FIG. 6 to form one or more crowds relevant to the POI or the AOI of the crowd request. In another embodiment, the crowd analyzer 60 proactively forms crowds using a process such as that described above in FIGS. 8A through 8D and stores corresponding crowd records in the datastore 66 of the MAP server 12. Then, rather than forming the relevant crowds in response to the crowd request, the crowd analyzer 60 queries the datastore 66 to identify the crowds that are relevant to the crowd request. The crowds relevant to the crowd request may be those crowds within or intersecting a bounding region, such as a bounding box, for the crowd request. If the crowd request is for a POI, the bounding region is a geographic region of a predefined shape and size centered at the POI. If the crowd request is for an AOI, the bounding region is the AOI.

Once the crowd analyzer 60 has identified the crowds relevant to the crowd request, the MAP server 12 generates crowd data for the identified crowds (step 1406). The crowd data for the identified crowds may include aggregate profiles for the crowds, information characterizing the crowds, or both. In addition, the crowd data may include spatial information defining the locations of the crowds, the number of users in the crowds, the amount of time the crowds have been located at or near the POI or within the AOI of the crowd request, or the like. The MAP server 12 then returns the crowd data to the MAP client 32-1 (step 1408).

Upon receiving the crowd data, the MAP client 32-1 forwards the crowd data to the MAP application 34-1 (step 1410). Note that in some embodiments the MAP client 32-1 may process the crowd data before sending the crowd data to the MAP application 34-1. The MAP application 34-1 then presents the crowd data to the user 20-1 (step 1412). The manner in which the crowd data is presented depends on the particular implementation of the MAP application 34-1. In one embodiment, the crowd data is overlaid upon a map. For example, the crowds may be represented by corresponding indicators overlaid on a map. The user 20-1 may then select a crowd in order to view additional crowd data regarding that crowd such as, for example, the aggregate profile of that crowd, characteristics of that crowd, or the like.

Note that in one embodiment, the MAP application 34-1 may operate to roll-up the aggregate profiles for multiple crowds into a rolled-up aggregate profile for those crowds. The rolled-up aggregate profile may be the average of the aggregate profiles of the crowds. For example, the MAP application 34-1 may roll-up the aggregate profiles for multiple crowds at a POI and present the rolled-up aggregate profile for the multiple crowds at the POI to the user 20-1. In a similar manner, the MAP application 34-1 may provide a rolled-up aggregate profile for an AOI. In another embodiment, the MAP server 12 may roll-up crowds for a POI or an AOI and provide the rolled-up aggregate profile in addition to or as an alternative to the aggregate profiles for the individual crowds.

FIGS. 13 through 21 describe aspects of an embodiment of the present disclosure wherein the crowd analyzer 60 of the MAP server 12 provides a crowd tracking feature. In general, over time, the crowd analyzer 60 creates a number of crowd snapshots for each crowd. In addition, in order to accurately track the crowds, the crowd analyzer 60 captures crowd mergers, captures crowd splits, and re-establishes crowds, as discussed below in detail. As discussed below in detail, the crowd snapshots may be utilized when predicting future locations of the users 20-1 through 20-N.

FIG. 13 illustrates exemplary data records that may be used to represent crowds, users, crowd snapshots, and anonymous users according to one embodiment of the present disclosure. As illustrated, for each crowd created by the crowd analyzer 60 of the MAP server 12, a corresponding crowd record 134 is created and stored in the datastore 66 of the MAP server 12. The crowd record 134 for a crowd includes a users field, a North-East (NE) corner field, a South-West (SW) corner field, a center field, a crowd snapshots field, a split from field, and a combined into field. The users field stores a set or list of user records 136 corresponding to a subset of the users 20-1 through 20-N that are currently in the crowd. The NE corner field stores a location corresponding to a NE corner of a bounding box for the crowd. The NE corner may be defined by latitude and longitude coordinates and optionally an altitude. Similarly, the SW corner field stores a location of a SW corner of the bounding box for the crowd. Like the NE corner, the SW corner may be defined by latitude and longitude coordinates and optionally an altitude. Together, the NE corner and the SW corner define a bounding box for the crowd, where the edges of the bounding box pass through the current locations of the outermost users in the crowd. The center field stores a location corresponding to a center of the crowd. The center of the crowd may be defined by latitude and longitude coordinates and optionally an altitude. Together, the NE corner, the SW corner, and the center of the crowd form spatial information defining the location of the crowd. Note, however, that the spatial information defining the location of the crowd may include additional or alternative information depending on the particular implementation. The crowd snapshots field stores a list of crowd snapshot records 138 corresponding to crowd snapshots for the crowd. As discussed below in detail, the split from field may be used to store a reference to a crowd record corresponding to another crowd from which the crowd split, and the combined into field may be used to store a reference to a crowd record corresponding to another crowd into which the crowd has been merged.

Each of the user records 136 includes an ID field, a location field, a profile field, a crowd field, and a previous crowd field. The ID field stores a unique ID for one of the users 20-1 through 20-N for which the user record 136 is stored. The location field stores the current location of the user, which may be defined by latitude and longitude coordinates and optionally an altitude. The profile field stores the user profile of the user, which may be defined as a list of keywords for one or more profile categories. The crowd field is used to store a reference to a crowd record of a crowd of which the user is currently a member. The previous crowd field may be used to store a reference to a crowd record of a crowd of which the user was previously a member.

Each of the crowd snapshot records 138 includes an anonymous users field, a NE corner field, a SW corner field, a center field, a sample time field, a vertices field, a crowd size field, and one or more crowd characteristics fields. The anonymous users field stores a set or list of anonymous user records 140, which are anonymized versions of the user records 136 for the users that are in the crowd at a time the crowd snapshot was created. The NE corner field stores a location corresponding to a NE corner of a bounding box for the crowd at the time the crowd snapshot was created. The NE corner may be defined by latitude and longitude coordinates and optionally an altitude. Similarly, the SW corner field stores a location of a SW corner of the bounding box for the crowd at the time the crowd snapshot was created. Like the NE corner, the SW corner may be defined by latitude and longitude coordinates and optionally an altitude. The center field stores a location corresponding to a center of the crowd at the time the crowd snapshot was created. The center of the crowd may be defined by latitude and longitude coordinates and optionally an altitude. Together, the NE corner, the SW corner, and the center of the crowd form spatial information defining the location of the crowd at the time the crowd snapshot was created. Note, however, that the spatial information defining the location of the crowd at the time the crowd snapshot was created may include additional or alternative information depending on the particular implementation. The sample time field stores a timestamp indicating a time at which the crowd snapshot was created. The timestamp preferably includes a date and a time of day at which the crowd snapshot was created. The vertices field stores locations of users in the crowd at the time the crowd snapshot was created that define an actual outer boundary of the crowd (e.g., as a polygon) at the time the crowd snapshot was created. Note that the actual outer boundary of a crowd may be used to show the location of the crowd when displayed to a user. The crowd size field store a size of the crowd (i.e., the number of users in the crowd) at the time the crowd snapshot was created. The one or more crowd characteristics fields may store one or more characteristics of the crowd at the time the crowd snapshot was created such as, for example, best-case and/or worst-case average Degree of Separation (DOS) for the crowd, a degree of fragmentation of the crowd, a degree of bi-directionality of relationship for the crowd, or the like.

Each of the anonymous user records 140 includes an anonymous ID field and a profile field. The anonymous ID field stores an anonymous user ID, which is preferably a unique user ID that is not tied, or linked, back to any of the users 20-1 through 20-N and particularly not tied back to the user or the user record for which the anonymous user record 140 has been created. In one embodiment, the anonymous user records 140 for a crowd snapshot record 138 are anonymized versions of the user records 136 of the users in the crowd at the time the crowd snapshot was created. The profile field stores the anonymized user profile of the anonymous user, which may be defined as a list of keywords for one or more profile categories. The manner in which the user records 136 are anonymized to create the anonymous user records 140 is described below in detail.

FIGS. 14A through 14D illustrate one embodiment of a spatial crowd formation process that may be used to enable the crowd tracking feature. This spatial crowd formation process is substantially the same as that described above with respect to FIGS. 8A through 8D. As such, some of the details of the process are not repeated. In this embodiment, the spatial crowd formation process is triggered in response to receiving a location update for one of the users 20-1 through 20-N and is preferably repeated for each location update received for the users 20-1 through 20-N. As such, first, the crowd analyzer 60 receives a location update, or a new location, for a user (step 1500). In response, the crowd analyzer 60 retrieves an old location of the user, if any (step 1502). The crowd analyzer 60 then creates a new bounding box of a predetermined size centered at the new location of the user (step 1504) and an old bounding box of a predetermined size centered at the old location of the user, if any (step 1506).

Next, the crowd analyzer 60 determines whether the new and old bounding boxes overlap (step 1508). If so, the crowd analyzer 60 creates a bounding box encompassing the new and old bounding boxes (step 1510). The crowd analyzer 60 then determines the individual users and crowds relevant to the bounding box created in step 1510 (step 1512). Next, the crowd analyzer 60 computes an optimal inclusion distance for individual users based on user density within the bounding box (step 1514). The optimal inclusion distance may be computed as described above with respect to step 1314 of FIG. 8A.

The crowd analyzer 60 then creates a crowd of one user for each individual user within the bounding box established in step 1510 that is not already included in a crowd and sets the optimal inclusion distance for those crowds to the initial optimal inclusion distance (step 1516). The crowds created for the individual users are temporary crowds created for purposes of performing the crowd formation process. At this point, the process proceeds to FIG. 14B where the crowd analyzer 60 analyzes the crowds in the bounding box established in step 1510 to determine whether any of the crowd members (i.e., users in the crowds) violate the optimal inclusion distance of their crowds (step 1518). Any crowd member that violates the optimal inclusion distance of his or her crowd is then removed from that crowd and the previous crowd fields in the corresponding user records are set (step 1520). More specifically, in this embodiment, a member is removed from a crowd by removing the user record of the member from the set or list of user records in the crowd record of the crowd and setting the previous crowd stored in the user record of the user to the crowd from which the member has been removed. The crowd analyzer 60 then creates a crowd of one user for each of the users removed from their crowds in step 1520 and sets the optimal inclusion distance for the newly created crowds to the initial optimal inclusion distance (step 1522).

Next, the crowd analyzer 60 determines the two closest crowds in the bounding box (step 1524) and a distance between the two closest crowds (step 1526). The crowd analyzer 60 then determines whether the distance between the two closest crowds is less than the optimal inclusion distance of a larger of the two closest crowds (step 1528). If the two closest crowds are of the same size (i.e., have the same number of users), then the optimal inclusion distance of either of the two closest crowds may be used. Alternatively, if the two closest crowds are of the same size, the optimal inclusion distances of both of the two closest crowds may be used such that the crowd analyzer 60 determines whether the distance between the two closest crowds is less than the optimal inclusion distances of both of the crowds. As another alternative, if the two closest crowds are of the same size, the crowd analyzer 60 may compare the distance between the two closest crowds to an average of the optimal inclusion distances of the two crowds.

If the distance between the two closest crowds is greater than the optimal inclusion distance, the process proceeds to step 1540. However, if the distance between the two closest crowds is less than the optimal inclusion distance, the two crowds are merged (step 1530). The manner in which the two crowds are merged differs depending on whether the two crowds are pre-existing crowds or temporary crowds created for the spatial crowd formation process. If both crowds are pre-existing crowds, one of the two crowds is selected as a non-surviving crowd and the other is selected as a surviving crowd. If one crowd is larger than the other, the smaller crowd is selected as the non-surviving crowd and the larger crowd is selected as a surviving crowd. If the two crowds are of the same size, one of the crowds is selected as the surviving crowd and the other crowd is selected as the non-surviving crowd using any desired technique. The non-surviving crowd is then merged into the surviving crowd by adding the set or list of user records for the non-surviving crowd to the set or list of user records for the surviving crowd and setting the merged into field of the non-surviving crowd to a reference to the crowd record of the surviving crowd. In addition, the crowd analyzer 60 sets the previous crowd fields of the user records in the set or list of user records from the non-surviving crowd to a reference to the crowd record of the non-surviving crowd.

If one of the crowds is a temporary crowd and the other crowd is a pre-existing crowd, the temporary crowd is selected as the non-surviving crowd, and the pre-existing crowd is selected as the surviving crowd. The non-surviving crowd is then merged into the surviving crowd by adding the set or list of user records from the crowd record of the non-surviving crowd to the set or list of user records in the crowd record of the surviving crowd. However, since the non-surviving crowd is a temporary crowd, the previous crowd field(s) of the user record(s) of the user(s) in the non-surviving crowd are not set to a reference to the crowd record of the non-surviving crowd. Similarly, the crowd record of the temporary record may not have a merged into field, but, if it does, the merged into field is not set to a reference to the surviving crowd.

If both the crowds are temporary crowds, one of the two crowds is selected as a non-surviving crowd and the other is selected as a surviving crowd. If one crowd is larger than the other, the smaller crowd is selected as the non-surviving crowd and the larger crowd is selected as a surviving crowd. If the two crowds are of the same size, one of the crowds is selected as the surviving crowd and the other crowd is selected as the non-surviving crowd using any desired technique. The non-surviving crowd is then merged into the surviving crowd by adding the set or list of user records for the non-surviving crowd to the set or list of user records for the surviving crowd. However, since the non-surviving crowd is a temporary crowd, the previous crowd field(s) of the user record(s) of the user(s) in the non-surviving crowd are not set to a reference to the crowd record of the non-surviving crowd. Similarly, the crowd record of the temporary record may not have a merged into field, but, if it does, the merged into field is not set to a reference to the surviving crowd.

Next, the crowd analyzer 60 removes the non-surviving crowd (step 1532). In this embodiment, the manner in which the non-surviving crowd is removed depends on whether the non-surviving crowd is a pre-existing crowd or a temporary crowd. If the non-surviving crowd is a pre-existing crowd, the removal process is performed by removing or nulling the users field, the NE corner field, the SW corner field, and the center field of the crowd record of the non-surviving crowd. In this manner, the spatial information for the non-surviving crowd is removed from the corresponding crowd record such that the non-surviving or removed crowd will no longer be found in response to spatial-based queries on the datastore 66. However, the crowd snapshots for the non-surviving crowd are still available via the crowd record for the non-surviving crowd. In contrast, if the non-surviving crowd is a temporary crowd, the crowd analyzer 60 may remove the crowd by deleting the corresponding crowd record.

The crowd analyzer 60 also computes a new crowd center for the surviving crowd (step 1534). Again, a center of mass algorithm may be used to compute the crowd center of a crowd. In addition, a new optimal inclusion distance for the surviving crowd is computed (step 1536). In one embodiment, the new optimal inclusion distance for the surviving crowd is computed in the manner described above with respect to step 1334 of FIG. 8B.

At this point, the crowd analyzer 60 determines whether a maximum number of iterations have been performed (step 1538). If the maximum number of iterations has not been reached, the process returns to step 1518 and is repeated until either the distance between the two closest crowds is not less than the optimal inclusion distance of the larger crowd or the maximum number of iterations has been reached. At that point, the crowd analyzer 60 removes crowds with less than three users, or members (step 1540) and the process ends. As discussed above, in this embodiment, the manner in which a crowd is removed depends on whether the crowd is a pre-existing crowd or a temporary crowd. If the crowd is a pre-existing crowd, a removal process is performed by removing or nulling the users field, the NE corner field, the SW corner field, and the center field of the crowd record of the crowd. In this manner, the spatial information for the crowd is removed from the corresponding crowd record such that the crowd will no longer be found in response to spatial-based queries on the datastore 66. However, the crowd snapshots for the crowd are still available via the crowd record for the crowd. In contrast, if the crowd is a temporary crowd, the crowd analyzer 60 may remove the crowd by deleting the corresponding crowd record. In this manner, crowds having less than three members are removed in order to maintain privacy of individuals as well as groups of two users (e.g., a couple).

Figure 14A:
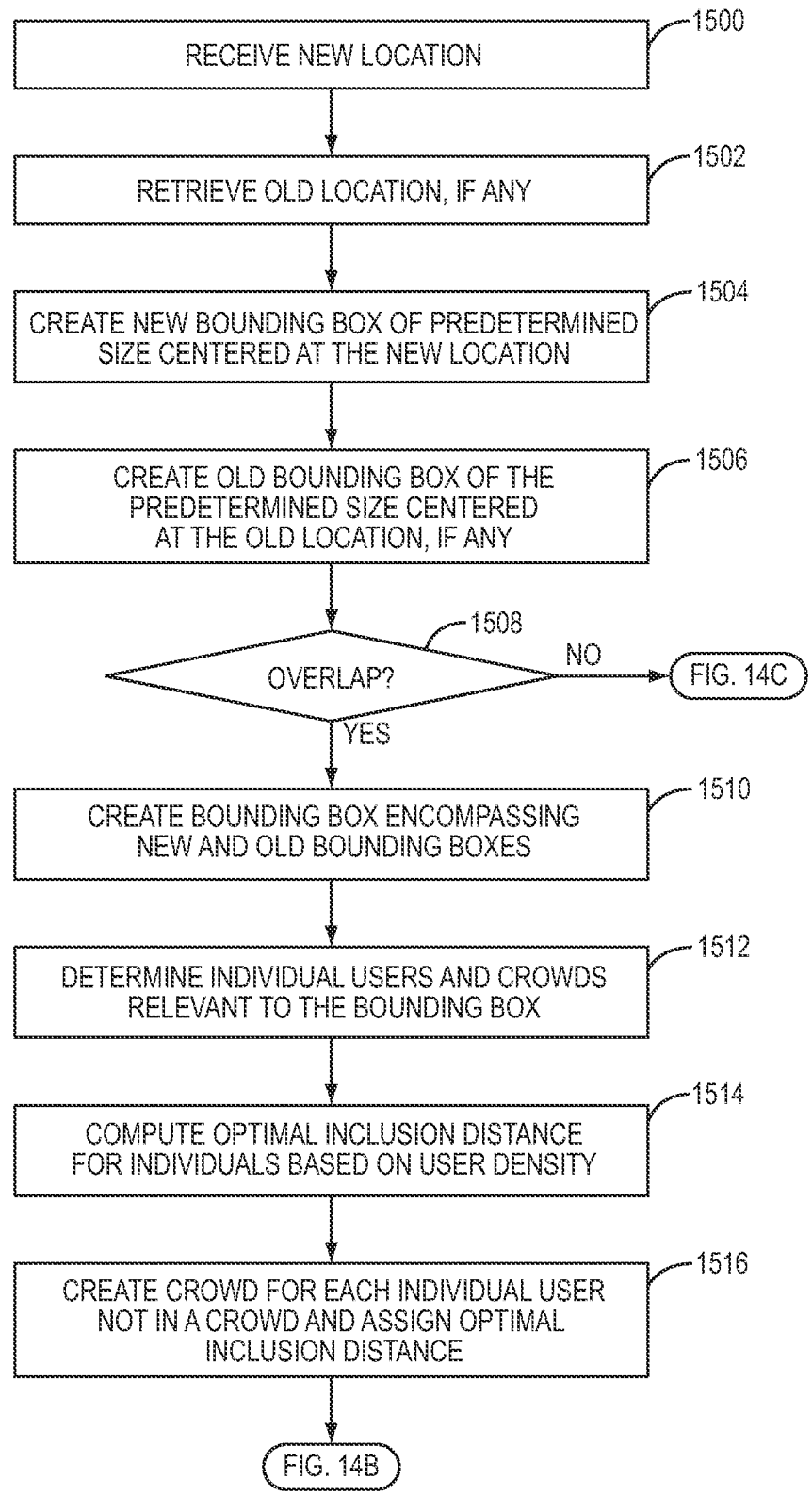
Figure 14B:
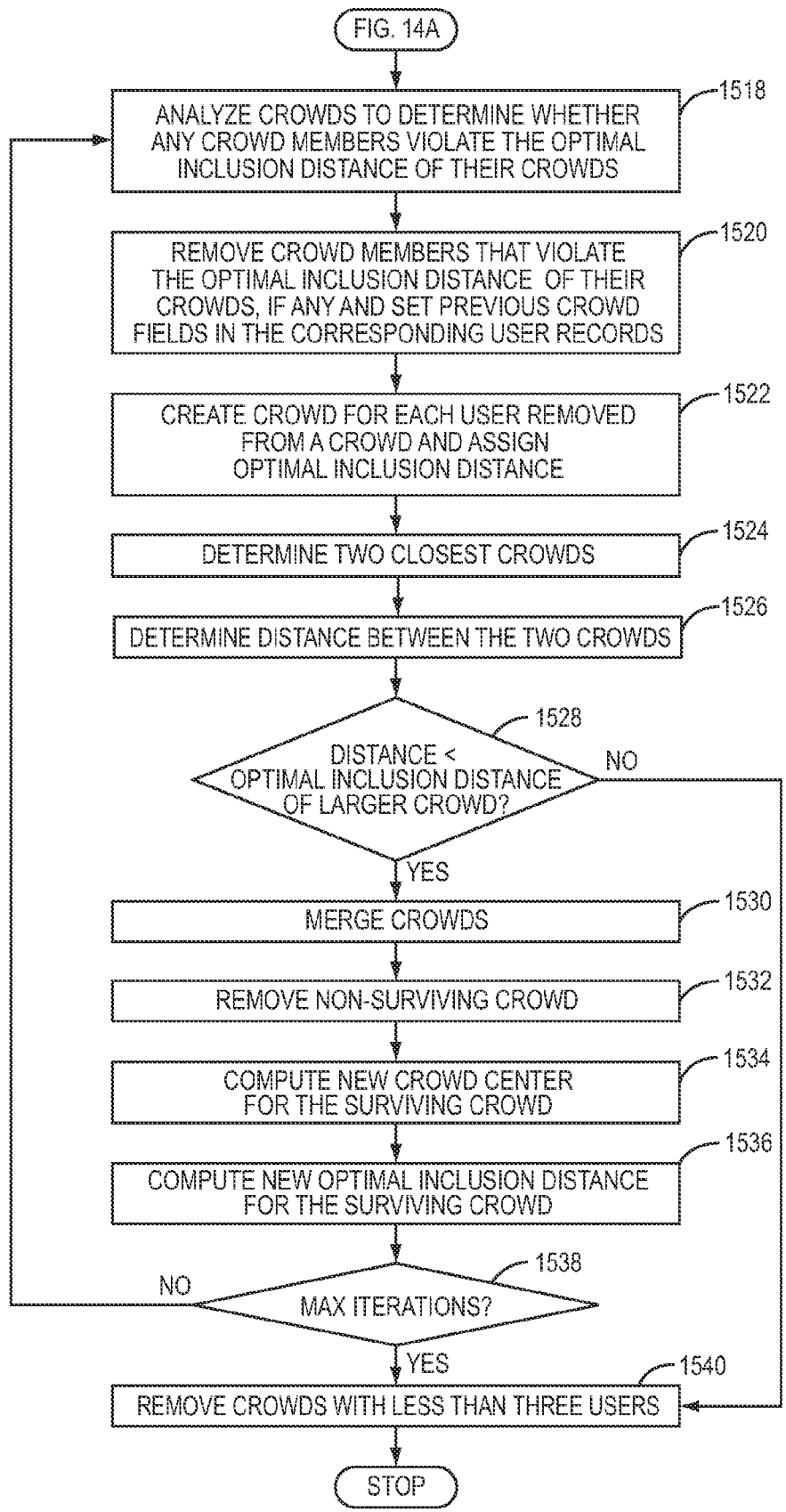
Figure 14C:
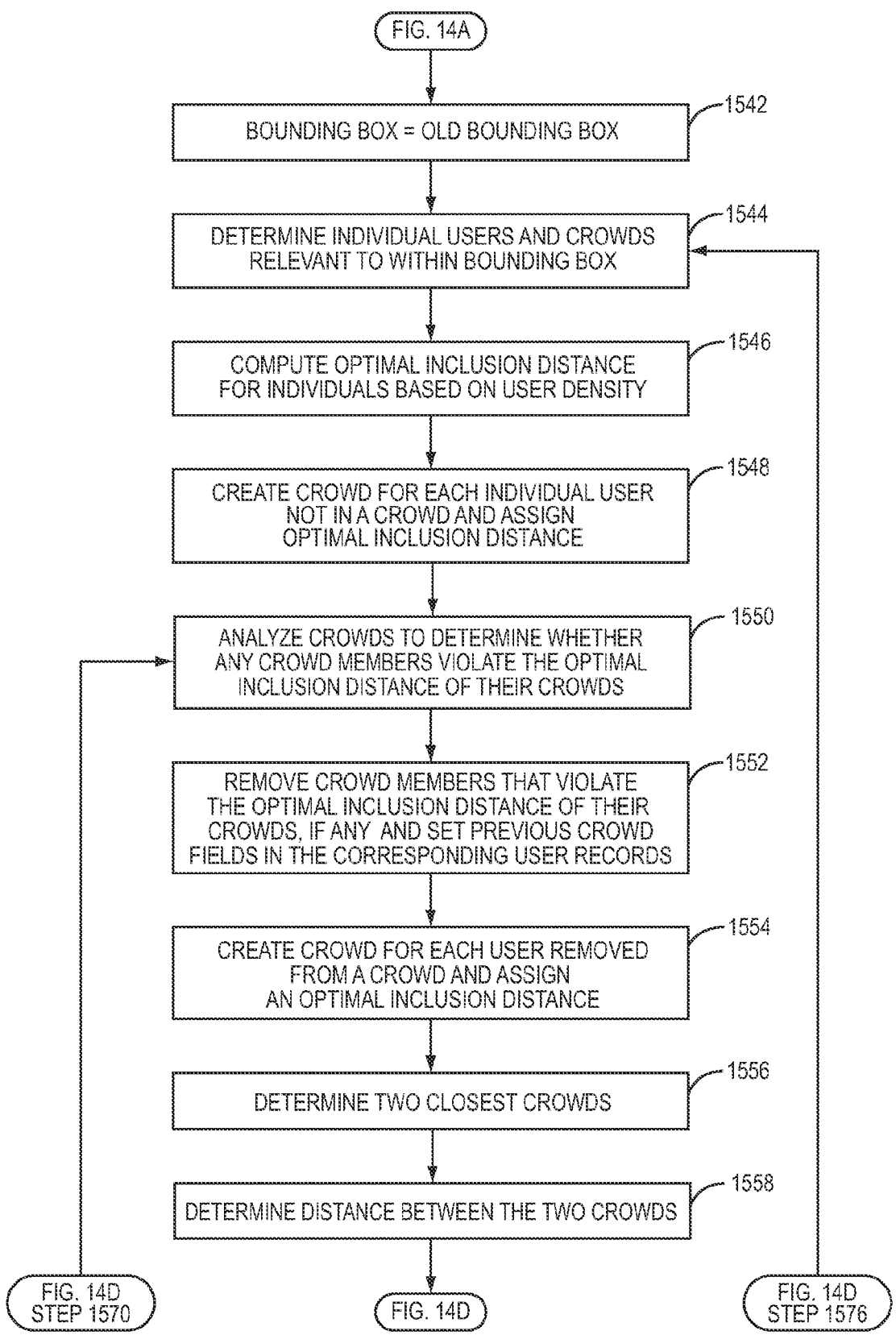
Figure 14D:
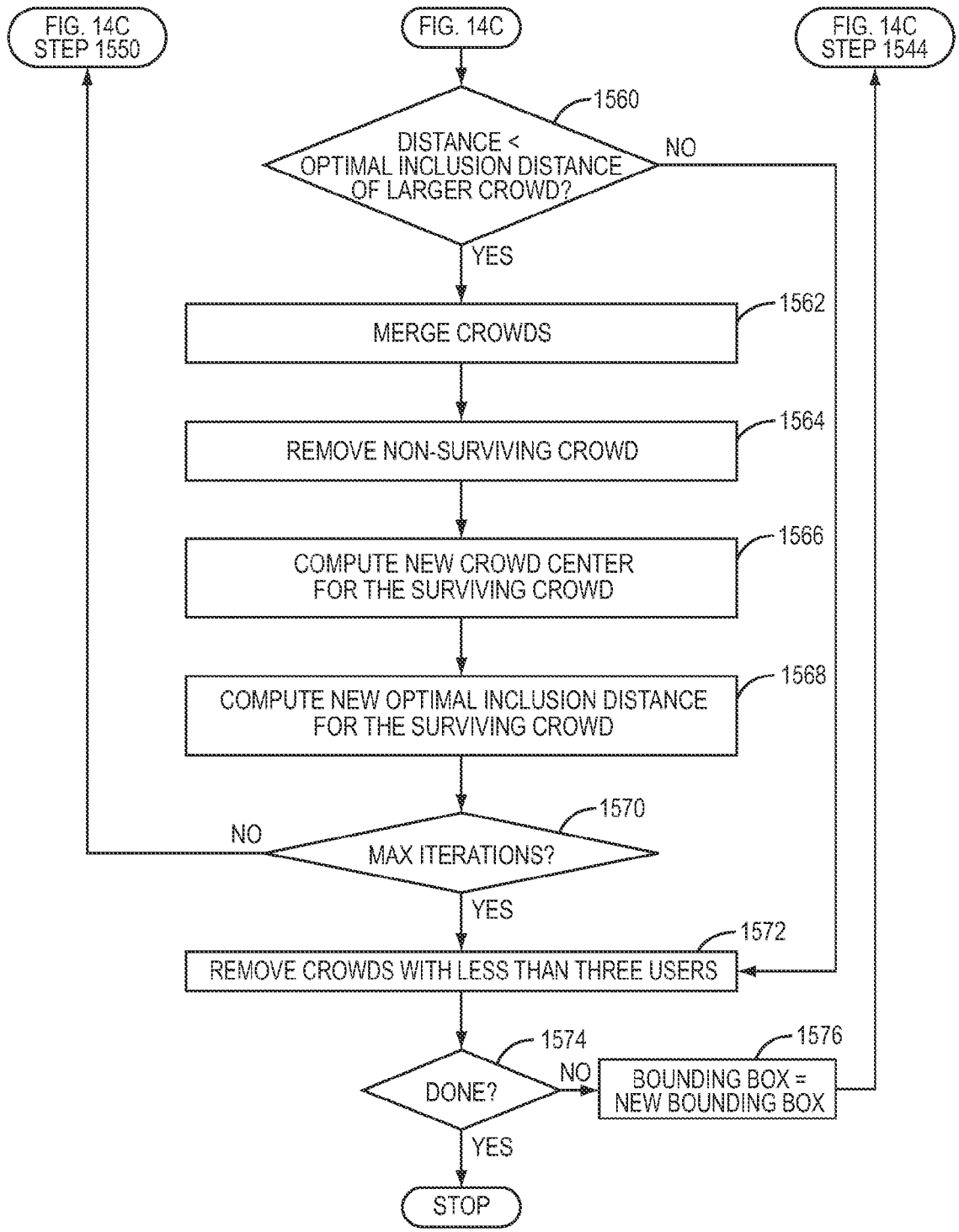

Returning to step 1508 in FIG. 14A, if the new and old bounding boxes do not overlap, the process proceeds to FIG. 14C and the bounding box to be processed is set to the old bounding box (step 1542). In general, the crowd analyzer 60 then processes the old bounding box in much that same manner as described above with respect to steps 1512 through 1540. More specifically, the crowd analyzer 60 determines the individual users and crowds relevant to the bounding box (step 1544). Again, note that the crowds relevant to the bounding box are pre-existing crowds resulting from previous iterations of the spatial crowd formation process. Next, the crowd analyzer 60 computes an optimal inclusion distance for individual users based on user density within the bounding box (step 1546). The optimal inclusion distance may be computed as described above with respect to step 1344 of FIG. 8C.

The crowd analyzer 60 then creates a crowd of one user for each individual user within the bounding box that is not already included in a crowd and sets the optimal inclusion distance for the crowds to the initial optimal inclusion distance (step 1548). The crowds created for the individual users are temporary crowds created for purposes of performing the crowd formation process. At this point, the crowd analyzer 60 analyzes the crowds in the bounding box to determine whether any crowd members (i.e., users in the crowds) violate the optimal inclusion distance of their crowds (step 1550). Any crowd member that violates the optimal inclusion distance of his or her crowd is then removed from that crowd and the previous crowd fields in the corresponding user records are set (step 1552). More specifically, in this embodiment, a member is removed from a crowd by removing the user record of the member from the set or list of user records in the crowd record of the crowd and setting the previous crowd stored in the user record of the user to the crowd from which the member has been removed. The crowd analyzer 60 then creates a crowd for each of the users removed from their crowds in step 1552 and sets the optimal inclusion distance for the newly created crowds to the initial optimal inclusion distance (step 1554).

Next, the crowd analyzer 60 determines the two closest crowds in the bounding box (step 1556) and a distance between the two closest crowds (step 1558). The distance between the two closest crowds is the distance between the crowd centers of the two closest crowds. The crowd analyzer 60 then determines whether the distance between the two closest crowds is less than the optimal inclusion distance of a larger of the two closest crowds (step 1560). If the two closest crowds are of the same size (i.e., have the same number of users), then the optimal inclusion distance of either of the two closest crowds may be used. Alternatively, if the two closest crowds are of the same size, the optimal inclusion distances of both of the two closest crowds may be used such that the crowd analyzer 60 determines whether the distance between the two closest crowds is less than the optimal inclusion distances of both of the two closest crowds. As another alternative, if the two closest crowds are of the same size, the crowd analyzer 60 may compare the distance between the two closest crowds to an average of the optimal inclusion distances of the two closest crowds.

If the distance between the two closest crowds is greater than the optimal inclusion distance, the process proceeds to step 1572. However, if the distance between the two closest crowds is less than the optimal inclusion distance, the two crowds are merged (step 1562). The manner in which the two crowds are merged differs depending on whether the two crowds are pre-existing crowds or temporary crowds created for the spatial crowd formation process. If both crowds are pre-existing crowds, one of the two crowds is selected as a non-surviving crowd and the other is selected as a surviving crowd. If one crowd is larger than the other, the smaller crowd is selected as the non-surviving crowd and the larger crowd is selected as a surviving crowd. If the two crowds are of the same size, one of the crowds is selected as the surviving crowd and the other crowd is selected as the non-surviving crowd using any desired technique. The non-surviving crowd is then merged into the surviving crowd by adding the set or list of user records for the non-surviving crowd to the set or list of user records for the surviving crowd and setting the merged into field of the non-surviving crowd to a reference to the crowd record of the surviving crowd. In addition, the crowd analyzer 60 sets the previous crowd fields of the set or list of user records from the non-surviving crowd to a reference to the crowd record of the non-surviving crowd.

If one of the crowds is a temporary crowd and the other crowd is a pre-existing crowd, the temporary crowd is selected as the non-surviving crowd, and the pre-existing crowd is selected as the surviving crowd. The non-surviving crowd is then merged into the surviving crowd by adding the user records from the set or list of user records from the crowd record of the non-surviving crowd to the set or list of user records in the crowd record of the surviving crowd. However, since the non-surviving crowd is a temporary crowd, the previous crowd field(s) of the user record(s) of the user(s) in the non-surviving crowd are not set to a reference to the crowd record of the non-surviving crowd. Similarly, the crowd record of the temporary record may not have a merged into field, but, if it does, the merged into field is not set to a reference to the surviving crowd.

If both the crowds are temporary crowds, one of the two crowds is selected as a non-surviving crowd and the other is selected as a surviving crowd. If one crowd is larger than the other, the smaller crowd is selected as the non-surviving crowd and the larger crowd is selected as a surviving crowd. If the two crowds are of the same size, one of the crowds is selected as the surviving crowd and the other crowd is selected as the non-surviving crowd using any desired technique. The non-surviving crowd is then merged into the surviving crowd by adding the set or list of user records for the non-surviving crowd to the set or list of user records for the surviving crowd. However, since the non-surviving crowd is a temporary crowd, the previous crowd field(s) of the user record(s) of the user(s) in the non-surviving crowd are not set to a reference to the crowd record of the non-surviving crowd. Similarly, the crowd record of the temporary record may not have a merged into field, but, if it does, the merged into field is not set to a reference to the surviving crowd.

Next, the crowd analyzer 60 removes the non-surviving crowd (step 1564). In this embodiment, the manner in which the non-surviving crowd is removed depends on whether the non-surviving crowd is a pre-existing crowd or a temporary crowd. If the non-surviving crowd is a pre-existing crowd, the removal process is performed by removing or nulling the users field, the NE corner field, the SW corner field, and the center field of the crowd record of the non-surviving crowd. In this manner, the spatial information for the non-surviving crowd is removed from the corresponding crowd record such that the non-surviving or removed crowd will no longer be found in response to spatial-based queries on the datastore 66. However, the crowd snapshots for the non-surviving crowd are still available via the crowd record for the non-surviving crowd. In contrast, if the non-surviving crowd is a temporary crowd, the crowd analyzer 60 may remove the crowd by deleting the corresponding crowd record.

The crowd analyzer 60 also computes a new crowd center for the surviving crowd (step 1566). Again, a center of mass algorithm may be used to compute the crowd center of a crowd. In addition, a new optimal inclusion distance for the surviving crowd is computed (step 1568). In one embodiment, the new optimal inclusion distance for the surviving crowd is computed in the manner described above with respect to step 1364 of FIG. 8D.

At this point, the crowd analyzer 60 determines whether a maximum number of iterations have been performed (step 1570). If the maximum number of iterations has not been reached, the process returns to step 1550 and is repeated until either the distance between the two closest crowds is not less than the optimal inclusion distance of the larger crowd or the maximum number of iterations has been reached. At that point, the crowd analyzer 60 removes crowds with less than three users, or members (step 1572). As discussed above, in this embodiment, the manner in which a crowd is removed depends on whether the crowd is a pre-existing crowd or a temporary crowd. If the crowd is a pre-existing crowd, a removal process is performed by removing or nulling the users field, the NE corner field, the SW corner field, and the center field of the crowd record of the crowd. In this manner, the spatial information for the crowd is removed from the corresponding crowd record such that the crowd will no longer be found in response to spatial-based queries on the datastore 66. However, the crowd snapshots for the crowd are still available via the crowd record for the crowd. In contrast, if the crowd is a temporary crowd, the crowd analyzer 60 may remove the crowd by deleting the corresponding crowd record. In this manner, crowds having less than three members are removed in order to maintain privacy of individuals as well as groups of two users (e.g., a couple).

The crowd analyzer 60 then determines whether the crowd formation process for the new and old bounding boxes is done (step 1574). In other words, the crowd analyzer 60 determines whether both the new and old bounding boxes have been processed. If not, the bounding box is set to the new bounding box (step 1576), and the process returns to step 1544 and is repeated for the new bounding box. Once both the new and old bounding boxes have been processed, the crowd formation process ends.

FIG. 15 illustrates a process for creating crowd snapshots according to one embodiment of the present disclosure. In this embodiment, after the spatial crowd formation process of FIGS. 14A through 14D is performed in response to a location update for a user, the crowd analyzer 60 detects crowd change events, if any, for the relevant crowds (step 1600). The relevant crowds are pre-existing crowds that are within the bounding region(s) processed during the spatial crowd formation process in response to the location update for the user. The crowd analyzer 60 may detect crowd change events by comparing the crowd records of the relevant crowds before and after performing the spatial crowd formation process in response to the location update for the user. The crowd change events may be a change in the users in the crowd, a change to a location of one of the users within the crowd, or a change in the spatial information for the crowd (e.g., the NE corner, the SW corner, or the crowd center). Note that if multiple crowd change events are detected for a single crowd, then those crowd change events are preferably consolidated into a single crowd change event.

Next, the crowd analyzer 60 determines whether there are any crowd change events (step 1602). If not, the process ends. Otherwise, the crowd analyzer 60 gets the next crowd change event (step 1604) and generates a crowd snapshot for a corresponding crowd (step 1606). More specifically, the crowd change event identifies a crowd record stored for a crowd for which the crowd change event was detected. A crowd snapshot is then created for that crowd by creating a new crowd snapshot record for the crowd and adding the new crowd snapshot to the list of crowd snapshots stored in the crowd record for the crowd.

In order to create the crowd snapshot for the crowd, the crowd analyzer 60 anonymizes the user records for the users in the crowd at the current time (i.e., the time of creating the crowd snapshot) to provide a set or list of anonymized user records that is to be stored in the crowd snapshot. Anonymization maintains the privacy of the users in the crowd. FIG. 16 graphically illustrates one embodiment of the anonymization process. In this embodiment, anonymization is performed by creating anonymous user records for the users in the list of users from the crowd record of the crowd. The anonymous user records are not connected back to the users 20-1 through 20-N. More specifically, as illustrated in FIG. 16, each user in the list of users for the crowd has a corresponding user record 142. The user record 142 includes a unique user identifier (ID) for the user, the current location of the user, and the user profile of the user. The user record 142 may include additional fields such as, for example, a current crowd field and a previous crowd field, as discussed above with respect to FIG. 13. The user profile includes keywords for each of a number of profile categories, which are stored in corresponding profile category records 144-1 through 144-M. Each of the profile category records 144-1 through 144-M includes a user ID for the corresponding user which may be the same user ID used in the user record 142, a category ID, and a list of keywords for the profile category.

For anonymization, an anonymous user record 146 is created from the user record 142. In the anonymous user record 146, the user ID is replaced with a new user ID that is not connected back to the user, which is also referred to herein as an anonymous user ID. This new user ID is preferably different than any other user ID used for anonymous user records created from the user record of the user for any previous or subsequent crowd snapshots. In this manner, anonymous user records for a single user created over time cannot be linked to one another.

In addition, anonymous profile category records 148-1 through 148-M are created for the profile category records 144-1 through 144-M. In the anonymous profile category records 148-1 through 148-M, the user ID is replaced with a new user ID, which may be the same new user ID included in the anonymous user record 146. The anonymous profile category records 148-1 through 148-M include the same category IDs and lists of keywords as the corresponding profile category records 144-1 through 144-M. Note that the location of the user is not stored in the anonymous user record 146. With respect to location, it is sufficient that the anonymous user record 146 is associated with a crowd snapshot, which includes spatial information.

In another embodiment, anonymization is performed in a manner similar to that described above with respect to FIG. 16. However, in this embodiment, the profile category records for the group of users in the crowd at the time of creating the crowd snapshot may be selectively randomized among the anonymous user records of those users. In other words, each anonymous user record would have a user profile including a selectively randomized set of profile category records (including keywords) from a cumulative list of profile category records for all of the users in the crowd.

In yet another embodiment, rather than creating anonymous user records 146 for the users in the lists maintained for the location buckets, anonymization of the user records of the users in the crowd may be performed by storing an aggregate user profile for the crowd. The aggregate user profile may include a list of all keywords and potentially the number of occurrences of each keyword in the user profiles of the corresponding group of users. In this manner, the data stored in the crowd snapshot is not connected back to the users 20-1 through 20-N.

Returning to FIG. 15, in addition to the anonymized user records, the crowd snapshot record for the crowd snapshot includes the NE corner, the SW corner, and the center of the crowd at the current time as well as a timestamp defining the current time as the sample time at which the crowd snapshot record was created. Locations of users in the crowd that define the outer boundary of the crowd at the current time are stored in the crowd snapshot record as the vertices of the crowd. Still further, one or more crowd characteristics of the crowd at the current time are determined and stored in the crowd snapshot. The crowd characteristics may include, for example, best-case and/or worst-case average Degree of Separation (DOS) for the crowd, a degree of fragmentation of the crowd, a degree of bi-directionality of relationship for the crowd, or the like. The manner in which these crowd characteristics are determined is described below in detail. After creating the crowd snapshot, the crowd analyzer 60 determines whether there are any more crowd change events (step 1608). If so, the process returns to step 1604 and is repeated for the next crowd change event. Once all of the crowd change events are processed, the process ends.

FIG. 17 illustrates a process that may be used to re-establish crowds and detect crowd splits according to one embodiment of the present disclosure. In general, in order to accurately track a crowd, it is preferable to enable crowds that have been removed to be re-established in the future. For example, a crowd may be removed as a result of users in the crowd deactivating their MAP applications (or powering down their mobile devices). If those users then move together to a different location and then reactivate their MAP applications (or power on their mobile devices), it is preferable for the resulting crowd to be identified as the same crowd that was previously removed. In other words, it is desirable to re-establish the crowd. In addition, in order to accurately track a crowd, it is desirable to capture when the crowd splits into two or more crowds.

Accordingly, in this embodiment, the spatial crowd formation process of FIGS. 14A through 146D is performed in response to a location update for a user. The crowd analyzer 60 then gets a next relevant crowd (step 1700). The relevant crowds are pre-existing and new crowds that are within the bounding region(s) processed during the spatial crowd formation process in response to the location update for the user. Note that, for the first iteration, the next relevant crowd is the first relevant crowd. The crowd analyzer 60 then determines a maximum number of users in the crowd from a common previous crowd (step 1702). More specifically, the crowd analyzer 60 examines the previous crowd fields of the user records of all of the users in the crowd to identify users from a common previous crowd. For each previous crowd found in the user records of the users in the crowd, the crowd analyzer 60 counts the number of users in the crowd that are from that previous crowd. The crowd analyzer 60 then selects the previous crowd having the highest number of users, and determines that the number of users counted for the selected previous crowd is the maximum number of users in the crowd from a common previous crowd.

The crowd analyzer 60 then determines whether the maximum number of users in the crowd from a common previous crowd is greater than a predefined threshold number of users (step 1704). In an alternative embodiment, rather than determining the maximum number of users from a common previous crowd and comparing that number to a predefined threshold number of users, a maximum percentage of users in the crowd from a common previous crowd may be determined and compared to a predefined threshold percentage. If the maximum number of users in the crowd from a common previous crowd is not greater than the predefined threshold number of users, the process proceeds to step 1710. Otherwise, the crowd analyzer 60 determines whether the common previous crowd has been removed (step 1706). If so, then the crowd is re-established as the common previous crowd (step 1708). More specifically, in this embodiment, the crowd is re-established as the common previous crowd by storing the set or list of user records, the NE corner, the SW corner, and the center from the crowd record of the crowd in the crowd record of the common previous crowd. The crowd record for the crowd may then be deleted. In addition, the previous crowd fields of the users from the common previous crowd may be set to null or otherwise cleared. Once the common previous crowd is re-established, the crowd analyzer 60 determines whether there are more relevant crowds to process (step 1710). If so, the process returns to step 1700 and is repeated until all relevant crowds are processed.

Returning to step 1706, if the common previous crowd has not been removed, the crowd analyzer 60 identifies the crowd as being split from the common previous crowd (step 1712). More specifically, in this embodiment, the crowd analyzer 60 stores a reference to the crowd record of the common previous crowd in the split from field of the crowd record of the crowd. At this point, the crowd analyzer 60 then determines whether there are more relevant crowds to process (step 1710). If so, the process returns to step 1700 and is repeated until all relevant crowds are processed, at which time the process ends.

FIG. 18 graphically illustrates the process of re-establishing a crowd for an exemplary crowd according to one embodiment of the present disclosure. As illustrated, at TIME 1, CROWD A has been formed and a corresponding crowd record has been created and stored. Between TIME 1 and TIME 2, three users from CROWD A have moved, thereby resulting in the removal of those three users from CROWD A as well as the removal of CROWD A. Again, CROWD A has been removed by removing the set or list of user records and spatial information from the crowd record for CROWD A. At TIME 2, a new crowd, CROWD B, has been formed for the three users that were previously in CROWD A. As such, the previous crowd fields for the three users now in CROWD B indicate that the three users are from CROWD A. Using the process of FIG. 17, the crowd analyzer 60 determines that the three users in CROWD B have a common previous crowd, namely, CROWD A. As a result, the crowd analyzer 60 re-establishes CROWD B as CROWD A, as shown at TIME 2'.

FIG. 19 graphically illustrates the process for capturing a crowd split for an exemplary crowd according to one embodiment of the present disclosure. As illustrated, at TIME 1, CROWD A has been formed and a corresponding crowd record has been created and stored. Between TIME 1 and TIME 2, four users from CROWD A have separated from the other three users of CROWD A. As a result, a new crowd, CROWD B, has been formed at TIME 2 for the four users from CROWD A. Using the process of FIG. 17, the crowd analyzer 60 determines that the four users in CROWD B are all from CROWD A and therefore identifies CROWD B as being split from CROWD A.

FIG. 20 graphically illustrates the merging of two exemplary pre-existing crowds according to one embodiment of the present disclosure. As discussed above, the merger of crowds is performed during the spatial crowd formation process of FIGS. 14A through 14D. As illustrated, at TIME 1, CROWD A and CROWD B have been formed and corresponding crowd records have been created and stored. Between TIME 1 and TIME 2, CROWD A and CROWD B move close to one another such that the distance between CROWD A and CROWD B is less than the optimal inclusion distance(s) at TIME 2. As such, the crowd analyzer 60 merges CROWD A into CROWD B at TIME 2'. As part of the merger, CROWD A is removed, and the merged into field of the crowd record for CROWD A is set to a reference to the crowd record for CROWD B. In addition, the previous crowd fields in the user records of the user from CROWD A are set to a reference to the crowd record of CROWD A.

FIG. 21 illustrates the operation of the MAP server 12 of FIG. 1 to serve a request for crowd tracking data for a crowd according to one embodiment of the present disclosure. First, the subscriber device 22 sends a crowd tracking data request for a crowd to the MAP server 12 (step 1800). Note that access to crowd tracking data is preferably a subscription service only available to subscribers, such as the subscriber 24 at the subscriber device 22, for a subscription fee. The crowd tracking data request identifies a particular crowd. For example, in one embodiment, the crowd data for a number of crowds near a POI or within an AOI is presented to the subscriber 24 at the subscriber device 22 in the manner described above. The subscriber 24 may then select one of those crowds and initiate a request for crowd tracking data for the selected crowd. In response, the subscriber device 22 sends the crowd tracking data request for the selected crowd to the MAP server 12.

In response to receiving the crowd tracking data request, the MAP server 12, and more specifically the crowd analyzer 60, obtains relevant crowd snapshots for the crowd (step 1802). In one embodiment, the crowd tracking data request is a general crowd tracking data request for the crowd. As such, the relevant crowd snapshots are all crowd snapshots for the crowd. In another embodiment, the crowd tracking data request may include one or more criteria to be used to identify the relevant crowd snapshots. The one or more criteria may include time-based criteria such that only those crowd snapshots for the crowd that satisfy the time-based criteria are identified as the relevant crowd snapshots. For example, the time-based criteria may define a range of dates such as Oct. 1, 2009 through Oct. 8, 2009 or define a range of times within a particular day such as 5 pm through 9 pm on Oct. 1, 2009. The one or more criteria may additionally or alternatively include user-based criteria such that only those crowd snapshots including anonymous users satisfying the user-based criteria are identified as the relevant crowd snapshots. For example, the user-based criteria may include one or more interests and a minimum number or percentage of users such that only those crowd snapshots including at least the minimum number or percentage of anonymous users having the one or more interests are identified as the relevant crowd snapshots. Note that by using user-based criteria, the subscriber 24 is enabled to track sub-crowds within a crowd.

Next, the crowd analyzer 60 of the MAP server 12 generates crowd tracking data for the crowd based on the relevant crowd snapshots (step 1804). The crowd tracking data includes data indicative of the location of the crowd over time, which can be determined based on the spatial information and sample times from the relevant crowd snapshots. In addition, the crowd tracking data may include an aggregate profile for the crowd for each of the relevant crowd snapshots or at least some of the relevant crowd snapshots, an average aggregate profile for all of the relevant crowd snapshots, an average aggregate profile for a subset of the relevant crowd snapshots, or average aggregate profiles for a number of subsets of the relevant crowd snapshots. For example, the relevant crowd snapshots may be divided into a number of time bands such that at least some of the time bands include multiple relevant crowd snapshots. An average crowd snapshot may then be created for each of the time bands. The crowd analyzer 60 may utilize the aggregation engine 62 to obtain an aggregate profile for a crowd snapshot based on the interests of the anonymous users in the crowd snapshot. More specifically, an aggregate profile for a crowd snapshot may be computed by comparing the interests of the anonymous users to one another or by comparing the interests of the anonymous users to a target profile. The crowd tracking data may also contain other information derived from the relevant crowd snapshots such as, for example, the number of users in the relevant crowd snapshots, crowd characteristics for the crowd for the relevant crowd snapshots, or the like.

The crowd analyzer 60 returns the crowd tracking data for the crowd to the subscriber device 22 (step 1806). Note that in the embodiment where the subscriber device 22 interacts with the MAP server 12 via the web browser 40, the MAP server 12 returns the crowd tracking data to the subscriber device 22 in a format suitable for use by the web browser 40. For example, the crowd tracking data may be returned via a web page including a map, wherein indicators of the location of the crowd over time as defined by the relevant crowd snapshots may be overlaid upon the map. The subscriber 24 may then be enabled to select one of those indicators to view additional information regarding the crowd at that time such as, for example, an aggregate profile of a corresponding crowd snapshot of the crowd. Once the crowd tracking data is received at the subscriber device 22, the crowd tracking data is presented to the subscriber 24 (step 1808).

FIGS. 22 through 27 describe the operation of the system 10, and more specifically the prediction server 26, to predict future locations of one or more of the users 20-1 through 20-N according to one embodiment of the present disclosure. FIG. 22 illustrates the operation of the prediction server 26 to receive and process a prediction request from the prediction-consuming application 28 according to one embodiment of the present disclosure. First, the prediction server 26 generates a prediction basis for one or more of the users 20-1 through 20-N (step 1900). Using the user 20-1 as an example, the prediction basis for the user 20-1 includes crowd data for each of a number of reoccurring time windows. Specifically, for each reoccurring time window, the predication basis includes crowd data for one or more, but preferably multiple, instances of the reoccurring time window. Further, for each instance of a reoccurring time window, the crowd data in the prediction basis is crowd data for a crowd in which the user 20-1 was included during that instance of the reoccurring time window. The crowd data for an instance of a reoccurring time window may include a degree of correlation between the user profile of the user 20-1 and the user profiles of other users in the corresponding crowd, a degree of correlation of the user profiles of the users in the corresponding crowd to one another, a crowd size of the corresponding crowd, and/or one or more crowd characteristics of the corresponding crowd. The one or more crowd characteristics may include a best-case average DOS for the corresponding crowd, a worst-case average DOS for the corresponding crowd, a degree of fragmentation of the corresponding crowd, a degree of bidirectionality of relationships for the corresponding crowd, or the like. Note that generation of the prediction basis for each of the one or more users is a continuing process that is repeated for each instance of each of the reoccurring time windows. Also note that the reoccurring time windows may be the same for all users or different for different users or different types of users. Further, the reoccurring time windows may be system-defined or configurable by the corresponding users 20-1 through 20-N.

At some point in time, the prediction-consuming application 28 sends a prediction request to the prediction server 26 (step 1902). The prediction request preferably identifies a subject user for which one or more predicted future locations are desired. The subject user is one of the users 20-1 through 20-N. In response to the prediction request, the prediction server 26 generates one or more predictions based on the prediction basis for the subject user (step 1904). More specifically, as discussed below in detail, the prediction server 26 compares at least a subset of relevant crowd data from the prediction basis of the subject user along with current crowd data for the subject user to first determine whether the subject user is likely to move. If so, the prediction server 26 obtains a list of POIs and/or crowds that match or are expected to match one or more crowd-based criteria derived from the at least a subset of the relevant crowd data from the prediction basis of the subject user. The matching POIs and/or locations of the matching crowds are then provided as predicted future locations for the subject user. The prediction server 26 then returns the one or more predicted future locations for the subject user to the prediction-consuming application 28 (step 1906). The one or more predicted future locations are then utilized by the prediction-consuming application 28 to provide a desired service such as, for example, targeted advertising.

FIG. 23 illustrates the operation of the prediction server 26 to generate a prediction basis for a user according to one embodiment of the present disclosure. First, the prediction server 26 determines whether it is time to get crowd data for the prediction basis of the user (step 2000). As discussed above, the prediction basis includes crowd data for a number of instances of a number of reoccurring time windows. In one embodiment, the prediction server 26 gets crowd data at a predefined time during each instance of each of the reoccurring time windows. For example, if the reoccurring time windows are the days of the week, the prediction server 26 may get crowd data for the user at a particular time during each day of the week (e.g., 10 A.M., Noon, 2 P.M., 4 P.M., 6 P.M., or the like). As another example, if the reoccurring time windows are two hour periods during each day of the week (e.g., 10 A.M.-Noon on Monday, Noon-2 P.M. on Monday, etc.), the prediction server 26 may get crowd data for the user at a particular time during each of those reoccurring time windows (e.g., at the start of each of the reoccurring time windows or at the end of each of the reoccurring time windows). If it is not time to get crowd data, the process returns to step 2000 and is repeated. In implementation, a predetermined time-out period may be utilized before returning to step 2000.

Once it is time to get crowd data for one of the reoccurring time windows, the prediction server 26 gets current crowd data for the user (step 2002). More specifically, in this embodiment, the prediction server 26 sends a request to the MAP server 12 for the current crowd data for the user. In response, the MAP server 12 identifies the crowd in which the user is current included, if any. The MAP server 12 then obtains crowd data for the identified crowd. In this embodiment, the crowd data obtained for the crowd includes a size of the crowd, a degree of correlation between the user profile of the user and the user profiles of the other users in the crowd, one or more crowd characteristics of the crowd, or any combination thereof. Again, the one or more crowd characteristics may include a best-base average DOS for the crowd, a worst-case average DOS for the crowd, a degree of fragmentation of the crowd, a degree of bidirectionality of relationships for the crowd, or the like. The prediction server 26 then stores the crowd data for the crowd in the prediction basis for the user as crowd data for an instance of the corresponding reoccurring time window (step 2004). For example, if the reoccurring time window is Monday, then the crowd data is stored as crowd data for one instance (i.e., one particular Monday) for the reoccurring Monday time window. At this point, the process returns to step 2000 and is repeated.

FIG. 24 graphically illustrates an exemplary prediction basis generated by the prediction server 26 for a user according to one embodiment of the present disclosure. In this example, the reoccurring time windows are the days of the week and the crowd data for each instance of each reoccurring time window has three components, namely, crowd size, DOS, and degree of correlation of user profiles for the crowd. As such, the crowd data for each instance of each reoccurring time window is represented as a point (i.e., a crowd data point) in 3-Dimensional space where each component of the crowd data is one dimension. However, the number of components in the crowd data for each instance of each reoccurring time window may be any number greater than or equal to one. As such, the number of dimensions used to represent the crowd data may vary depending on the number of components in the crowd data. Note that in FIG. 24, the size of the circles in the graph as used to show depth such that larger circles are closer to the origin with respect to the z-axis, which is the axis for DOS.

As illustrated, the crowd data points for the reoccurring time window for Thursdays are in a cluster. Specifically, in this example, the crowd data points for the reoccurring Thursday time window are clustered around a crowd data point representing a crowd size of 10, a degree of correction of approximately 0.9 which is a high degree of correlation, and a DOS of 1. The DOS in FIG. 24 may be either the best-case average DOS or the worst-case average DOS for the crowd. As a resulting of the clustering of the crowd data points for the reoccurring Thursday time window, the prediction server 26 can predict that the user will likely be in a crowd having similar crowd data on future Thursdays.

Similarly, in this example, the crowd data points for the Saturday reoccurring time window (i.e., Saturdays) are clustered around a crowd data point representing a crowd size of 1 and a maximum DOS and minimum correlation, which indicates that the user is typically alone on Saturdays. Particularly, when the user is not in a crowd, the corresponding crowd data in the user's prediction basis may indicate a crowd size of 1, a maximum DOS, and a minimum correlation. This data may be used by the prediction server 26 to predict that the user is likely to be alone on future Saturdays.

The crowd data points for the other days (i.e., the other reoccurring time windows) are not clustered in this example. However, even in this situation, the prediction server 26 may analyze the crowd data points for each of the days to detect patterns. For example, the crowd data points for Sundays may indicate that the user is in a particular type of crowd (e.g., large crowd with moderate to high DOS and high correlation) every other Sunday. This may occur if, for example, the user regularly attends a church service every other Sunday. This pattern may be used by the prediction server 26 when predicting future locations of the user on Sundays.

FIG. 25 illustrates a process performed by the prediction server 26 to generate one or more predicted future locations for a subject user according to one embodiment of the present disclosure. Specifically, FIG. 25 is a more detailed illustration of one embodiment of step 1904 of FIG. 22. First, the prediction server 26 obtains current crowd data for a subject user of a prediction request (step 2100). More specifically, the prediction server 26 sends a request to the MAP server 12 for current crowd data for the subject user. In response, the MAP server 12 obtains current crowd data for the subject user and returns the current crowd data to the prediction server 26. In one embodiment, the MAP server 12 reactively performs the spatial crowd formation process of FIG. 6 for geographic area or bounding region in which the subject user is currently located. If the subject user is not in a crowd, the MAP server 12 returns crowd data indicating that the subject user is not in a crowd to the prediction server 26. If the subject user is in a crowd, then the MAP server 12 generates crowd data for the crowd such as, for example, the crowd size of the crowd, a degree of correlation of the user profile of the subject user to the user profiles of the other users in the crowd, a degree of correlation of the user profiles of the users in the crowd to one another, one or more crowd characteristics of the crowd, or any combination thereof. Once the MAP server 12 obtains the crowd data for the current crowd of the subject user, the MAP server 12 returns the crowd data to the prediction server 26 as the current crowd data of the subject user.

In another embodiment, the MAP server 12 proactively forms crowds using the crowd formation process of FIG. 6, FIGS. 8A through 8D, or FIGS. 14A through 14D. As such, in this embodiment, the MAP server 12 queries the datastore 66 to identify the crowd in which the subject user is currently included, if any. If the subject user is not currently in a crowd, the MAP server 12 returns crowd data indicating that the subject user is not in a crowd to the prediction server 26. If the subject user is currently in a crowd, the MAP server 12 obtains crowd data for that crowd. Some or all of the crowd data for the crowd may be proactively generated by the MAP server 12 and stored in the datastore 66. For example, the crowd size of the crowd, a degree of correlation between the user profiles of the users in the crowd (i.e., the degree of correlation of the user profiles of the users in the crowd to one another), and/or one or more crowd characteristics of the crowd may be generated at the time of forming the crowd or creating the most recent crowd snapshot of the crowd and stored in the datastore 66. Alternatively, all or a portion of the crowd data for the crowd may be generated reactively in response to the prediction request. For example, the MAP server 12 may reactively generate one or more characteristics of the crowd and/or a correlation between the user profile of the subject user and the user profiles of the other users in the crowd. The MAP server 12 then returns the crowd data to the prediction server 26 as the current crowd data of the subject user.

In addition to obtaining the current crowd data for the subject user, the prediction server 26 obtains relevant crowd data from the prediction basis of the subject user (step 2102). The relevant crowd data from the prediction basis is preferably the crowd data from the prediction basis for the current reoccurring time window (i.e., the reoccurring time window in which the current time is included). For example, if it is currently Monday and one of the reoccurring time windows is Monday, then the relevant crowd data from the prediction basis is preferably crowd data from the predication basis for the reoccurring Monday time window (i.e., crowd data from the prediction basis for Mondays). Alternatively, the relevant crowd data from the prediction basis may be the crowd data from the prediction basis for the immediately following reoccurring time window. This may be particularly beneficial if the current time is at or near the end of the current reoccurring time window.

Next, the prediction server 26 determines whether the subject user is likely to move to a new location based on a comparison of the current crowd data of the subject user and all or at least a subset of the relevant crowd data from the prediction basis of the subject user (step 2104). More specifically, in one embodiment, the prediction server 26 represents the current crowd data as a crowd data point in n-dimensional space where each component of the current crowd data (e.g., crowd size, correlation of user interests, DOS, etc.) corresponds to one dimension in the n-dimensional space in a manner similar to that illustrated above in FIG. 24. Likewise, the relevant crowd data from the prediction basis is represented as a number of crowd data points in the same n-dimensional space in a manner similar to that illustrated above in FIG. 24. In one embodiment, if all of the crowd data points representing the relevant crowd data from the prediction basis are in a cluster, then all of the crowd data points are used to determine whether the subject user is likely to move. Crowd data points are in a cluster if, for example, they are within a predefined threshold distance from one another in the n-dimensional space. The prediction server 26 then computes or otherwise determines a vector magnitude indicative of a difference between the crowd data point for the current crowd data and the crowd data points for the relevant crowd data from the prediction basis. In one embodiment, the crowd data points for the relevant crowd data from the prediction basis are averaged or otherwise combined (e.g., combined via a center of mass calculation) to provide a combined crowd data point. The prediction server 26 then computes the vector magnitude of a vector from the crowd data point for the current crowd data to the combined crowd data point for the relevant crowd data from the prediction basis. The vector magnitude is compared to a predefined threshold such that a determination is made that the subject user is likely to move if the vector magnitude is larger than the predefined threshold. Otherwise, a determination is made that the subject user is not likely to move.

In contrast, if the crowd data points representing the relevant crowd data from the prediction basis are not in a cluster, the prediction server 26 may identify a subset of the crowd data points to be used to determine whether the subject user is likely to move. For example, the prediction server 26 may process the crowd data points representing the relevant crowd data from the prediction basis to identify one or more patterns (e.g., large crowds with high DOS and high correlation of user interests every $4^{th}$ instance of the corresponding reoccurring time window). Then, the prediction server 26 may identify one of the patterns that is currently applicable and select a subset of the crowd data points corresponding to the applicable pattern to be used to determine whether the subject user is likely to move. The prediction server 26 then computes or otherwise determines a vector magnitude indicative of a difference between the crowd data point for the current crowd data and the select subset of the crowd data points for the relevant crowd data from the prediction basis. In one embodiment, the select subset of the crowd data points for the relevant crowd data from the prediction basis are averaged or otherwise combined (e.g., combined via a center of mass calculation) to provide a combined crowd data point. The prediction server 26 then computes the vector magnitude of a vector from the crowd data point for the current crowd data to the combined crowd data point for the relevant crowd data from the prediction basis. The vector magnitude is compared to a predefined threshold such that a determination is made that the subject user is likely to move if the vector magnitude is larger than the predefined threshold. Otherwise, a determination is made that the subject user is not likely to move.

If a determination is made that the subject user is not likely to move, the process ends. If a determination is made that the subject user is likely to move, the prediction server 26 determines one or more crowd criteria descriptive of a type of crowd in which the subject user is expected to be included based on the relevant crowd data from the prediction basis of the subject user (step 2106). The one or more crowd criteria are referred to herein as expected crowd criteria. More specifically, if the crowd data points representing the relevant crowd data from the prediction basis are in a cluster in n-dimensional space, the prediction server 26 generates expected crowd criteria that either defines a point in the n-dimensional space about which the crowd data points are clustered or expected crowd criteria that defines a n-dimensional volume in the n-dimensional space that encompasses, or at least substantially encompasses, the crowd data points. The point in the n-dimensional space about which the crowd data points are clustered may be computed by averaging the crowd data points, calculating a center of mass of the crowd data points in the n-dimensional space, or the like. The volume encompassing the crowd data points in the n-dimensional space may be computed by, for each component of the crowd data, determining a range of values defined by a lowest value for that component of the crowd data found in the crowd data points and a highest value for that component of the crowd data found in the crowd data points.

If the crowd data points representing the relevant crowd data from the prediction basis are not in a cluster in the n-dimensional space, the prediction server 26 identifies one or more patterns in the crowd data points. The prediction server 26 then identifies an applicable pattern and then generates the expected crowd criteria based on a subset of the crowd data points that are in the applicable pattern. The subset of the crowd data points that are in the applicable pattern form a cluster. Again, the expected crowd criteria may define a point in the n-dimensional space about which the subset of the crowd data points are clustered or a volume in the n-dimensional space that encompasses or at least substantially encompasses the subset of the crowd data points.

Next, the prediction server 26 obtains a list of matching POIs and/or matching crowd locations that satisfy or are expected to satisfy the one or more expected crowd criteria (step 2108). More specifically, the prediction server 26 sends a request to the MAP server 12 including the expected crowd criteria from step 2106. In one embodiment, the MAP server 12 identifies POIs at which crowds that match the expected crowd criteria are currently located. In order to identify these matching POIs, the MAP server 12 first identifies POIs within a predefined geographic area around the current location of the subject user. For example, the MAP server 12 may first identify POIs within a predefined distance from the current location of the subject user. For each identified POI, the MAP server 12 identifies crowds currently at the identified POI and obtains crowd data for the identified crowds. In one embodiment, the MAP server 12 reactively generates the crowds at the identified POIs at this time using, for example, the process of FIG. 6. In another embodiment, the MAP server 12 proactively generates crowds using, for example, the process of FIG. 6, FIGS. 8A through 8D, or FIGS. 14A through 14D. In this case, the MAP server 12 identifies the crowds at the identified POIs by querying the datastore 66. The MAP server

12 also obtains crowd data for the identified crowds. The crowd data for the identified crowds may be generated proactively, reactively, or a combination thereof. For each of the identified crowds, the MAP server 12 then compares the crowd data for the crowd to the expected crowd criteria. If the crowd data for the crowd matches the expected crowd criteria to at least a predefined threshold degree, then the corresponding POI is identified as a matching POI and is returned to the prediction server 26.

In addition or alternatively, the MAP server 12 may identify POIs that are expected to have crowds that match the expected crowd criteria as matching POIs at some future time. More specifically, the MAP server 12 may first identify POIs within a predefined geographic area around the current location of the subject user. For example, the MAP server 12 may first identify POIs within a predefined distance from the current location of the subject user. For each identified POI, the MAP server 12 then identifies crowds that are expected to be at the identified POI within a predefined amount of time (e.g., on the current day, within the next hour, or the like). More specifically, in this embodiment, the MAP server 12 may query the datastore 66 to obtain crowd snapshots for crowds previously located at the identified POI. For each crowd previously located at the identified POI, the MAP server 12 determines whether the crowd is expected to be located at the identified POI within the predefined amount of time based on the crowd snapshots for that crowd. For example, if it is currently Friday afternoon and the crowd snapshots for a crowd indicate that the crowd has historically visited the identified POI every Friday afternoon, then the prediction server 26 determines that the crowd is expected to be located at the identified POI. Then, the prediction server 26 obtains crowd data for each crowd identified for the identified POI. In this embodiment, some if not all of the crowd data for the crowd is included in the crowd snapshots for the crowd. As such, in one embodiment, at least some of the crowd data for the crowd is obtained from a most recent crowd snapshot for the crowd. Further, the MAP server 12 may generate any desired crowd data that is not included in the crowd snapshot. For each identified crowd, the MAP server 12 compares the crowd data for the crowd to the expected crowd criteria. If the crowd data for the crowd matches the expected crowd criteria to at least a predefined threshold degree, then the corresponding POI is identified as a matching POI and is returned to the prediction server 26. In addition, a time at which a crowd having crowd data matching the expected crowd criteria is expected to be at the matching POI may also be returned to the prediction server 26.

In addition or as an alternative to identifying matching POIs, the MAP server 12 may identify locations of current crowds that match the expected crowd criteria for the subject user. More specifically, in one embodiment, the MAP server 12 first identifies crowds within a predefined geographic area around the current location of the subject user. In one embodiment, the MAP server 12 reactively generates the crowds at this time using, for example, the process of FIG. 6. In another embodiment, the MAP server 12 proactively generates crowds using, for example, the process of FIG. 6, FIGS. 8A through 8D, or FIGS. 14A through 14D. In this case, the MAP server 12 identifies the crowds within the predefined geographic area around the current location of the subject user by querying the datastore 66. The MAP server 12 also obtains crowd data for each of the identified crowds. The crowd data for the identified crowds may be generated proactively, reactively, or a combination thereof. For each of the identified crowds, the MAP server 12 compares the crowd data for the crowd to the expected crowd criteria. If the crowd data for the crowd matches the expected crowd criteria to at least a predefined threshold degree, then the location of the crowd is identified as a matching crowd location and is returned to the prediction server 26.

In addition or alternatively, the MAP server 12 may identify crowd locations of crowds that are expected to match the expected crowd criteria for the subject user at some future time. More specifically, the MAP server 12 may first identify crowds that are currently within a predefined geographic area around the current location of the subject user. In this embodiment, the MAP server 12 proactively forms crowds and provides the crowd tracking feature described above. As such, the MAP server 12 queries the datastore 66 to identify the crowds that are currently within the predefined geographic area. For each identified crowd, the MAP server 12 analyzes historical crowd data for the crowd included in the crowd snapshots for the crowd to determine whether the crowd is expected to satisfy the expected crowd criteria for the subject user within a predefined amount of time (e.g., on the current day, within the next hour, or the like). For example, if it is currently Friday morning and the crowd snapshots for a crowd indicate that the crowd data for the crowd has historically matched the expected crowd criteria for the subject user to at least the predefined threshold degree on Friday afternoons, then the crowd is identified as a matching crowd. The current location of the matching crowd is returned to the prediction server 26 as a matching crowd location. In addition, a time at which the crowd data of the matching crowd is expected to match the expected crowd criteria may also be returned to the prediction server 26.

Lastly, the prediction server 26 generates a prediction for movement to the one or more matching POIs and/or matching crowd locations for the subject user (step 2110). More specifically, in one embodiment, the prediction server 26 receives a list of matching POIs and/or matching crowd locations from the MAP server 12. The prediction server 26 then ranks the matching POIs and/or matching crowd locations based on one or more ranking criteria. The ranking criteria may include, for example, distance of the matching POI or matching crowd location from the subject user, amount of time until the expected crowd criteria are satisfied which is particularly applicable for matching POI or matching crowd locations that are expected to match the expected crowd criteria in the future, or previous actions of the subject user. For example, if the subject user has previously indicated that he does not like particular types of POIs (e.g., bars), the prediction server 26 may assign any matching POIs that are bars a low ranking or remove them as predictions. At this point, the prediction server 26 returns the predictions to the requestor, which for this example is the prediction-consuming application 28.

FIG. 26 illustrates the operation of the prediction server 26 to receive and process a prediction request from the prediction-consuming application 28 according to another embodiment of the present disclosure. First, the prediction server 26 generates a prediction basis for one or more of the users 20-1 through 20-N, as described above (step 2200). At some point in time, the prediction-consuming application 28 sends a prediction request to the prediction server 26 (step 2202). The prediction request preferably identifies a subject user for which one or more predicted future locations are desired. In this example, the subject user is the user 20-1. In response to the prediction request, the prediction server 26 generates one or more predictions based on the prediction basis for the user 20-1 in the manner described above (step 2204). However, in this embodiment, the prediction server 26 then sends the predictions (i.e., the predicted future locations of the user 20-1) to the mobile device 18-1 of the user 20-1 for confirmation (step 2206).

In response, the mobile device 18-1 then operates to confirm the predictions (step 2208). More specifically, in one embodiment, the mobile device 18-1 confirms the predictions by ranking or sorting the predictions based on one or more local criteria (e.g., rules or parameters). The local criteria may require input from the user 20-1 or may enable the mobile device to confirm the predictions automatically. For example, the local criteria may indicate that the user 20-1 is to manually rank the predictions. As another example, the local criteria may indicate that the mobile device 18-1 is to automatically rank the predications based on a historical record of the location of the user 20-1 stored at the mobile device 18-1. For instance, predictions for POIs that the user 20-1 has frequently visited in the past may be assigned a high ranking whereas predictions for POIs that the user 20-1 has never visited or rarely visits may be assigned a low ranking. In yet another example, contextual information regarding the user 20-1 or the mobile device 18-1 is taken in to account in automatically determining the rankings of the predictions. The contextual information may include other users in proximity to the user 20-1, current activity of the user 20-1, time of day, location, and the like. For instance, when the user 20-1 is with a certain friend, he has a high likelihood to visit a specific POI. The user 20-1 may also be enabled to remove or delete predictions. Still further, if confirmation is manually performed by the user 20-1, the user 20-1 may be enabled to input a reason for a high or low ranking of a POI or crowd location.

Once confirmation is complete, the mobile device 18-1 returns confirmation to the prediction server 26 (step 2210). The confirmation preferably includes a list of confirmed predictions including revised rankings and, optionally, reasons for at least some of the rankings. The reasons for the rankings may thereafter be used by the prediction server 26 to refine future predictions. The prediction server 26 then returns the confirmed predictions to the prediction-consuming application 28 (step 2212). The confirmed predictions are then utilized by the prediction-consuming application 28 to provide a desired service such as, for example, targeted advertising.

FIGS. 27-36 illustrate the operation of the MAP server 12 to generate crowd data for crowds according to various embodiments of the present disclosure. As described above, the MAP server 12 may generate the crowd data for a crowd at various times during operation depending on the particular implementation. Specifically, the MAP server 12 may generate crowd data at the time of crowd formation, at the time of creating a crowd snapshot, and/or in response to a request for or that requires crowd data. As discussed above, the crowd data is used by the MAP server 12 and the prediction server 26 in order to predict the future locations of the users 20-1 through 20-N.

FIG. 27 is a flow chart illustrating the operation of the MAP server 12 to determine a degree of correlation of a user profile of a subject user and user profiles of the users in a crowd according to one embodiment of the present disclosure. In this embodiment, the aggregation engine 62 selects the next user in the crowd (step 2300). For the first iteration, the next user in the crowd is the first user in the crowd. Next, the aggregation engine 62 compares the user profile of the user in the crowd to the user profile of the subject user (i.e., the user for which predicted locations are desired) (step 2302). When comparing the user profile of the user in the crowd to the user profile of the subject user, the aggregation engine 62 identifies matches between the user profile of the user in the crowd and the user profile of the subject user. In one embodiment, the user profiles are expressed as keywords in a number of profile categories. The aggregation engine 62 may then make a list of keywords from the user profile of the user in the crowd that match keywords in user profile of the subject user. Next, the aggregation engine 62 determines whether there are more users in the crowd (step 2304). If so, the process returns to step 2300 and is repeated for the next user in the crowd. Note that, if the subject user is in the crowd, the aggregation engine 62 only compares the user profile of the subject user to the user profiles of the other users in the crowd and does not compare the user profile of the subject user to itself.

Once all of the users in the crowd have been processed, the aggregation engine 62 generates a degree of correlation of between the user profile of the subject user and the user profiles of the users in the crowd (step 2306). In one embodiment, the degree of correlation is a ratio of the number of user matches to the total number of users in the crowd. The number of user matches is a number of users in the crowd having at least one keyword in their user profile that matches a keyword in the user profile of the subject user. In another embodiment, the degree of correlation is a ratio of the number of user matches to the total number of users in the crowd for each individual keyword in the user profile of the subject user. In another embodiment, the degree of correlation may be computed based on the number of user matches for each individual keyword in the user profile of the subject user and weights assigned to the individual keywords. The keyword weights may be assigned by the subject user.

Note that while the process of FIG. 27 generates the degree of correlation between the user profile of the subject user and the user profile of the users in the crowd, a similar process may be used to generate a degree of correlation of the user profiles in the crowd to one another. Specifically, the user profiles of the users in the crowd would be compared to one another. The degree of correlation of the user profiles in the crowd may then be expressed as a ratio of a number of user matches to the total number of users in the crowd. Here, the number of user matches is the number of users in the crowd having at least one keyword in their user profiles that match at least one keyword in the user profile of another user in the crowd. In another embodiment, the degree of correlation may be expressed as a ratio of the number of user matches to the total number of users in the crowd for each individual keyword appearing in any of the user profiles of the users in the crowd.

FIG. 28 is a flow chart illustrating a process by which the MAP server 12 determines a degree of fragmentation of a crowd according to one embodiment of the present disclosure. In this embodiment, a spatial crowd fragmentation process is used. First, the crowd analyzer 60 creates a crowd fragment of one user for each user in a crowd (step 2400). Next, the crowd analyzer 60 determines the two closest crowd fragments in the crowd (step 2402) and a distance between the two closest crowd fragments (step 2404). The distance between the two closest crowd fragments is the distance between the crowd fragment centers of the two closest crowd fragments. The crowd fragment center for a crowd fragment having only one user is the current location of that one user.

The crowd analyzer 60 then determines whether the distance between the two closest crowd fragments is less than an optimal inclusion distance for a crowd fragment (step 2406). In one embodiment, the optimal inclusion distance for a crowd fragment is a predefined static value. In another embodiment, the optimal inclusion distance of the crowd may vary. As such, the optimal inclusion distance for a crowd fragment within the crowd may be defined as a fraction of the optimal inclusion distance of the crowd such that the optimal inclusion distance for a crowd fragment within the crowd varies along with the optimal inclusion distance for the crowd itself.

If the distance between the two closest crowd fragments is less than the optimal inclusion distance for a crowd fragment, then the two closest crowd fragments are combined (step 2408) and a new crowd fragment center is computed for the resulting crowd fragment (step 2410). The crowd fragment center may be computed using, for example, a center of mass algorithm. At this point the process returns to step 2402 and is repeated. Once the two closest crowd fragments in the crowd are separated by more than the optimal inclusion distance for a crowd fragment, the process ends. At this point, the crowd analyzer 60 has created the crowd fragments or defined the crowd fragments for the crowd. The crowd data for the crowd may then include the degree of fragmentation of the crowd, which may be provided as the number of crowd fragments in the crowd and/or an average number of users per crowd fragment as the degree of fragmentation of the crowd.

Figure 29A:
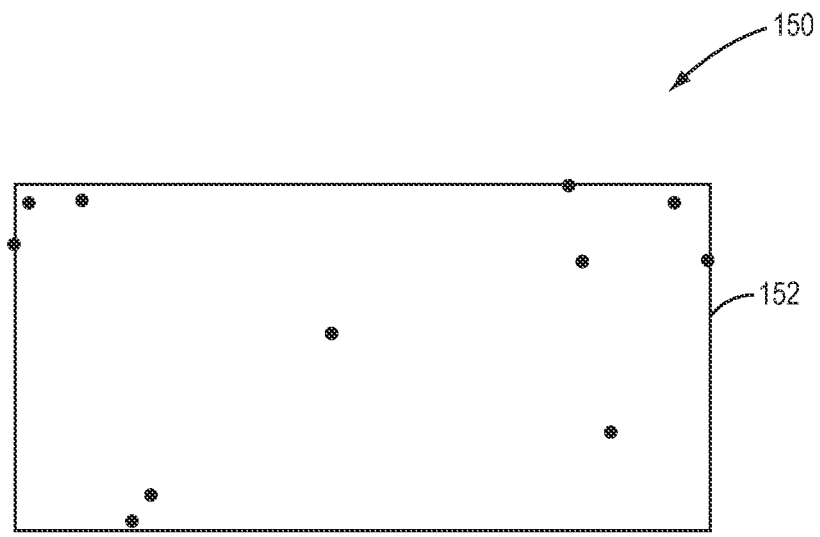
Figure 29B:
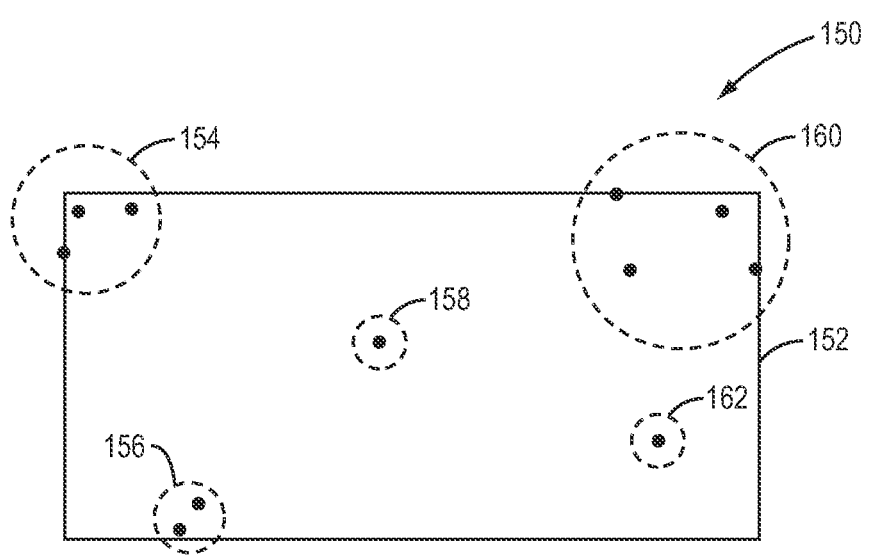

FIGS. 29A and 29B graphically illustrate the spatial crowd fragmentation process of FIG. 28 for an exemplary crowd 150 having bounding box 152. FIG. 29A illustrates the crowd 150 before spatial crowd fragmentation. FIG. 29B illustrates the crowd 150 after spatial crowd fragmentation. As illustrated, after spatial crowd fragmentation, the crowd 150 includes a number of crowd fragments 154 through 162. As such, the crowd 150 has a degree of fragmentation of five crowd fragments with an average of approximately 2 users per crowd fragment. Thus, the crowd 150 has a moderately high degree of fragmentation. The highest degree of fragmentation for the crowd 150 would be to have eleven crowd fragments with an average of one user per crowd fragment. The lowest degree of fragmentation for the crowd 150 would be to have one crowd fragment with an average of eleven users per crowd fragment.

FIG. 30 is a flow chart illustrating a process by which the MAP server 12 determines a degree of fragmentation of a crowd according to one embodiment of the present disclosure. In this embodiment, a connectivity-based crowd fragmentation process is used. First, the crowd analyzer 60 creates a crowd fragment for each user in the crowd (step 2500). Next, the crowd analyzer 60 selects a next pair of crowd fragments in the crowd (step 2502) and then selects one user from each of those crowd fragments (step 2504). The crowd analyzer 60 then determines a DOS between the users from the pair of crowd fragments (step 2506). More specifically, as will be appreciated by one of ordinary skill in the art, DOS is a measure of the degree to which the two users are related in a social network (e.g., the Facebook® social network, the MySpace® social network, or the LinkedIN® social network). The two users have a DOS of one if one of the users is a friend of the other user, a DOS of two if one of the users is a friend of a friend of the other user, a DOS of three if one of the users is a friend of a friend of a friend of the other user, etc. If the two users are not related in a social network or have an unknown DOS, the DOS for the two users is set to a value equal to or greater than the maximum DOS for a crowd fragment.

The crowd analyzer 60 then determines whether the DOS between the two users is less than a predefined maximum DOS for a crowd fragment (step 2508). For example, the predefined maximum DOS may be three. However, other maximum DOS values may be used to achieve the desired crowd fragmentation. If the DOS between the two users is not less than the predefined maximum DOS, the process proceeds to step 2516. If the DOS between the two users is less than the predefined maximum DOS, the crowd analyzer 60 determines whether a bidirectionality requirement is satisfied (step 2510). The bidirectionality requirement specifies whether the relationship between the two users must be bidirectional (i.e., the first user must directly or indirectly know the second user and the second user must directly or indirectly know the first user). Bidirectionality may or may not be required depending on the particular embodiment. If the two users satisfy the bidirectionality requirement, the crowd analyzer 60 combines the pair of crowd fragments (step 2512) and computes a new crowd fragment center for the resulting crowd fragment (step 2514). The process then returns to step 2502 and is repeated for a next pair of crowd fragments. If the two users do not satisfy the bidirectionality requirement, the process proceeds to step 2516.

At this point, whether proceeding from step 2508 or step 2510, the crowd analyzer 60 determines whether all user pairs from the two crowd fragments have been processed (step 2516). If not, the process returns to step 2504 and is repeated for a new pair of users from the two crowd fragments. If all user pairs from the two crowd fragments have been processed, the crowd analyzer 60 then determines whether all crowd fragments have been processed (step 2518). If not, the process returns to step 2502 and is repeated until all crowd fragments have been processed. Once this process is complete, the crowd analyzer 60 has determined the number of crowd fragments in the crowd. The crowd data for the crowd may then include the degree of fragmentation of the crowd, which may be provided as the number of crowd fragments and/or the average number of users per crowd fragment.

Figure 31A:
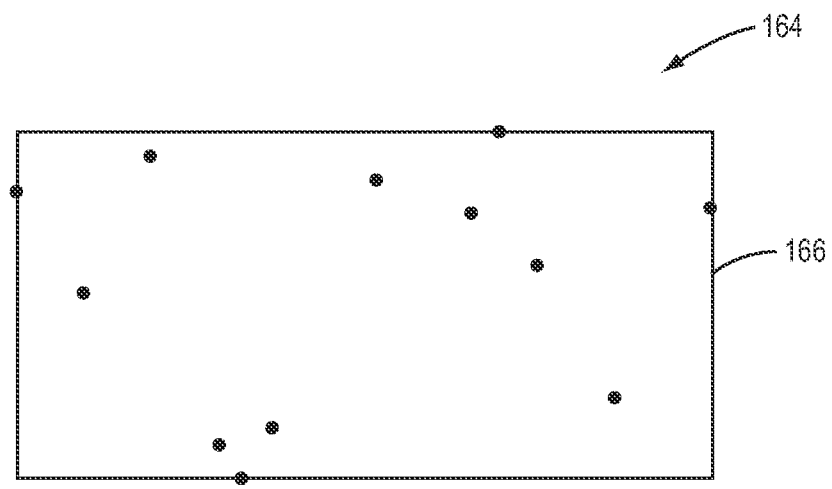
Figure 31B:
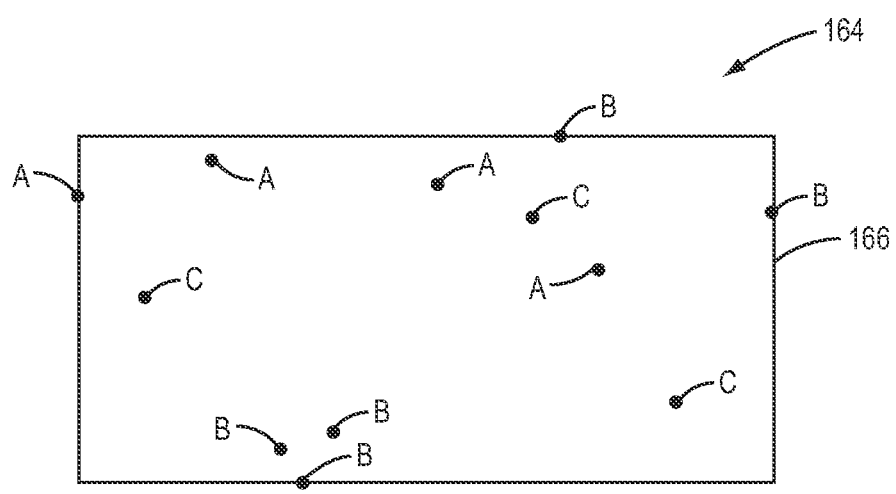

FIGS. 31A and 31B graphically illustrate the connectivity-based crowd fragmentation process of FIG. 30. FIG. 317A illustrates a crowd 164 having a number of users and a bounding box 166. FIG. 31B illustrates the crowd 164 after the connectivity-based crowd fragmentation process has been performed. As illustrated, there are three crowd fragments resulting from the connectivity-based crowd fragmentation process. Namely, crowd fragment A has four users marked as "A," crowd fragment B has five users marked as "B," and crowd fragment C has three users marked as "C." As illustrated, the users in a particular crowd fragment may not be close to one another spatially since, in this embodiment, there is no spatial requirement for users of the crowd fragment other than that the users of the crowd fragment are in the same crowd.

FIG. 32 is a flow chart illustrating a process by which the MAP server 12 determines a degree of fragmentation of a crowd according to one embodiment of the present disclosure. In this embodiment, a recursive crowd fragmentation process that uses both spatial crowd fragmentation and connectivity-based crowd fragmentation is used. First, the crowd analyzer 60 performs a spatial crowd fragmentation process to create a number of crowd fragments for a crowd (step 2600). The spatial crowd fragmentation process may be the spatial crowd fragmentation process of FIG. 28. The crowd analyzer 60 then selects a next crowd fragment of the crowd fragments created for the crowd (step 2602). Next, the crowd analyzer 60 performs a connectivity-based crowd fragmentation process to create a number of sub-fragments for the crowd fragment of the crowd (step 2604). The connectivity-based crowd fragmentation process may be the connectivity-based crowd fragmentation process of FIG. 30. The crowd analyzer 60 then determines whether the last crowd fragment of the crowd has been processed (step 2606). If not, the process returns to step 2602 and is repeated until the last crowd fragment of the crowd has been processed. At that point, the process is complete. The crowd data for the crowd may then include the degree of fragmentation for the crowd and the number of sub-fragments and/or the average number of users per sub-fragment for each crowd fragment.

FIG. 33 is a flow chart illustrating a process by which the MAP server 12 determines a degree of fragmentation of a crowd according to one embodiment of the present disclosure. In this embodiment, a recursive crowd fragmentation process that uses both spatial crowd fragmentation and connectivity-based crowd fragmentation is used. First, the crowd analyzer 60 performs a connectivity-based crowd fragmentation process to create a number of crowd fragments for a crowd (step 2700). The connectivity-based crowd fragmentation process may be the connectivity-based crowd fragmentation process of FIG. 30. The crowd analyzer 60 then selects a next crowd fragment of the crowd fragments created for the crowd (step 2702). Next, the crowd analyzer 60 performs a spatial crowd fragmentation process to create a number of sub-fragments for the crowd fragment of the crowd (step 2704). The spatial crowd fragmentation process may be the spatial crowd fragmentation process of FIG. 28. The crowd analyzer 60 then determines whether the last crowd fragment of the crowd has been processed (step 2706). If not, the process returns to step 2702 and is repeated until the last crowd fragment of the crowd has been processed. At that point, the process is complete. The crowd data for the crowd may then include the degree of fragmentation for the crowd and the number of sub-fragments and/or an average number of users per sub-fragment for each crowd fragment.

FIG. 34 is a flow chart for a process for determining a best-case and worst-case average DOS for a crowd according to one embodiment of the present disclosure. The crowd analyzer 60 counts the number of 1 DOS, 2 DOS, ..., M DOS relationships in a crowd (step 2800) and the number of user pairs in the crowd for which explicit relationships are not defined or known (step 2802). More specifically, for each pair of users in the crowd, the crowd analyzer 60 determines the DOS between the pair of users if the DOS between the pair of user is known or determines that the DOS between the pair of users is not defined or known if the DOS between the pair of users is in fact not defined or known. Based on these determinations, the crowd analyzer 60 counts the number of user pairs having a DOS of 1, the number of user pairs having a DOS of 2, etc. In addition, the crowd analyzer 60 counts the number of user pairs for which no relationship is defined or known.

The crowd analyzer 60 then computes a best-case average DOS for the crowd using a best-case DOS for the user pairs in the crowd for which explicit relationships are not defined (step 2804). In this embodiment, the best-case average DOS is 1. The best-case average DOS may computed as:

$$AverageDOS_{BestCase} = \frac{\sum_{i=1}^{M}(i \cdot DOS\_count_i) + DOS_{BestCase} \cdot Num\_Unknown}{\sum_{i=1}^{M}(DOS\_count_i) + Num\_Unknown},$$

where $AverageDOS_{BestCase}$ is the best-case average DOS for the crowd, $DOS\_count_i$ is the number of user pairs for the ith DOS, $DOS_{BestCase}$ is the best-case DOS, and Num_Unknown is the number of user pairs for which a relationship is not defined or is unknown.

The crowd analyzer 60 also computes the worst-case average DOS for the crowd using a worst-case DOS for the user pairs in the crowd for which explicit relationships are not defined (step 2806). In this embodiment, the worst-case DOS is a greatest possible DOS that the crowd analyzer 60 considers, which may be, for example, a DOS of greater than or equal to 7. For instance, the worst-case DOS may be 10. However, other values for the worst-case DOS may be used. The worst-case average DOS may computed as:

$$AverageDOS_{WorstCase} = \frac{\sum_{i=1}^{M}(i \cdot DOS\_count_i) + DOS_{WorstCase} \cdot Num\_Unknown}{\sum_{i=1}^{M}(DOS\_count_i) + Num\_Unknown},$$

where $AverageDOS_{WorstCase}$ is the worst-case average DOS for the crowd, $DOS\_count_i$ is the number of user pairs for the ith DOS, $DOS_{WorstCase}$ is the worst-case DOS, and Num_Unknown is the number of user pairs for which a relationship is not defined or is unknown. The best-case average DOS and the worst-case average DOS for the crowd may be included in the crowd data for the crowd.

FIG. 35 is a flow chart for illustrating the operation of the MAP server 12 to determine a degree of bidirectionality of relationships between users in a crowd according to one embodiment of the present disclosure. First, the crowd analyzer 60 selects the next user in a crowd, which for the first iteration is the first user in the crowd (step 2900). The crowd analyzer 60 then selects the next friend of the user (step 2902). Note that friends of the users 20-1 through 20-N may have been previously been obtained from the one or more profile servers 14 along with the user profiles of the users 20-1 through 20-N and provided to the MAP server 12. The crowd analyzer 60 then determines whether the friend of the user is a member of the crowd (step 2904). If not, the process proceeds to step 2912. If the friend of the user is a member of the crowd, the crowd analyzer 60 increments a connection count (step 2906). In addition, the crowd analyzer 60 determines whether the relationship between the user and the friend is bidirectional (step 2908). In other words, the crowd analyzer 60 determines whether the user is also a friend of that friend. If not, the process proceeds to step 2912. If so, the crowd analyzer 60 increments a bidirectional count (step 2910).

At this point, whether proceeding from step 2904, step 2908, or step 2910, the crowd analyzer 60 determines whether the user has more friends to process (step 2912). If so, the process returns to step 2902 and is repeated for the next friend of the user. Once all of the friends of the user have been processed, the crowd analyzer 60 determines whether there are more users in the crowd fragment (step 2914). If so, the process returns to step 2900 and is repeated for the next user in the crowd fragment. Once steps 2902 through 2912 have been performed for all of the users in the crowd fragment, the crowd analyzer 60 computes a ratio of the bidirectional count (i.e., the number of bidirectional friend relationships) over the connection count (i.e., the number of unidirectional and bidirectional friend relationships) for the crowd fragment (step 2916). At this point, the process ends. In this embodiment, the ratio of the bidirectionality count to the connection count reflects the degree of bidirectionality of friendship relationships for the crowd fragment and may be included in the crowd data for the crowd.

FIG. 36 is a block diagram of the MAP server 12 according to one embodiment of the present disclosure. As illustrated, the MAP server 12 includes a controller 168 connected to memory 170, one or more secondary storage devices 172, and a communication interface 174 by a bus 176 or similar mechanism. The controller 168 is a microprocessor, digital Application Specific Integrated Circuit (ASIC), Field Programmable Gate Array (FPGA), or the like. In this embodiment, the controller 168 is a microprocessor, and the application layer 42, the business logic layer 44, and the object mapping layer 64 (FIG. 2) are implemented in software and stored in the memory 170 for execution by the controller 168. Further, the datastore 66 (FIG. 2) may be implemented in the one or more secondary storage devices 172. The secondary storage devices 172 are digital data storage devices such as, for example, one or more hard disk drives. The communication interface 174 is a wired or wireless communication interface that communicatively couples the MAP server 12 to the network 30 (FIG. 1). For example, the communication interface 174 may be an Ethernet interface, local wireless interface such as a wireless interface operating according to one of the suite of IEEE 802.11 standards, or the like.

FIG. 37 is a block diagram of the mobile device 18-1 according to one embodiment of the present disclosure. This discussion is equally applicable to the other mobile devices 18-2 through 18-N. As illustrated, the mobile device 18-1 includes a controller 178 connected to memory 180, a communication interface 182, one or more user interface components 184, and the location function 38-1 by a bus 186 or similar mechanism. The controller 178 is a microprocessor, digital ASIC, FPGA, or the like. In this embodiment, the controller 178 is a microprocessor, and the MAP client 32-1, the MAP application 34-1, and the third-party applications 36-1 are implemented in software and stored in the memory 180 for execution by the controller 178. In this embodiment, the location function 38-1 is a hardware component such as, for example, a GPS receiver. The communication interface 182 is a wireless communication interface that communicatively couples the mobile device 18-1 to the network 30 (FIG. 1). For example, the communication interface 182 may be a local wireless interface such as a wireless interface operating according to one of the suite of IEEE 802.11 standards, a mobile communications interface such as a cellular telecommunications interface, or the like. The one or more user interface components 184 include, for example, a touchscreen, a display, one or more user input components (e.g., a keypad), a speaker, or the like, or any combination thereof.

FIG. 38 is a block diagram of the subscriber device 22 according to one embodiment of the present disclosure. As illustrated, the subscriber device 22 includes a controller 188 connected to memory 190, one or more secondary storage devices 192, a communication interface 194, and one or more user interface components 196 by a bus 198 or similar mechanism. The controller 188 is a microprocessor, digital ASIC, FPGA, or the like. In this embodiment, the controller 188 is a microprocessor, and the web browser 40 (FIG. 1) is implemented in software and stored in the memory 190 for execution by the controller 188. The one or more secondary storage devices 192 are digital storage devices such as, for example, one or more hard disk drives. The communication interface 194 is a wired or wireless communication interface that communicatively couples the subscriber device 22 to the network 30 (FIG. 1). For example, the communication interface 194 may be an Ethernet interface, local wireless interface such as a wireless interface operating according to one of the suite of IEEE 802.11 standards, a mobile communications interface such as a cellular telecommunications interface, or the like. The one or more user interface components 196 include, for example, a touchscreen, a display, one or more user input components (e.g., a keypad), a speaker, or the like, or any combination thereof.

FIG. 39 is a block diagram of the prediction server 26 according to one embodiment of the present disclosure. As illustrated, the prediction server 26 includes a controller 200 connected to memory 202, one or more secondary storage devices 204, a communication interface 206, and one or more user interface components 208 by a bus 210 or similar mechanism. The controller 200 is a microprocessor, digital ASIC, FPGA, or the like. In this embodiment, the controller 200 is a microprocessor, and software instructing the controller 200 to perform the prediction process described herein is stored in the memory 202 for execution by the controller 200. The one or more secondary storage devices 204 are digital storage devices such as, for example, one or more hard disk drives. The communication interface 206 is a wired or wireless communication interface that communicatively couples the prediction server 26 to the network 30 (FIG. 1). For example, the communication interface 206 may be an Ethernet interface, local wireless interface such as a wireless interface operating according to one of the suite of IEEE 802.11 standards, a mobile communications interface such as a cellular telecommunications interface, or the like. The one or more user interface components 208 include, for example, a touchscreen, a display, one or more user input components (e.g., a keypad), a speaker, or the like, or any combination thereof.

Those skilled in the art will recognize improvements and modifications to the preferred embodiments of the present invention. All such improvements and modifications are considered within the scope of the concepts disclosed herein and the claims that follow.

What is claimed is:

1. A computer-implemented method comprising:
    generating a prediction basis for a user comprising previous crowd data describing crowds in which the user was previously included during a plurality of reoccurring time windows; and
    predicting one or more future locations of the user based on the prediction basis, wherein predicting the one or more future locations of the user based on the prediction basis comprises:
        obtaining current crowd data describing a current crowd in which the user is currently included;
        obtaining relevant crowd data from the prediction basis; and
        determining whether the user is likely to move to one of the one or more future locations based on a comparison of the current crowd data and at least a subset of the relevant crowd data from the prediction basis.

2. The method of claim 1 wherein for each instance of each reoccurring time window of the plurality of time windows, the prediction basis of the user comprises crowd data describing a crowd in which the user was included during the instance of the reoccurring time window.

3. The method of claim 1 wherein the crowd data describing the crowds in which the user was previously included comprises a crowd size of each of the crowds.

4. The method of claim 1 wherein the crowd data describing the crowds in which the user was previously included comprises, for each crowd of the crowds, a degree of correlation between a user profile of the user and user profiles of other users in the crowd.

5. The method of claim 1 wherein the crowd data describing the crowds in which the user was previously included comprises, for each crowd of the crowds, a degree of correlation between user profiles of users in the crowd.

6. The method of claim 1 wherein the crowd data describing the crowds in which the user was previously included comprises one or more crowd characteristics of each of the crowds.

7. The method of claim 6 wherein the one or more crowd characteristics of each of the crowds comprises at least one of a group consisting of: a best-case average Degree of Separation (DOS) for the crowd, a worst-case average DOS for the crowd, a degree of fragmentation of the crowd, a degree of bidirectionality of relationships of the crowd.

8. The method of claim 1 wherein generating the prediction basis for the user comprises:
    detecting an instance of one of the plurality of reoccurring time windows;
    obtaining crowd data for a crowd in which the user is located at a time at which the instance of the one of the plurality of reoccurring time windows is detected;
    storing the crowd data as part of the prediction basis of the user; and
    repeating the steps of detecting, obtaining, and storing for a plurality of instances of the plurality of reoccurring time windows.

9. The method of claim 1 wherein the relevant crowd data from the prediction basis is crowd data from the prediction basis for a one of the plurality of reoccurring time windows corresponding to a current time.

10. The method of claim 1 wherein the relevant crowd data from the prediction basis is crowd data from the prediction basis for a one of the plurality of reoccurring time windows immediately following a one of the plurality of reoccurring time windows corresponding to a current time.

11. The method of claim 1 wherein predicting the one or more future locations of the user based on the prediction basis further comprising, if the user is likely to move:
    generating expected crowd criteria describing a type of a crowd in which the user is expected to be included based on the relevant crowd data from the prediction basis;
    obtaining locations matching the expected crowd criteria; and
    providing one or more of the locations matching the expected crowd criteria as the one or more future locations of the user.

12. The method of claim 11 wherein generating the expected crowd criteria describing the type of crowd in which the user is expected to be included comprises generating the expected crowd criteria based on all of the relevant crowd data from the prediction basis.

13. The method of claim 11 wherein the relevant crowd data comprises crowd data for a plurality of instances of one of the plurality of reoccurring time windows, and generating the expected crowd criteria describing the type of crowd in which the user is expected to be included comprises:
    identifying one or more patterns in the crowd data for the plurality of instances of the one of the plurality of reoccurring time windows;
    identifying an applicable pattern from the one or more patterns; and
    generating the expected crowd criteria based on the crowd data for a subset of the plurality of instances of the one of the plurality of reoccurring time windows that are in the applicable pattern.

14. The method of claim 11 wherein the expected crowd criteria comprises a particular combination of values for a plurality of crowd data components.

15. The method of claim 11 wherein the expected crowd criteria comprises a range of values for each of at least one of a plurality of crowd data components.

16. The method of claim 11 wherein the locations matching the expected crowd criteria comprise one or more Points of Interest (POIs) at which crowds that match the expected crowd criteria to at least a threshold degree are currently located.

17. The method of claim 11 wherein the locations matching the expected crowd criteria comprise one or more Points of Interest (POIs) at which crowds that match the expected crowd criteria to at least a threshold degree are expected to be located at a future time.

18. The method of claim 11 wherein the locations matching the expected crowd criteria comprise a location of a crowd that currently matches the expected crowd criteria to at least a threshold degree.

19. The method of claim 11 wherein the locations matching the expected crowd criteria comprise a location of a crowd that is expected to match the expected crowd criteria to at least a threshold degree at a future time.

20. The method of claim 1 wherein determining whether the user is likely to move comprises determining whether the user is likely to move based on a comparison of the current crowd data and all of the relevant crowd data from the prediction basis.

21. The method of claim 1 wherein the relevant crowd data comprises crowd data for a plurality of instances of one of the plurality of reoccurring time windows, and determining whether the user is likely to move comprises:
    identifying one or more patterns in the crowd data for the plurality of instances of the one of the plurality of reoccurring time windows;
    identifying an applicable pattern from the one or more patterns; and
    determining whether the user is likely to move based on a comparison of the current crowd data and a subset of the plurality of instances of the one of the plurality of reoccurring time windows that are in the applicable pattern.

22. The method of claim 1 wherein determining whether the user is likely to move comprises determining that the user is likely to move if the current crowd data is different from the at least a subset of the relevant crowd data from the prediction basis by more than a predefined threshold degree.

23. The method of claim 1 wherein determining whether the user is likely to move comprises determining whether the user is likely to move based on a vector magnitude of a vector between a point representing the current crowd data in n-dimensional space and one or more points representing the at least a subset of the relevant crowd data from the prediction basis in the n-dimensional space.

24. The method of claim 23 wherein the one or more points representing the at least a subset of the relevant crowd data from the prediction basis in the n-dimensional space is a combined point representing a combination of the relevant crowd data from the prediction basis in the n-dimensional space.

25. The method of claim 1 wherein each of the plurality of reoccurring time windows is time window that repeats at one of a group consisting of: daily, weekly, bi-weekly, monthly, and yearly.

26. The method of claim 1 wherein predicting the one or more future locations comprises ranking the one or more future locations.

27. The method of claim 1 further comprising:
    sending the one or more future locations to a device associated with the user for confirmation; and receiving a confirmation from the device of the user in which the one or more future locations have been ranked by at least one of a group consisting of: the device and the user at the device.

28. The method of claim 27 wherein the one or more future locations are ranked automatically by the device based on a location history for the user stored by the device.

29. The method of claim 1 further comprising:
receiving a prediction request from a requestor; and
returning the one or more future locations of the user to the requestor in response to the prediction request.

30. The method of claim 1 further comprising providing the one or more future locations of the user as one or more recommended future locations for the user.

31. A server comprising:
a communication interface communicatively coupling the server to a network; and
a controller associated with the communication interface and adapted to:
   generate a prediction basis for a user comprising previous crowd data describing crowds in which the user was previously included during a plurality of reoccurring time windows; and
   predict one or more future locations of the user based on the prediction basis, wherein when predicting the one or more future locations of the user based on the prediction basis, the controller is adapted to:
      obtain current crowd data describing a current crowd in which the user is currently included;
      obtain relevant crowd data from the prediction basis; and
      determine whether the user is likely to move to one of the one or more future locations based on a comparison of the current crowd data and at least a subset of the relevant crowd data from the prediction basis.

32. A non-transitory computer-readable medium storing software for instructing a controller of a computing device to:
generate a prediction basis for a user comprising previous crowd data describing crowds in which the user was previously included during a plurality of reoccurring time windows; and
predict one or more future locations of the user based on the prediction basis, wherein when predicting the one or more future locations of the user based on the prediction basis the software for instructing a controller further instructs the controller of the computing device to:
   obtain current crowd data describing a current crowd in which the user is currently included;
   obtain relevant crowd data from the prediction basis; and
   determine whether the user is likely to move to one of the one or more future locations based on a comparison of the current crowd data and at least a subset of the relevant crowd data from the prediction basis.

* * * * *